United States Patent
Enomoto

(10) Patent No.: US 6,954,284 B2
(45) Date of Patent: Oct. 11, 2005

(54) INDEX PRINT PRODUCING METHOD, IMAGE PROCESSING SYSTEM, IMAGE PROCESSING METHOD AND IMAGE PROCESSING DEVICE

(75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 74 days.

(21) Appl. No.: 10/409,312

(22) Filed: Apr. 9, 2003

(65) Prior Publication Data

US 2003/0189730 A1 Oct. 9, 2003

Related U.S. Application Data

(62) Division of application No. 09/321,765, filed on May 28, 1999, now Pat. No. 6,801,334.

(30) Foreign Application Priority Data

| May 28, 1998 | (JP) | ............................................ | 10-147153 |
| Jun. 16, 1998 | (JP) | ............................................ | 10-168776 |
| Jul. 27, 1998 | (JP) | ............................................ | 10-211048 |
| Jul. 28, 1998 | (JP) | ............................................ | 10-212694 |

(51) Int. Cl.⁷ .............................................. G06F 15/00
(52) U.S. Cl. ....................... 358/1.18; 358/1.9; 358/448; 358/501; 358/530; 358/401
(58) Field of Search ................................. 358/1.18, 1.9, 358/448, 530, 501, 401, 444, 302; 396/311; 382/167; 348/263

(56) References Cited

U.S. PATENT DOCUMENTS

| 5,461,440 A | * | 10/1995 | Toyoda et al. | ............... | 396/311 |
| 6,219,446 B1 | * | 4/2001 | Kiriki et al. | ................ | 382/167 |
| 6,333,992 B1 | * | 12/2001 | Yamamura et al. | ......... | 382/149 |

FOREIGN PATENT DOCUMENTS

| JP | 64-51780 | 2/1989 |
| JP | 6-178082 | 6/1994 |
| JP | 6-317853 | 11/1994 |
| JP | 8-304932 | 11/1996 |
| JP | 8-304933 | 11/1996 |
| JP | 8-304934 | 11/1996 |
| JP | 8-304935 | 11/1996 |
| JP | 9-51420 | 2/1997 |
| JP | 9-90528 | 4/1997 |

\* cited by examiner

*Primary Examiner*—Twyler Lamb
(74) *Attorney, Agent, or Firm*—Sughrue Mion, PLLC

(57) ABSTRACT

An image, which is subjected to a non-standard image processing selectively performed in image units in addition to standard image processings performed when a main print is produced, is subject to an image processing equivalent to a processing performed when the main print is produced or characters indicating the contents of the non-standard image processing are added when an index print is produced. If distortion aberration correction processing is performed when the main print is produced, and an image processing equivalent to the distortion aberration correction processing is not performed when the index print is produced, a frame indicating an image range on the main print is superposed and recorded on an index image.

25 Claims, 32 Drawing Sheets

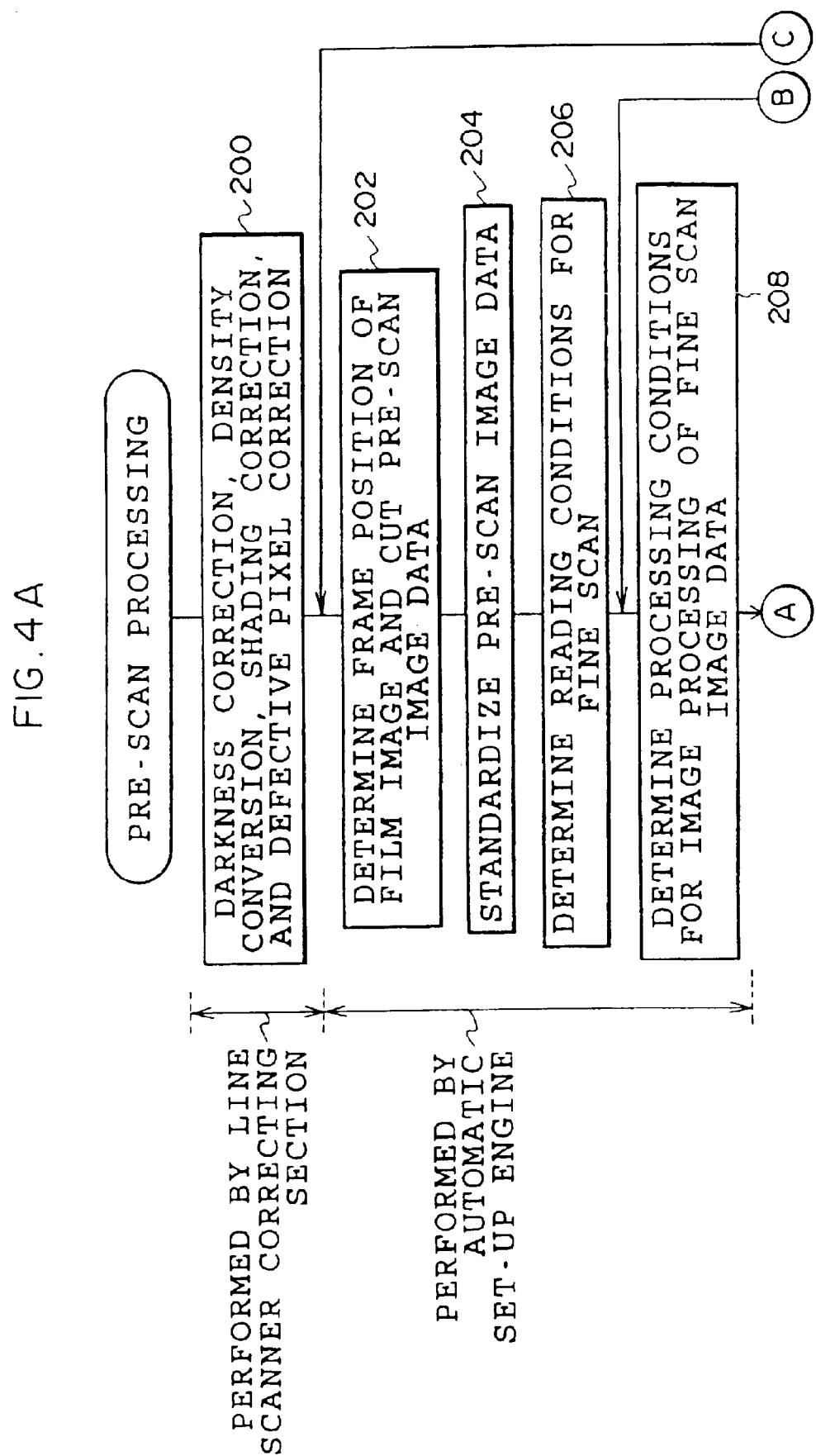

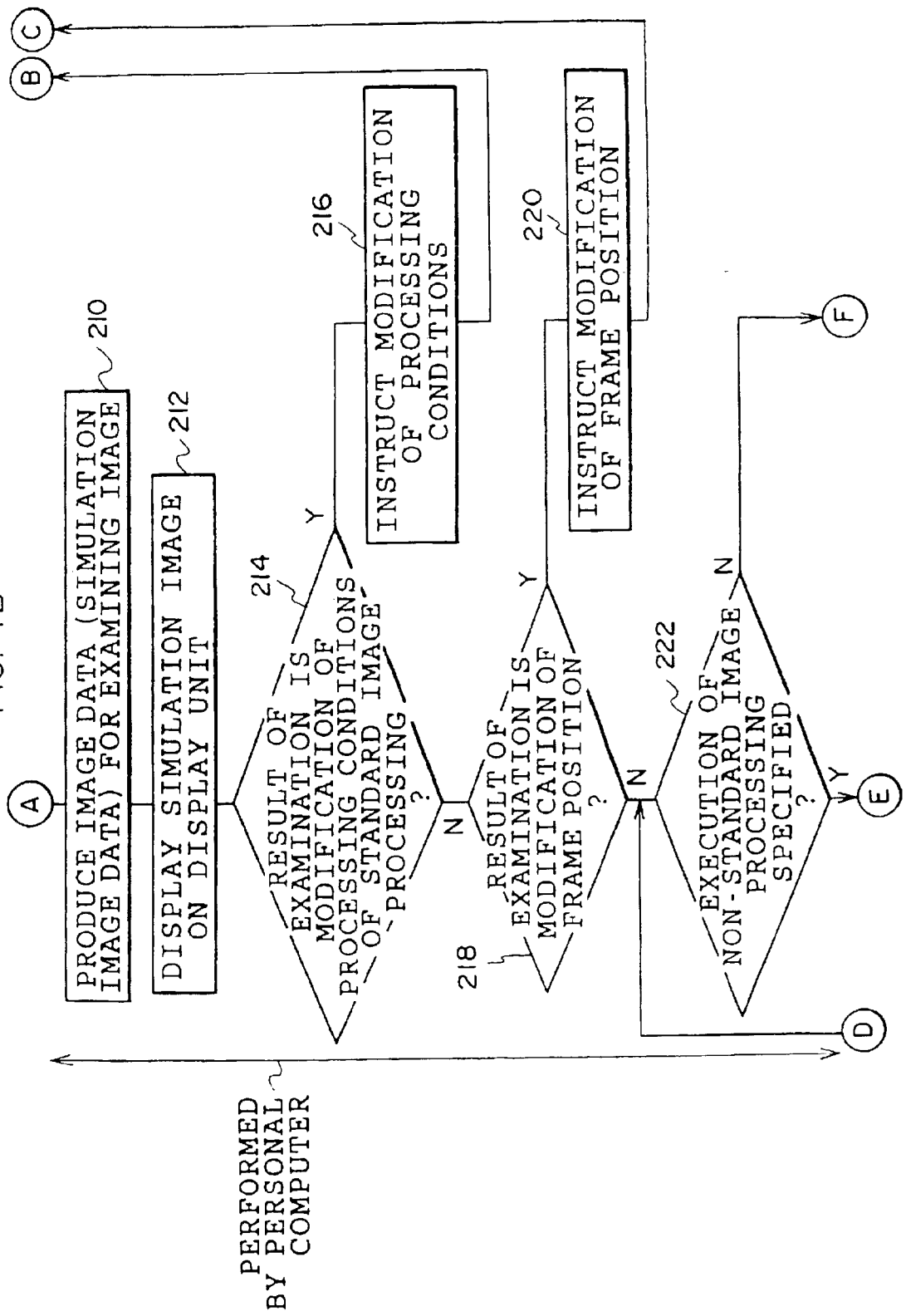

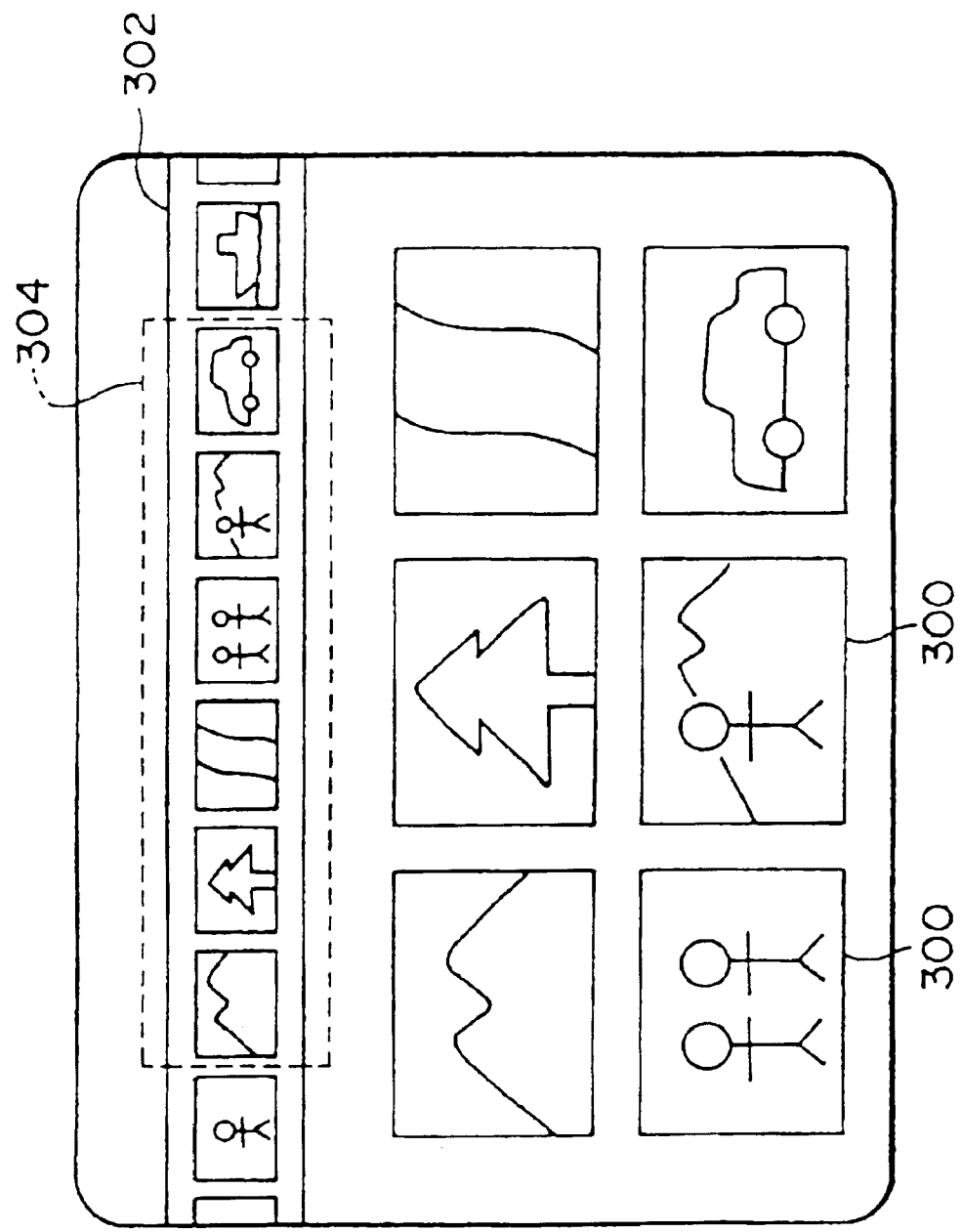

FIG. 7A

WHEN NON-STANDARD IMAGE PROCESSING IS REFLECTED IN
COMPLETED INDEX IMAGE
(EXECUTION OF IMAGE PROCESSING FOR OBTAINING SEPIA
FINISH WHEN MAIN PRINT OF FILM IMAGE IN THE SEVENTH
FRAME IS PRODUCED)

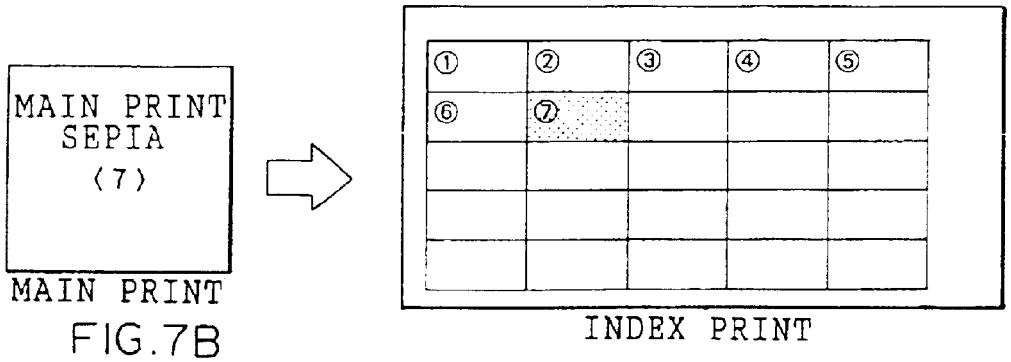

FIG. 7B

WHEN NON-STANDARD IMAGE PROCESSING IS NOT REFLECTED IN
COMPLETED INDEX IMAGE (EXECUTION OF IMAGE PROCESSING
FOR OBTAINING SEPIA FINISH WHEN MAIN PRINT OF FILM IMAGE
IN THE SEVENTH FRAME IS PRODUCED)

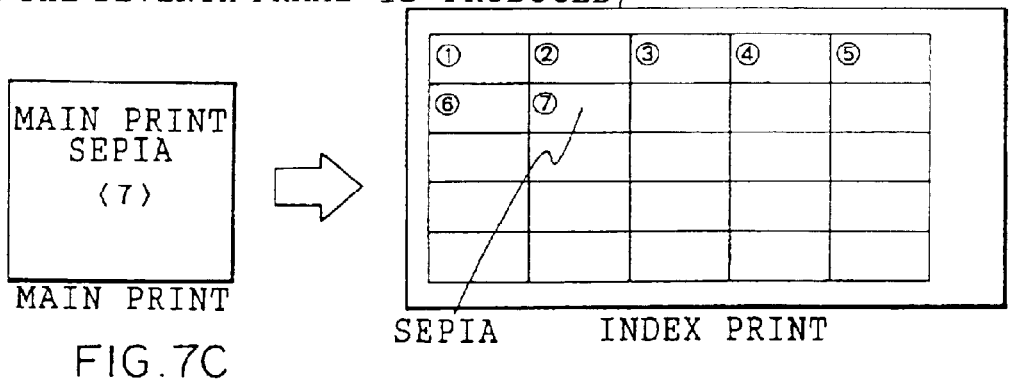

FIG. 7C

WHEN NON-STANDARD IMAGE PROCESSING IS NOT REFLECTED IN
COMPLETED INDEX IMAGE (EXECUTION OF IMAGE PROCESSING
FOR CORRECTING DISTORTION ABERRATION WHEN MAIN PRINT
OF FILM IMAGE IN THE SEVENTH FRAME IS PRODUCED)

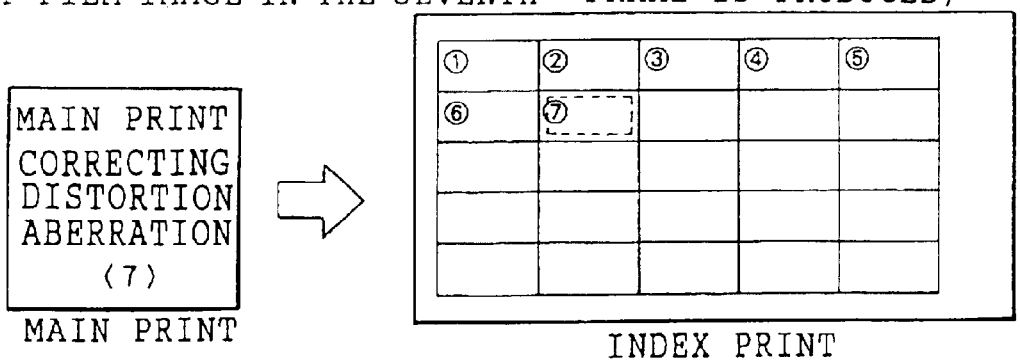

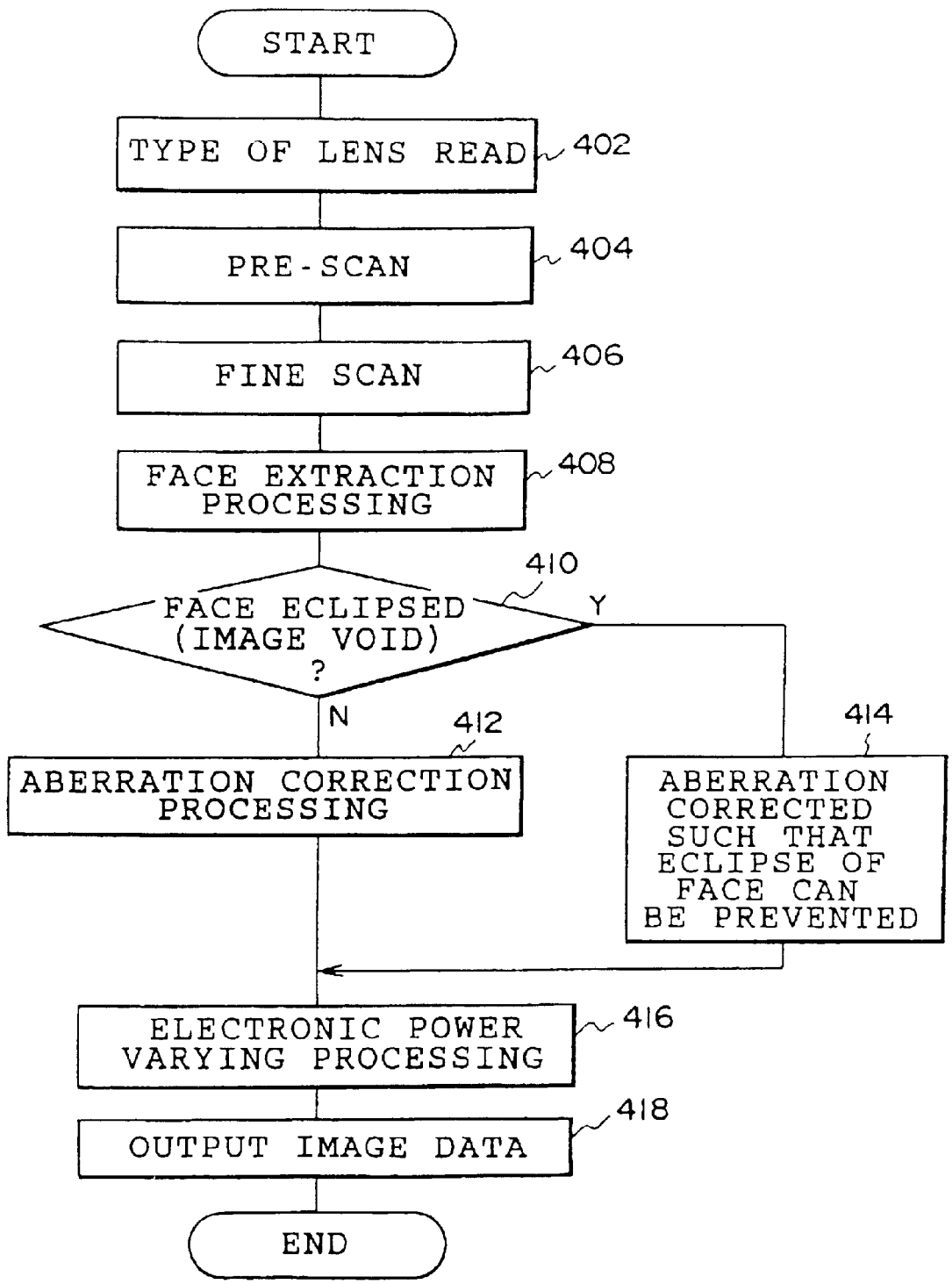

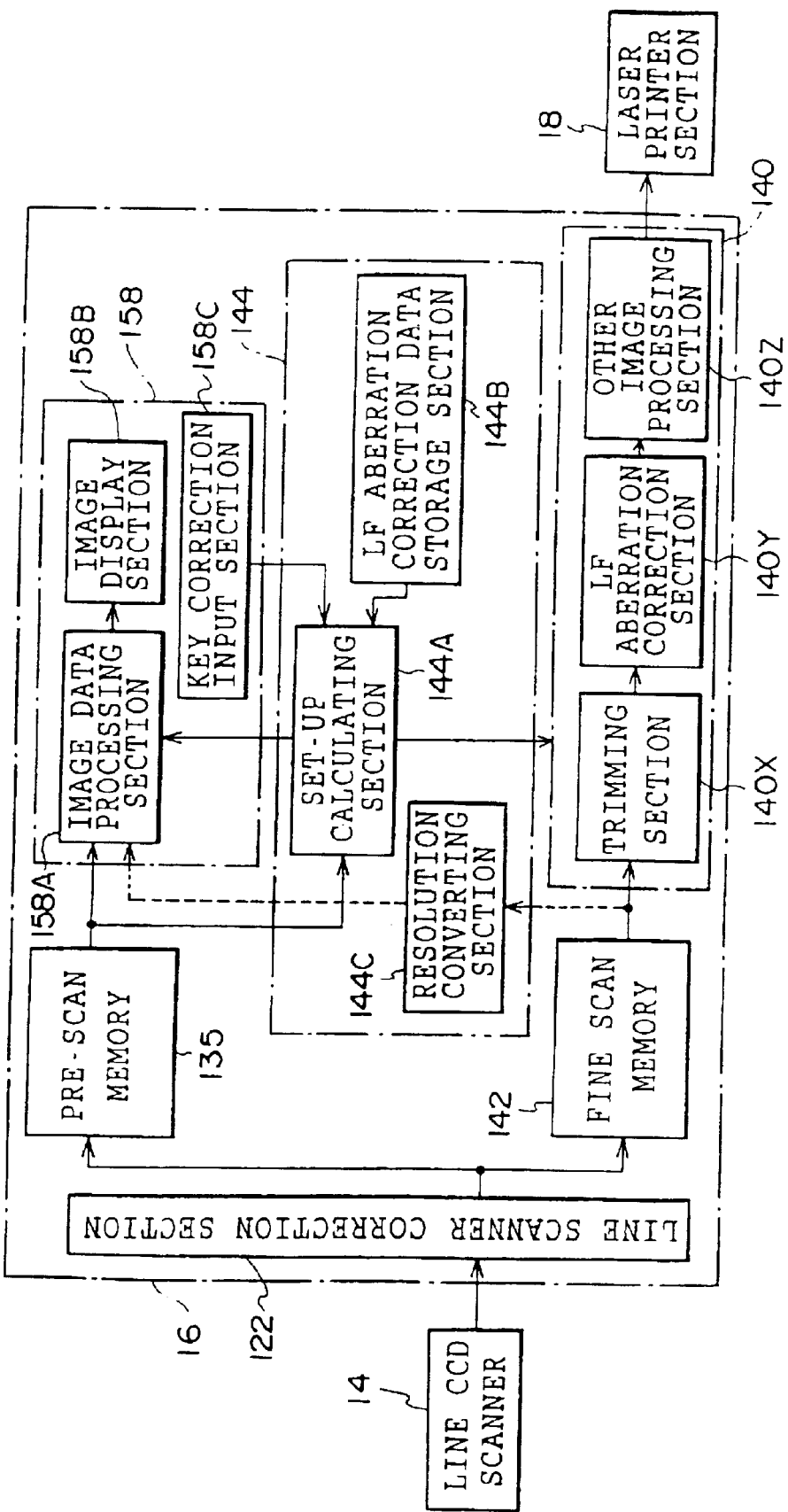

xy COORDINATE SYSTEM $x_P y_P$ COORDINATE SYSTEM

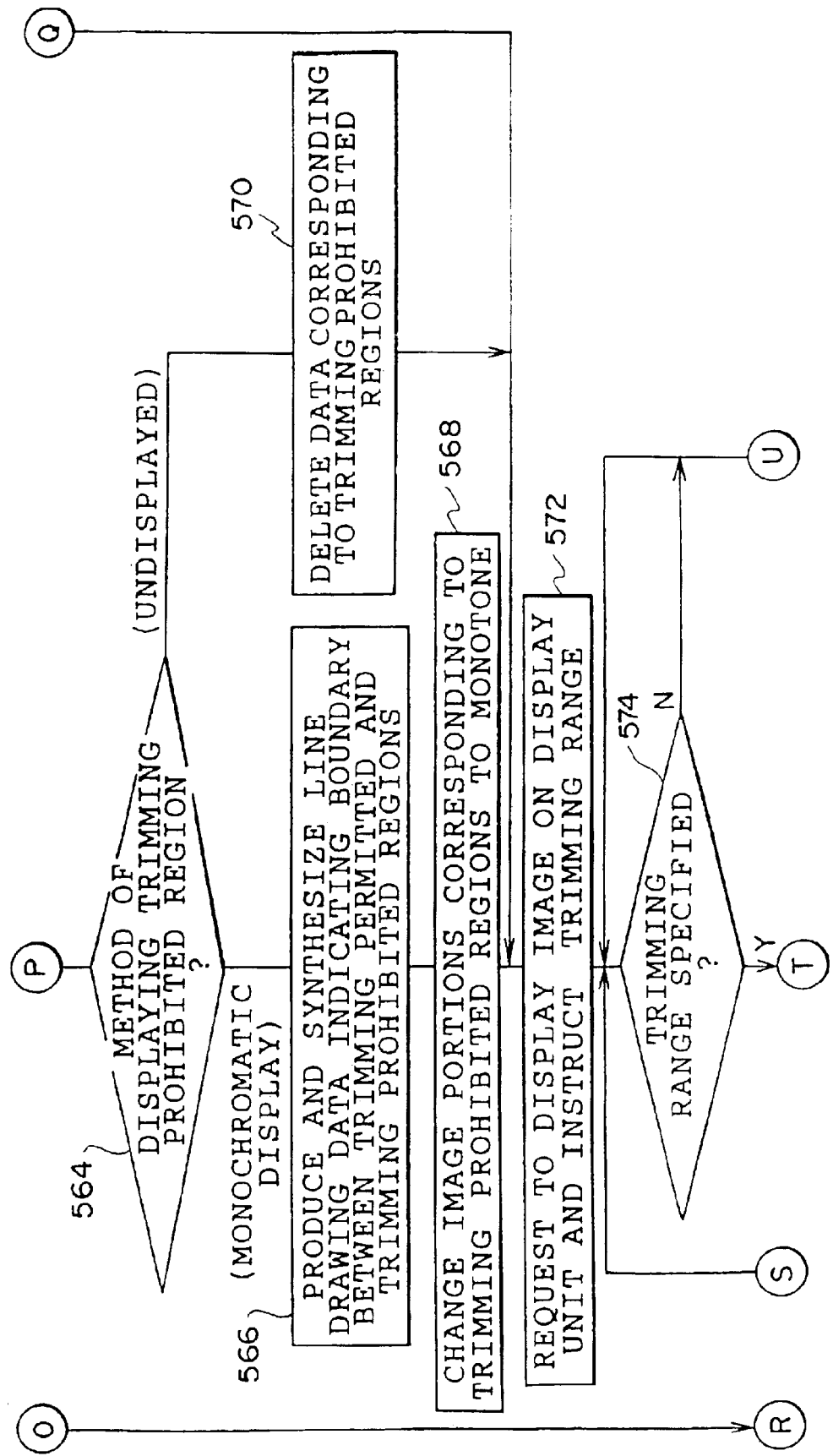

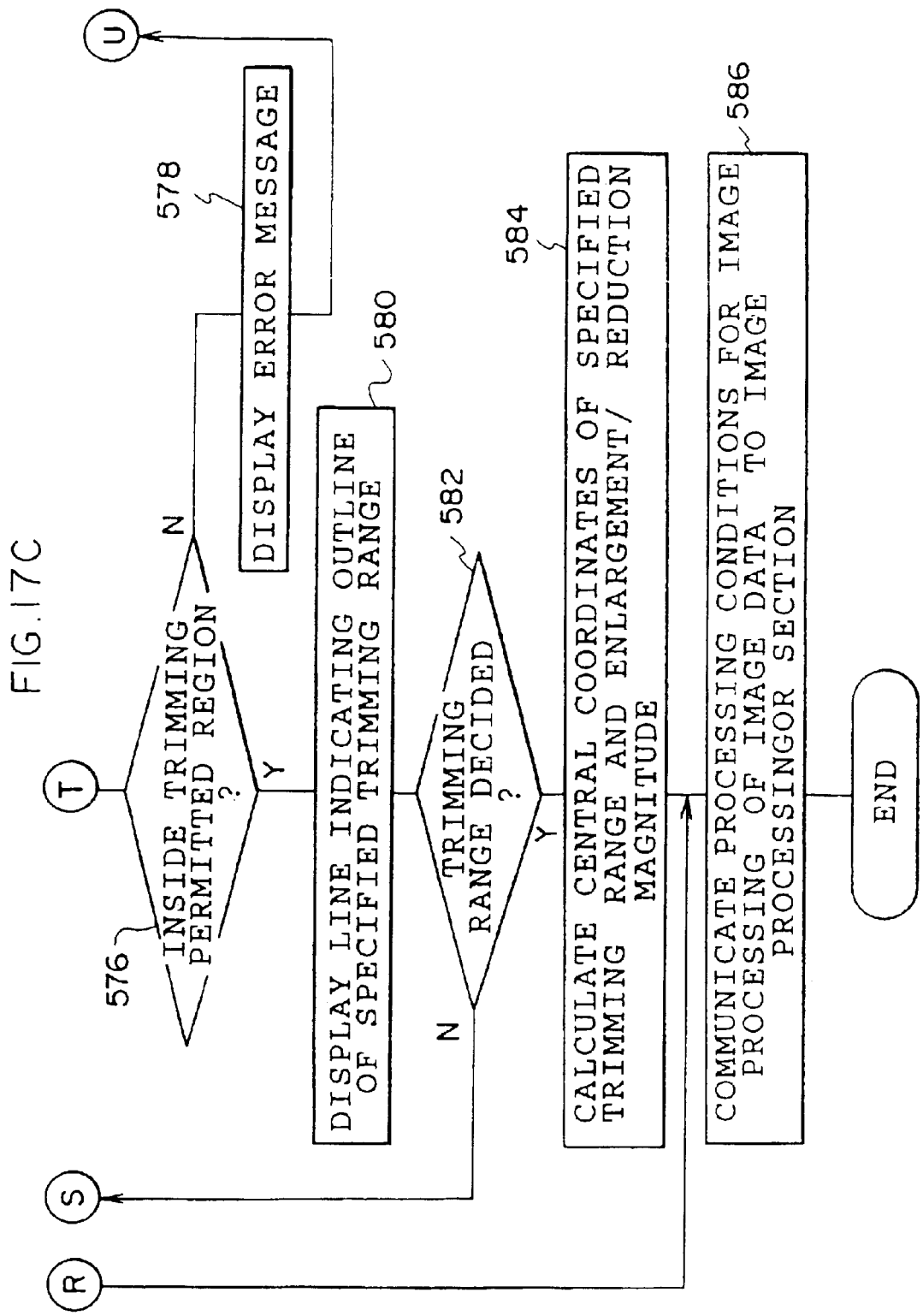

CENTER TRIMMING

FREE TRIMMING

ORIGINAL IMAGE

IMAGE SUBJECTED TO LF ABERRATION CORRECTION AND ELECTRONIC POWER VARIATION PROCESSINGS ONLY IN DIRECTION y

IMAGE SUBJECTED TO LF ABERRATION CORRECTION AND ELECTRONIC POWER VARIATION PROCESSING ONLY IN DIRECTION x

ORIGINAL IMAGE

IMAGE SUBJECTED TO LF ABERRATION CORRECTION AND ELECTRONIC POWER VARIATION IN DIRECTION y

IMAGE AFTER IMAGE VOID PORTIONS IN DIRECTION y HAVE BEEN EXCLUDED

IMAGE SUBJECTED TO LF ABERRATION CORRECTION AND ELECTRONIC POWER VARIATION IN DIRECTION x

OUTPUT IMAGE (IMAGE AFTER IMAGE VOID PORTIONS IN DIRECTION X HAVE BEEN EXCLUDED)

INDEX PRINT PRODUCING METHOD, IMAGE PROCESSING SYSTEM, IMAGE PROCESSING METHOD AND IMAGE PROCESSING DEVICE

This is a divisional of application Ser. No. 09/321,765 filed May 28, 1999, now U.S. Pat. No. 6,801,334; the disclosure of which is incorporated herein by reference.

BACKGROUND OF THE INVENTION

1. Field of the Invention

The present invention relates to an index print producing method, an image processing system, an image processing device and an image processing method. More particularly, the present invention relates to a method of producing an index print in which a plurality of images are disposed in a predetermined layout; an image processing system in which the index print producing method can be used; an image processing method and an image processing device which are capable of correcting aberrations when an image recorded on a photosensitive material is image processed; an image processing device having functions of image processing image data such that the outer peripheral shape of an image represented by the image data is changed and extracting data corresponding to an instructed range from the image data; an image processing method for correcting at least one of a geometrical distortion or a color misregistration of an image of image data representing an image projected through a lens; and an image processing device to which the image processing method can be applied.

2. Description of the Related Art

Conventionally, a photographic film having a plurality of images recorded thereon has been developed by exposure-recording the plurality of images onto photographic paper in such a way that the images are arranged in a matrix configuration on a single sheet, thereby creating what is known as an index print (refer to Japanese Patent Application Laid-Open (JP-A) No. 9-90528 and the like). By referring to the index print, a user is able, with one glance, to confirm the images recorded on the photographic film. Therefore, the user is able to easily specify images which the user wishes to be reprinted and to organize the photographic films.

On the other hand, an image processing system is known which subjects, to a variety of image processings, image data obtained by reading film images recorded on a photographic film or image data input from a digital camera or the like. After the various image processings have been completed, the images are recorded on a recording material, such as photographic paper, displayed on a display means, such as a display unit, or the image data is stored on an information recording medium. Thus, the image processing system is able to output the image (a main image) in a variety of forms. As compared with the conventional photograph processing system for recording a film image on photographic paper by a single exposure of the surface of the photographic paper, the above-described image processing system is able to arbitrarily control the quality of a recorded image by processing image data of the image. Therefore, the quality of a main image (an image recorded on a recording material, an image displayed on a display means or an image indicated by image data stored in an information recording medium) can be improved.

The above image processing system is able to employ a plurality of standard image processings for improving the quality of the main image. The standard image processings include gradation conversion, color conversion, a hyper-tone processing for compressing the gradation of extremely low frequency luminance components in an image and a hyper-sharpness processing for emphasizing sharpness while suppressing graininess are selectively performed on each image unit (or a film unit) Non-standard image processings include: an image processing for improving the quality of a main image when an image recorded by photography using a film with an attached lens is used as the original image (for example, processings to correct distortions in the original image caused by distortion aberrations in the lens and processings to correct color misregistration with the original image caused by color aberrations from the lens magnification); an image processing to intentionally change the image tone (for example, image processings to give a monotone completed image from a main image, a portrait tone completed image from a main image, and a sepia tone completed image from a main image); and an image processing to process an image (for example, an image processing to slenderize in the main image a person appearing in the original image) These non-standard image processings are selected to be automatically executed or selectively executed in accordance with an instruction issued from a user.

The above-described image processing system is structured so that the data of an original image is temporarily stored in a memory, the data of the original image is then read from the memory, and the read data of the original image is then subjected to an image processing in accordance with the contents (whether or not each type of image data processing is executed and the processing conditions of executed image data processings) of the processing previously determined on the basis of the results of analysis of the contents of the image. Thus, image data of the main image is output as data. Therefore, when an index print is produced, the data of a plurality of original images to be recorded as the index print are disposed in the memory in accordance with a predetermined layout. Thus, image data for producing the index print is produced. Then, the image data is read from the memory and subjected to image processing having a fixed content. Image data subjected to the image processing is used to expose and record the index print image on a recording material. Thus, the index print can be produced.

As described above, the aforementioned image processing system produces an index print by subjecting the data of a plurality of original images to image processing having a fixed content. Therefore, images which are recorded as the index print usually contain a multiplicity of images in finished states considerably different from the finished state of the main image (for example, images subjected to additional non-standard image processing when the main image is output). The reason for this lies in the fact that image processing is performed having a content which is considerably different from the content of the image processings which are performed to output the main image.

When output is performed such that, for example, a main image is recorded on a recording material or a main image is displayed on a display means, referring to each image on the index print does not always enable the finished state of the main image corresponding to each image to be recognized. Therefore, it is not always possible to ascertain which of the plurality of main images output from the image processing system corresponds to a particular image on the index print. When output is performed by storing the image data on an information recording medium, the main image represented by the image data stored on the information recording medium cannot visually be recognized. Therefore, the service of producing and making available the index print is an advantageous service which enables the main image to be confirmed. However, since the finished state of each image on the index print is sometimes considerably different from the finished state of the main image, there is a fear that the finished state of the main image represented by the image data stored on the information recording medium will be incorrectly recognized.

A conventional image processing device is known which obtains digital image data of a film image by using a sensor, such as a CCD, to read the film image recorded on a photographic film and then prints and exposes the image on photographic paper in accordance with the obtained digital image data.

In recent years, this type of image processing device has enabled stable print quality by subjecting obtained image data to a variety of correction processings. For example, chromatic aberration of magnification (the position of a pixel is different for each R, G, B color) and distortion aberration (the image is distorted) which easily occur when a low-cost camera, such as a film with an attached lens or a compact camera, is used to take a photograph can be corrected.

However, when the above-mentioned aberration correction is performed, the following problem arises: when, for example, distortion aberration correction is performed, an image such as that shown in FIG. 11A becomes what is known as a pincushion distorted image as shown in FIG. 11B. In this case, regions having no image indicated by the diagonal lines in the figure, that is, what are known as image voids occur. Therefore, a satisfactory printed image cannot be obtained. Because of this, the rectangular region 306 (marked by the dotted lines in FIGS. 11B and 11C) containing no image void regions is enlarged to the desired print size so that a printed image with no image voids is obtained. However, if the face of a person is positioned at an edge of the image as shown in FIG. 11B, a portion of the face is, cut out on the printed image even though the face was photographed in its entirety.

A conventional image processing system is known in which image data obtained by reading a film image recorded on a photographic film or image data input from a digital camera is subjected to a variety of image processings. The image is then recorded on a recording material, such as photographic paper, or the image data is stored on an information recording medium. Thus, output of the image can be performed in a variety of forms. As compared with the conventional photograph processing system for recording a film image on photographic paper by a single exposure of the surface of the photographic paper, the above image processing system is able to freely control the image quality of the output image by performing image processing on the image data, allowing the quality of the output image can be improved.

If image output is again requested, the above image processing system is able to perform a processing known as cropping in which image data in an arbitrary range (a range instructed by the user)is extracted; an image in the instructed range is enlarged and recorded (the cropping range) using image data subjected to an enlarging by electronic power variation; and image data is stored in an information recording medium. Note that when the cropping processing is carried out, the original image which is to be cropped is displayed on a display unit and the cropping range is instructed by the user who indicates on the surface of a display unit the positions of the edge of the range to be cropped, thus allowing the cropping range to be recognized on the basis of the indicated edge positions.

Since a film with an attached lens usually incorporates a low-cost plastic lens, aberration, such as distortion aberration and chromatic aberration of magnification, is great. A film image exposed and recorded on a photographic film using a film with an attached lens undergoes relatively considerable geometrical distortion aberration (called "pincushion distortion aberration") as shown in FIG. 16A (note that FIGS. 16A and 16B show an example in which an image having a multiplicity of lines disposed in a lattice configuration has been photographed and recorded on a photographic film using a film with attached lens). Moreover, relatively considerable color misregistration caused by chromatic aberration of magnification of the lens takes place. Therefore, an attempt has been considered to obtain an output image having excellent quality from the image of the above type by performing distortion aberration correction to correct geometrical distortion aberration of an image caused by distortion aberration of the lens. Moreover, an attempt has been considered to correct chromatic aberration of magnification such that color misregistration of an image caused by chromatic aberration of magnification of the lens is corrected.

For example, distortion aberration correction is performed by measuring and storing in advance data for each type of lens for correcting distortion aberration indicating the direction and distance moved by the position of each pixel caused by the distortion aberration of the lens with respect to an original reference position (a lattice point) of each pixel constituting a film image. Then, data for correcting the distortion aberration for the type of lens used in the photographing operation is fetched for the image data to be processed. On the basis of the fetched data for correcting the distortion aberration, the position of each pixel represented by the data of each pixel when no distortion aberration occurs is determined. Thus, the density value at the original position (the lattice position) is obtained by performing interpolation calculation.

However, since the image data is data having a large data quantity and representing an image spreading two-dimensionally, the contents of the processings to correct aberration, such as distortion aberration correction and correction of chromatic aberration of magnification are complicated. Therefore, a long time is required to complete the processing and a storage means having a large capacity must be provided. As a result, there arises a problem in that the structure of an image processing section for performing the processing for correcting aberration becomes too complicated. What is worse, the processing performance of the image processing system deteriorates.

For example, distortion aberration correction is performed by measuring and storing in advance data for each type of lens for correcting distortion aberration indicating the direction and distance moved by the position of each pixel caused by the distortion aberration of the lens with respect to an original reference position (a lattice point) of each pixel constituting a film image. Then, data for correcting the distortion aberration for the type of lens used in the photographing operation is fetched for the image data to be processed. On the basis of the fetched data for correcting the distortion aberration, the position of each pixel represented by the data of each pixel when no distortion aberration occurs is determined. Thus, the density value at the original position (the lattice position) is obtained by performing interpolation calculation. Among the above processings, the interpolation calculation of the density value at a lattice point position requires that the density values at the lattice point position be estimated for each of the two-dimensionally distributed plurality of lattice points from the density values of the plurality of pixels existing around the lattice point (the pixels in a region two-dimensionally spreading from the lattice point). Therefore, the processing is extremely complicated.

Because the distortion aberration correction is correction which goes together with the movement of the positions of pixels represented by pre-corrected image data, the shape of the image represented by the corrected image data is also changed from a rectangular shape to a non-rectangular shape (for example, to a barrel shape or a pincushion shape) by the aberration correction. If an image in a pincushion shape and having geometrical distortion aberration as shown in FIG. 16A due to distortion aberration is subjected to distortion aberration correction, the shape of the image represented by the corrected image data is formed into a barrel shape as shown in FIG. 16B. Since the outline of an image usually has a rectangular shape, the cropping range is formed into a rectangular shape to match the shape of the image. Therefore, when an instruction is given to execute cropping of an image which is to undergo distortion aberration correction with the image, represented by image data not having undergone distortion compensation correction, displayed on a display unit, then, on the basis of the displayed image, if a range including areas outside the outline of an image represented by corrected image data is indicated as the range to be cropped, blank areas and areas where the density values are uncertain occur in portions of the cropped image (the blank areas, known as image voids, shown in the four corners of the image in FIG. 16B). Moreover, since the correction of chromatic aberration of magnification is also a correction accompanying a movement of the positions of pixels, in spite of the distance moved being very small, a equivalent problem arises.

To prevent the above problem, specification of the range to be cropped is required to be performed as follows: a user recognizes whether or not the specified image is an image to be subjected to aberration correction. If the specified image is an image to be subjected to the aberration correction, the user must determine the range in the original image which is able to be cropped. Therefore, a complicated operation for specifying the range to be cropped is required. In addition, the user cannot specify an appropriate range to be cropped, and as a result, there is the concern that blank areas or images having uncertain density values will be formed in portions of the cropped image.

SUMMARY OF THE INVENTION

In view of the above, an object of the present invention is to provide an index print producing method and an image processing system in which an index print can be produced which has a plurality of images disposed in a predetermined layout such that the finished state of the main image of each image can easily be recognized.

Another object of the present invention is to provide an image processing method and an image processing device with which an image can be printed with no portions of the main object missing even if the, such as the face of a person, exists adjacent to an edge of the image when aberrations of the image read from a photographic film are corrected.

Another object of the present invention is to provide an image processing device which is capable of specifying with ease an appropriate extraction range when a portion is extracted and output from an image which is undergoing the image processing which accompanies a change in the shape of the outline of the image.

Another object of the present invention is to provide an image processing method which is capable of rapidly correcting distortion aberration or chromatic aberration of magnification of image data and preventing image voids from occurring in an output image.

Another object of the present invention is to provide an image processing device which is capable of rapidly performing correction of distortion aberration or chromatic aberration of magnification of image data by a simple structure and preventing image voids occurring in an output image.

To achieve the above objects, a first aspect of the present invention is an index print producing method used for an image processing system in which: the processing content of image processing of original image data of each original image of a plurality of original images is determined and the image processing is performed; and the image data which has undergone the image processing is used to perform a main image output processing comprising at least one of recording the image on a recording material, displaying the image on a display means, and storing the image data on an information recording medium, wherein said index print producing method comprises the steps of: a first image processing equivalent to the image processing performed at the time of the output of the main image is performed on the original image data of the plurality of original images or a second image processing is performed to append information representing the processing contents of the image processing performed at the time of the output of the main image to the original image data of the plurality of original images, the image data of the plurality of original images having undergone the first or second image processing is disposed in a predetermined layout, and recording of the images on an image recording material is performed using the image data disposed in the predetermined layout to create an index print.

The index print producing method according to the first aspect of the present invention subjects original image data of a plurality of original images to a first image processing equivalent to the image processing when the main image is output. As an alternative to this, a second image processing for adding information (for example, information indicating the contents of the processing by characters or a picture) indicating the contents of the image processings which are performed when the main image is output is performed. Data of the original image according to the present invention may be image data obtained by reading an image recorded on a recording medium, such as a photographic film. As an alternative to this, data of the original image may be image data recorded on an information recording medium as a result of photography using a digital camera or image data produced by a computer. The image data of the plurality of original images subjected to the first image processor the second image processing are then disposed in a predetermined layout, and the, image data disposed in the predetermined layout is used to record the image on a recording material to produce an index print.

When the original image data of a plurality of original images is subjected to the first image processing, each completed image on the index print is substantially the same as the corresponding completed main image among the main images (images recorded on a recording material, images displayed on a display means or images indicated by image data stored on an information recording medium) output in the main-image output processing. Therefore, each completed main image can easily visually be recognized. When original image data of the plurality of original images has been subjected to the second image processing, each completed image on the index print does not necessarily coincide with the completed main image. However, by referring to the information added in the second image processing the contents of the image processings which are performed when the main image is output may be easily be recognized. As a result, the completed main image can easily be ascertained.

Therefore, the index print producing method according to the first aspect of the present invention enables an index print having a plurality of images disposed in a predetermined layout to be produced in such a way that the completed main image of each of the images can easily be recognized. Namely, by referring to each image on the index print, it can be easily ascertained which of the plurality of main images output from the image processing system corresponds to which image on the index print.

The image processing performed when the main image is output may include any one of the following processings: gradation conversion, color conversion, enlargement/contraction of the main image, a hyper-tone processing for compressing the gradation of extremely low frequency illuminance components of the main image, a hyper-sharpness processing for emphasizing the sharpness while suppressing graininess, an image processing for correcting color misregistration of the original image caused by chromatic aberration of magnification, an image processing for correcting distortion of the original image caused by the distortion aberration, an image processing for putting a monotone finish on the main image, an image processing for putting a portrait finish on the main image, an image processing for putting a sepia finish on the main image, an image processing using a cross filter to change the tone of the main image to the tone equivalent to that of the photographed image, an image processing for modifying red-eye and an image processing to slenderize the body of a person appearing in the original image in the final image.

A second aspect of the present invention is an index print producing method according to the first aspect of the present invention, wherein, when said second image processing is performed on original image data in the production of an index print, only an image processing equivalent to a standard image processing from among the image processings when said main image is output is performed on said original image data for each image, and information indicating non-standard image processings separate from said standard image processings performed when said main image is output is appended to said original image data.

A standard image processing may be employed in the index print producing method according to the second aspect of the present invention (for example, gradation conversion, color conversion, enlargement/contraction of the main image, a hyper-tone processing for compressing the gradation of extremely low frequency luminance components of the main image, or a hyper-sharpness processing for emphasizing the sharpness while suppressing graininess). These image processings are commonly performed on all (or almost all) data of the original image.

In the index print producing method according to the second aspect of the present invention, when a second image processing is performed on the original image data of a plurality of original images in the production of the index print, only an image processing equivalent to a standard image processing from among the image processings when the main image is output is performed on the original image data for each image, and information indicating non-standard image processings separate from the above standard image processings performed when the main image is output is appended to the original image data. Therefore, by referring to the information for a specific image appended to the index print, the contents of the image processings at the time the main image was output can be easily ascertained and the completed main image can be easily recognized. Moreover, by referring to a specific image on the index print, a completed main image produced when image processings other than standard image processings were not performed can be easily recognized, and when the output of a specific image is instructed again, the user can easily choose whether or not to perform an image processing other than a specific image processing.

A third aspect of the present invention is an index print producing method according to the first aspect of the present invention, wherein, when the second image processing is performed on the original image data in the production of an index print, if an original image has portions cut out from the main image by the image processing when the main image is output, then a frame indicating the portions cut out from the main image is superimposed and recorded on the image on an index print corresponding to the original image or the completing of the cut out portion on the image on the index print is changed.

When an image processing for correcting distortion of a particular original image caused by distortion aberration of the lens of a camera or the like is performed as an image processing which is performed when a main image is output, a portion of the particular original image is cut out from the main image and is not used as the main image. However, in a case where the second image processing of data of the original image is performed when the index print is produced, an image processing equivalent to the image processing for correcting the distortion of the original image caused by the distortion aberration must be performed. If this image processing is not performed, then the image recording range corresponding to the particular original image on the index print will not match the range which is used as the main image on the particular original image (matches instead the overall range of the particular original image).

In contrast to this, the index print producing method according to the third aspect of the present invention has a structure that when the second image processing of data of the original image is performed in a case of producing an index print, a frame (a frame indicating the outline of the range which is used as the main image) indicating a portion which is cut out from the main image is superposed and recorded on the image of the index print corresponding to the original image in which the portion is cut out from the main image by an the image processing which is performed when the main image is output or finishing of the portion which is cut out and which is positioned on the image of the index print is changed (for example, the portion cut out from the main image may be formed into a monotone image, the saturation and lightness may be lowered or the resolution may be considerably lowered). If an image having a portion which is cut out from the main image by an image processing which is performed when the main image is output exists, by referring to the index print the portion which is cut out from the main image may easily be recognized.

A fourth aspect of the present invention is an index print producing method according to the first aspect of the present invention, wherein, when an index print is produced, a selection is made as to whether a first image processor a second image processing will be performed on the original image data of a plurality of original images, and either the first image processor second image processing is performed on the original image data of the plurality of original images on the basis of the results of the selection.

As described above, the index print produced by performing the first image processing onto data of the original image and the index print produced by performing the second image processing on the data of the original image have different characteristics. The index print producing method according to the fourth aspect of the present invention has the structure that a selection is made as to which to the first image processor the second image processing will the data of the plurality of original images be subjected, and the data of the plurality of original images is subjected to the first image processor the second image processing in accordance with the results of the selection to produce an index print. Therefore, either of the two types of index print can selectively be produced to meet requirements of the user.

A fifth aspect of the present invention is an image processing system in which, the processing content of image processing of original image data of each original image of a plurality of original images is determined and the image processing is performed; and the image data which has undergone the image processing is used to perform a main image output processing comprising at least one of recording the image on a recording material, displaying the image on a display means, and storing the image data on an information recording medium, wherein said image processing system comprises: processing means for performing a first image processing equivalent to the image processing when said main image is output or a second image processing for appending information indicating the processing content of the image processing when said main image is output on the original image data of said plurality of original images; disposing means for disposing the data of each image of the plurality of original images which have undergone either said first image processor said second image processing in a predetermined layout; and producing means for recording an image on a recording material using image data disposed in said predetermined layout to produce an index print.

The image processing system according to the fifth aspect of the present invention comprises processing means for performing a first image processing of the data of the plurality of original images equivalent to the image processing which is performed when the main image is output or a second image processing for appending information indicating the content of the image processings which are performed when the main image is output; disposing means for disposing the image data of the plurality of original images subjected to the first image processor the second image processing in a predetermined layout; and producing means for producing an index print by using the image data disposed in the predetermined layout to record an image on a recording material. Therefore, in the same way as the first aspect of the present invention, an index print having a plurality of images disposed in a predetermined layout can be produced such that the completed main image of each image can easily be recognized.

A sixth aspect of the present invention is an image processing method comprising the steps of: reading information on the characteristics of a photographic lens and an image recorded on a photographic photosensitive material; extracting a main object from said read image; reading aberration correction information corresponding to the information on the characteristics of said photographic lens; determining whether or not said main object will be positioned in the image void region when an image aberration correction is performed on the basis of information on the position of the extracted said main object and said aberration correction information; and performing said aberration correction if it is determined that said main object will not be positioned in the image void region.

A seventh aspect of the present invention is an image processing method, wherein, said aberration correction is not performed if it is determined that said main object will be positioned in the image void region.

A eighth aspect of the present invention is an image processing method, wherein, if it is determined that said main object will be positioned in the image void region, said aberration correction is performed to the extent that said main object is not positioned in the image void region.

The image processing method according to the sixth aspect of the present invention has the steps of reading information on the characteristics of a photographic lens and an image recorded on a photographic photosensitive material; and extracting a main object, for example, the face portion of a person, from the read image. Information about the characteristics of the photographing lens may include information on the type of photographic lens, a lens aberration correction formula for correcting aberrations in the read image (described later in detail) the correction coefficient for the aberration correction formula, information on the type of camera, and the like. Information about the characteristics of the photographic lens may be optically recorded in advance (e.g. by a bar code or the like) or magnetically (e.g. at the time of manufacture) outside the image recording region on the photographic photosensitive material, or the information above may be recorded from the camera. Subsequently, the aberration correction information corresponding to the read information on the characteristics of the photographic lens is read. The face may be extracted by any one of a variety of known methods. For example, the face portion of a person can be extracted by obtaining the outline thereof by measuring edge intensities of 8 pixels surrounding each pixel. In accordance with the position information of the main object thus-obtained and the aberration correction information, a determination is made whether or not the main object will be positioned in an image void region if the aberration correction is performed. If a determination is made that the main object will not be positioned in the image void region, the aberration correction is performed. If a determination is made that the main object will be positioned in the image void region, the aberration correction is not performed according to the image processing method according to the seventh aspect of the present invention. As a result, image voids in the face portion of a person in the printed image can be prevented.

The image processing method according to the eighth aspect of the present invention may be employed, in which aberration correction is performed to the extent that the main object does not become positioned in the image void region. As a result, the distortion of the image can be moderately corrected and the face of a person can be included in the printing range.

A ninth aspect of the present invention is an image processing method, wherein the determination whether or not to perform said aberration correction is made on the basis of order information from a customer.

When the image processing method according to the ninth aspect of the present invention is employed, order information, such as whether precedence should be given to aberration correction, or whether precedence should be given to containing the main object inside the printing range can be given, and a determination as to whether or not to perform aberration correction made on the basis of this order information. As a result, a printing processing which meets the requirements of the user can be performed.

A tenth aspect of the present invention is an image processing device comprising: photographic lens characteristics information reading means for reading the information on the characteristics of a photographic lens; image reading means for reading an image recorded on a photographic photosensitive material; extraction means for extracting the main object from the read image using said image reading means; storage means for storing in advance aberration correction information corresponding to said photographic lens characteristics information; aberration correction information reading means for reading said aberration correction information from said storage means; and determining means for determining whether or not said main object will be positioned in the image void region if an image aberration correction is performed, on the basis of information on the position of said main object extracted by the extracting means and said aberration correction information.

A eleventh aspect of the present invention is an image processing device, wherein, if it is determined by the determining means that the main object will be positioned in the image void region, the aberration correction is not performed.

A twelfth aspect of the present invention is an image processing device, wherein, if it is determined by the determining means that the main object will be positioned in the image void region, the aberration correction is performed to the extent that the main object is not positioned in the image void region.

The image processing device according to the tenth aspect of the present invention causes the means for reading the information of the characteristics of the photographic lens to read the information of the characteristics of the photographic lens. Moreover, the image reading means reads the image recorded on the photographic photosensitive material. Information about the characteristics of the photographic lens includes, for example, the information of the type of photographic lens, a lens-aberration correction formula for correcting aberrations in the read image (described below in detail), the correction coefficient for the aberration correction formula, information on the type of camera, and the like. Information about the characteristics of the photographic lens may be optically recorded in advance (e.g. by a bar code or the like) or a magnetically (e.g. at the time of manufacture) outside the image recording region on the photographic photosensitive material, or the information may be recorded from the camera. The main object of the read image, for example, the face portion of a person, is extracted by the extracting means. Information about the aberration correction corresponding to the read information on the characteristics of the photographic lens is read from the storage means by the means for reading the aberration correction information. In accordance with the extracted position information of the main object and the aberration correction information, whether or not the main object will be positioned in the image void region if the aberration correction is performed is determined by the determining means. If a determination is made that the main object will not be positioned in the image void region, the aberration correction is performed. If the main object will be positioned in the image void region, then, for example, the aberration correction is not performed with the image processing device according to the eleventh aspect of the present invention. As a result, image voids in the face portion of a person in the printed image can be prevented.

If a determination is made by the determining means of the image processing device according to the twelfth aspect of the present invention that the main object will be positioned in the image void region, the aberration correction is performed to an extent that the face of the person is not positioned in the image void region in the image processing device according to the twelfth aspect of the present invention. As a result, the distortion of the image can be moderately corrected and the face of the person can be included in the printing range.

A thirteenth aspect of the present invention is a image processing device, wherein the determination whether or not to perform the aberration correction is made on the basis of order information from a customer.

The image processing device according to the thirteenth aspect of the present invention has the structure that whether priority is given to performing the aberration correction or to including the main object in the printing range can be specified as the order information. In accordance with the order information, whether or not the aberration correction is performed is determined. As a result, a printing processing which meets the requirements of a user can be performed.

A fourteenth aspect of the present invention is an image processing device comprising: processing means for performing an image processing on image data in accordance with changes in the shape of the outline of an image represented by the image data; display means for displaying an image; instructing means for instructing a range cut from an image on the basis of an image displayed on the display means; cutting means for cutting data corresponding to the range indicated by the instructing means from the image data; and display control means for controlling so that a range of an image represented by the image data which excludes the range where an image cannot be cut created by an image processing using the processing means is displayed on the display means, or an image represented by the image data which is divided into regions where the image can be cut and regions where the image cannot be cut is displayed on the display means.

The image processing device according to the fourteenth aspect of the present invention comprises the specifying means for specifying the range to be cut from the image in accordance with the image displayed on the display means for displaying the image. The specifying means may be, for example, a pointing device, such as a mouse or a digitizer. The cutting means cuts, from image data, data corresponding to the range specified by a user via the specifying means. The processing for cutting data from image data is performed when, for example, cropping is performed in which a portion is cut from the image and output. The cutting range is specified by, for example, specifying positions on the display screen of the display means corresponding to positions of the outline (when the cutting range is in the form of a rectangular shape, the positions are the four corner points of the cutting range) In the above case, the cutting means determines the positions (the positions along the outline of the cutting range) on the image from the positions specified on the display screen, and then cuts data corresponding to the cutting range.

The image processing device according to the fourteenth aspect of the present invention comprises the processing means which performs an image processing including a change in the outline of the image represented by the image data. The above image processing may be an image processing in which the difference between image data before and after the processing causes the positions of pixels on the image to be changed. For example, the image processing device according to the fifteenth aspect of the present invention is arranged to perform a distortion aberration correction processing for correcting geometrical distortion aberration of the image caused by the distortion aberration of the lens or a processing for correcting chromatic aberration of magnification for correcting color misregistration caused by the chromatic aberration of magnification when image data indicates an image projected through the lens. The above image processing may be a correction processing for correcting geometrical distortion aberration of an image caused by a factor other than the aberration of the lens. The above image processing should be an image processing in accordance with a change (specifically, a change to a non-equivalent shape) in the outline of the image.

When the image processing in accordance with a change in the outline of the image represented by image data is performed as descried above, there is a possibility that a range which includes a range outside the outline of the image represented by the image data, which has been image-processed, will be specified as the cutting range, based on the image displayed on the display means. On the other hand, the display control means of the image processing device according to the fourteenth aspect of the present invention controls so that a range of an image represented by the image data which excludes the range where an image cannot be cut created by an image processing using the processing means is displayed on the display means, or an image represented by the image data which is divided into regions where the image can be cut and regions where the image cannot be cut is displayed on the display means.

Specifically, the displaying processing in which the range from which the image can be cut and the range from which the image cannot be cut are distinguished from each other can be performed by indicating the boundary between the two ranges using a line. As alternatives to this, only the range from which the image cannot be cut may be displayed in a monochrome tone or the saturation of the above range to be displayed may be lowered. As a result, by referring is made to the image displayed on the display means, the user is able to easily recognize the range from which an image cannot be cut. Therefore, when a portion is cut from an image which is subjected to the image processing in accordance with a change in the outline so as to be output, the user is able to easily instruct the appropriate cutting range which does not include the range from which the image cannot be cut.

A case will now be described in which image data is image data representing an image (an image projected through, for example, a lens and recorded on a recording material, such as a photographic photosensitive material) projected through a lens. Moreover, the processing means performs as the image processing in accordance with the change in the outline of the image data represented by image data at least one of a distortion aberration correction processing or the processing for correcting chromatic aberration of magnification. In this case, the fifteenth aspect of the present invention further comprises acquiring means for acquiring information related to the characteristics of the lens. The processing means is able to perform at least one of a distortion aberration correction processing or the processing for correcting chromatic aberration of magnification on the basis of information related to the characteristics of the lens acquired by the acquiring means.

Information about the characteristics of the lens may be information representing the characteristics of the lens itself, information indicating a correction value for performing the distortion aberration correction processing or the processing for correcting chromatic aberration of magnification in accordance with the characteristics of the lens, information indicating the type of lens or information indicating the type of projector used for projecting the image (for example, a camera). As described above, when information relating to the characteristics of the lens, which is information indicating the type of lens or information (from which the type of lens can be determined) indicating the type of projector is acquired, the characteristics of the lens and the correction value for performing the distortion aberration correction processing or the processing for correcting chromatic aberration of magnification in accordance with the characteristics of the lens can indirectly be determined from the acquired information.

The characteristics of a lens including the distortion aberration and the chromatic aberration of magnification of the lens are different depending on the type of lens. The processing means of the image processing device according to the fifteenth aspect of the present invention corrects deterioration in the image quality caused by, for example, distortion aberration in the lens. On the basis of the information relating to the characteristics of the lens acquired by the acquiring means, the processing means determines the position of each pixel represented by the data of each pixel when the lens has no distortion aberration. Then, the processing means obtains the density level at the original position (the lattice position) by performing, for example, interpolation. Thus, the processing means is able to perform the distortion aberration correction processing (the above processing causes the position of each pixel of the image represented by image data to be changed thereby changing the outline of the image). As a result, deterioration in the image quality of the image arising from the chromatic aberration of magnification can accurately be corrected. The correction of the image quality arising from the chromatic aberration of magnification is performed by executing the processing for correcting chromatic aberration of magnification for each color component. Thus, deterioration in the image quality of the image arising from the chromatic aberration of magnification of the lens can accurately be corrected.

Information about the characteristics of the lens can be used to perform the distortion aberration correction processing and the processing for correcting chromatic aberration of magnification as described above. Moreover, the above information can be used to determine the position of the boundary between the range from which the image can be cut and the range from which the image cannot be cut. Namely, in the image processing device according to a sixteenth aspect of the present invention, the display control means according to the fifteenth aspect of the present invention determines the positions of the border between the range where the image can be cut and the range where the image cannot be cut on the basis of information relating to the characteristics of the lens acquired by the acquiring means.

As described above, the processing means performs the distortion aberration correction processing and the processing for correcting chromatic aberration of magnification on the basis of information relating to the characteristics of the lens. When, on the basis of this information relating to the characteristics of the lens, the distortion aberration correction processing or the processing for correcting chromatic aberration of magnification is performed as the image processing in accordance with the change in the outline of the image, the way in which the outline of the image represented by the image data will change can, therefore, be accurately determined. As a result, on the basis of the determination of outline of the image, the positions of the border between the range where the image can be cut and the range where the image cannot be cut can accurately be determined.

The processing means according to the present invention is not limited to perform the image processing including change in the outline of the image, such as the distortion aberration correction processing and the processing for correcting chromatic aberration of magnification. When image data is image data representing an image projected via a lens, an image processing device according to a seventeenth aspect of the present invention may have a structure wherein, on the basis of a central position of an image represented by image data, a central position of a range instructed by the instructing means, and information related to the lens characteristics acquired by the acquiring means, the processing means performs at least one of: enlarging/reducing processing to enlarge or reduce an image represented by data cut out by the cutting means to a predetermined size; peripheral darkening correction processing to correct reductions in the luminosity in the edge portions of an image caused by the lens; and focal blurring correction processing to correct reductions in the sharpness of an image caused by the lens.

When the enlarging/reducing processing is performed, a so-called cropping processing in which a portion of the image is cut to enlarge or reduce the portion to the required size can be achieved. Specifically, the enlargement or the reduction of an image can be performed by making the number of pixels (the resolution) of the cut data coincide with the number of pixels (the resolution) corresponding to the output form (for example, recording on a recording material, display on a display means, storage of the image data on an information storage medium, or the like) of the image. The numbers can be made to coincide with each other by an operation of the cutting means to convert the number of pixels (the resolution) of cut data.

When the image data to be processed is image data representing an image projected through a lens having relatively low performance, (for example, a film with an attracted lens or the lens of another low cost camera) there sometimes arises the problem that the image quality deteriorates according to the performance of the lens (when above-described cropping or the like is performed, considerable deterioration in the image quality is visually recognized). In this type of above case, the marginal light-extinction correction processing or the blurred focus correction processing from among the various processings which can be performed by the image processing device according to a seventeenth aspect of the present invention is performed. The image quality of the image represented by data cut by the cutting means can be improved.

An eighteenth aspect of the present invention is an image processing method comprising the steps of: correcting in image data representing an image projected via a lens at least one of geometrical distortion and color misregistration of the image arising from an aberration in the lens in a first predetermined direction; extracting image data corresponding to an area inside an effective image region from which image voids at both ends in the first predetermined direction of the image represented by the image data have been excluded from the image data which has undergone the correction in the first predetermined direction; correcting in the extracted image data at least one of geometrical distortion and color misregistration of an image represented by the image data in a second predetermined direction orthogonal to the first predetermined direction; and extracting image data corresponding to an area inside an effective image region from which image voids at both ends in the second predetermined direction of the image represented by the image data have been excluded from the image data which has undergone the correction in the second predetermined direction.

The image processing method according to the eighteenth aspect of the present invention is provided to correct at least either geometrical distortion or color misregistration of an image projected via a lens and indicated by image data which has been caused by aberration of the lens in at least a first predetermined direction. When at least one of the geometrical distortion or color misregistration of the image is corrected in one direction (in the first predetermined direction in this case), the movement direction of the position of the pixel caused by the correction is also limited to one direction. Therefore, for example, the interpolation can be performed by using data of n pixels (data of pixels in a region having no 2D spread and including 1×n pixels) disposed in the one direction. Therefore, at least one of the geometrical distortion or color misregistration of the image can easily be performed. Thus, the above correction can quickly be performed.

The movement of the position of the pixels causes the outline of the image represented by the image data to be changed. When at least one of the geometrical distortion or color misregistration of the image is corrected in the first predetermined direction, the direction of change in the outline of the image is also limited to the first predetermined direction equivalent to the direction of movement of the positions of pixels. Therefore, the change in the outline of the image occurs at the two ends in the first predetermined direction of the outline of the image data represented by the image data. The image processing method according to the eighteenth aspect of the present invention extracts, from image data corrected in the first predetermined direction, image data corresponding to the effective image region from which image void portions at the two ends of the image represented by image data in the first predetermined direction has been excluded. Therefore, image data can be obtained which is free from image voids occurring in accordance with the correction of at least one of the geometrical distortion or the color misregistration of the image in the first predetermined direction. Note that the effective image region may be a rectangular region.

The image processing method according to the eighteenth aspect of the present invention is provided correct at least the geometrical distortion or color misregistration of the image represented by extracted image data corresponding to the effective image region in the second predetermined direction orthogonal to the first predetermined direction. Since the direction of movement of the positions of pixels which takes place in accordance with the correction is limited to the second predetermined direction, the above correction can quickly be performed in a simple manner. Since the second predetermined direction is orthogonal to the first predetermined direction, at least one of the geometrical distortion and color misregistration of the image is corrected in the second predetermined direction as well as in the first predetermined direction. As a result, at least one of the geometrical distortion and color misregistration of the image caused by the aberration of the lens can reliably be corrected.

The image processing method according to the eighteenth aspect of the present invention is provided to extract, from image data corrected in the second predetermined direction, image data corresponding to the effective image region from which image void portions at the two ends of the image represented by image data in the second predetermined direction have been excluded. Therefore, image data can be obtained which is free from image voids caused by the correction of at least one of the geometrical distortion and the color misregistration of the image in the second predetermined direction. Therefore, the image processing method according to the eighteenth aspect of the present invention is able to quickly correct the distortion aberration and chromatic aberration of magnification. As a result, image voids in the output image can be prevented.

A nineteenth aspect of the present invention is an image processing device comprising: a correcting section in which, in image data representing an image projected via a lens, at least one of geometrical distortion and color misregistration of the image arising from an aberration in the lens is corrected in a single direction; extracting means for extracting image data corresponding to an area inside an effective image region from which image voids at both ends in a direction identical to the direction of the correction performed in the correcting section on the image represented by the image data have been excluded from the image data which has undergone the correction in the correcting section; and controlling means for, in image data to be processed representing an image projected via a lens, correcting in the correcting section at least one of geometrical distortion and color misregistration of the image arising from an aberration in the lens in a first predetermined direction; extracting by the extracting means image data corresponding to an area inside the effective image region from the corrected image data; correcting by the correcting section at least one of geometrical distortion and color misregistration of an image represented by the extracted image data in a second predetermined direction orthogonal to the first predetermined direction; and extracting by the extracting means image data corresponding to an area inside the effective image region from the corrected image data.

The image processing device according to the nineteenth aspect of the present invention is provided to correct at least one of geometrical distortion or color misregistration of an image represented by image data to be processed in the first predetermined direction. Next, image data corresponding to the effective image region from which the image void portions at the two ends in the same direction (that is the first predetermined direction) as the above correction direction have been excluded is extracted from corrected image data. Next, at least one of the geometrical distortion or the color misregistration of the image represented by the extracted image data is corrected in the second predetermined direction orthogonal to the first predetermined direction. Next, image data corresponding to the effective image region from which the image void portions in the same direction (that is, the second predetermined direction) as the correction direction have been excluded is extracted from the corrected image data. Therefore, distortion aberration correction and the correction of chromatic aberration of magnification of image data can quickly be performed in the same way as in the eighteenth aspect of the present invention. As a result, image voids in the output image can be prevented.

The image processing device according to the nineteenth aspect of the present invention has a structure in which a single correction section corrects at least one of the geometrical distortion and color misregistration in the first predetermined direction and at least one of the geometrical distortion and color misregistration in the second predetermined direction of the image represented by the image data. Therefore, the necessity of providing a plurality of correcting sections each of which corrects at least one of the geometrical distortion or color misregistration can be eliminated. Therefore, the structure of the image processing device according to the nineteenth aspect of the present invention can be simplified.

When storage means for storing image data corrected by the correcting section is provided, extraction of image data corresponding to the effective image region can be achieved by the extracting means controlling the reading so that, whenever image data stored in the storage means is read, the extracting means only reads the image data corresponding to the effective image region, equivalently to, for example, the image processing device according to the twentieth aspect of the present invention.

Moreover, the extraction of image data corresponding to the effective image region can be achieved by the extracting means controlling the storing when image data which has undergone correction by the correcting section is stored in the storage means so that only image data corresponding to the effective image region is stored in the storage means, equivalently to, for example, the image processing device according to the twenty-first aspect of the present invention. In the above case, the quantity of image data to be stored in the storage means can be reduced as compared with the structure in which reading of image data from the storage means is controlled. Therefore, the storage capacity of the storage means can be saved or the capacity of the storage means can be reduced.

A twenty-second aspect of the present invention is an image processing device, in which the correcting section, in the nineteenth aspect of the present invention, corrects at least one of geometrical distortion and color misregistration in a single direction of an image in image data, and converts the image data so that the number of pixels in the same direction as the direction of the correction is set at a fixed value, the control means controls the correcting section so that, when correction is being performed in the first predetermined direction, the number of pixels in the image data in the first predetermined direction is set at a first fixed value, and the control means controls the correcting section so that, when correction is being performed in the second predetermined direction, the number of pixels in the image data in the second predetermined direction is set at a second fixed value.

When an image is recorded on, for example, a recording material and the number of pixels of the recorded image, which are determined by the recording size and recording density of the image, is not the same as the number of pixels of image data which is used to record the image, image data must be converted to make the number of pixels of image data coincide with the number of pixels of the image to be recorded. When the conversion of image data is performed in a state in which the number of pixels of the image to be recorded is not an integer fraction of the number of pixels of image data, interpolation must be performed. The interpolation is performed equivalently to the correction of the geometrical distortion or the color misregistration so as to obtain the density value at the position of each pixel when the intervals among pixels have been changed in accordance with the number of pixels of the image to be recorded. The interpolation may also be performed when the geometrical distortion or the color misregistration is corrected, however, since the image quality deteriorates (even through the deterioration is slight) when the interpolation is performed, repetition of the interpolation processing of the same image data is not preferatble.

The correcting section of the image processing device according to the twenty-second aspect of the present invention has the function of correcting in a single direction in image data at least one of the geometrical distortion or color misregistration of an image. Moreover, the correcting section has the function of converting image data such that the number of pixels in the same direction as the correction direction is set at a fixed value. Thus, the direction of movement of the positions of the pixels caused by the correction and the direction of adjustment of the number of pixels are the same. Therefore, the interpolation for the correction and the interpolation for converting the number of pixels can be unified enabling the interpolation to be completed in one operation.

When the correction in the first predetermined direction is performed, the control means controls the correcting section such that the number of pixels (or the number of pixels in the effective image region in the first predetermined direction) of image data in the first predetermined direction is set at the first fixed value. When the correction in the second predetermined direction is performed, the control means controls the correcting section such that the number of pixels (or the number of pixels in the effective image region in the second predetermined direction) of image data in the second predetermined direction is set at the second fixed value. Therefore, when the number of pixels of image data is converted in combination with the correction of at least one of the geometrical distortion or the color misregistration of the image, the conversion can be completed in two interpolation calculations. As a result, deterioration in the image quality of an output image can be prevented.

A twenty-third aspect of the present invention is an image processing device according to the fourteenth aspect, further comprising limiting means for limiting the range which can be instructed via said instructing means so as to exclude ranges where the image cannot be cut from a range instructed by said instructing means.

In the twenty-third aspect of the present invention, limiting the range which can be instructed via said instructing means can be achieved. For example, when the range instructed via said instructing means includes ranges where the image cannot be cut, limiting is achieved by informing by displaying a message on the display means or ringing a buzzer. When the range is limited by being drawn and superposed a frame representing the instructed range on the image displayed on the display means, limiting is achieved by being removed the frame or limiting drawing the frame so that the range where the image cannot be cut is not drawn.

Therefore, when an user, for example, as the range which is cut from the image, instructs the range including the region in the vicinity of the border between the range where the image can be cut and the range where the image cannot be cut, a mistake is prevented that the range including ranges where the image cannot be cut is instructed. The correct range excluding ranges where the image cannot be cut.

BRIEF DESCRIPTION OF THE DRAWINGS

FIGS. 4A, 4B and 4C are flow charts showing the content of a pre-scanning processing which is performed in the image processing section according to the first embodiment of the present invention.

FIG. 5 is an image diagram showing an example of the display of a simulation image on a display unit according to the first embodiment of the present invention.

FIG. 7A is a schematic view showing an example of an index print according to the first embodiment of the present invention when a non-standard image processing is reflected in the completed index images.

FIG. 7B is a schematic view showing an example of an index print according to the first embodiment of the present invention when a non-standard image processing is not reflected in the completed index images.

FIG. 7C is a schematic view showing an example of an index print according to the first embodiment of the present invention when a non-standard image processing is not reflected in the completed index images.

FIG. 10 is a flow chart showing the control routine according to the second embodiment of the present invention.

FIG. 13 is a block diagram showing the functions of an automatic setup engine and personal computer of an image processing section divided into blocks, and the internal structure of an image processor according to the third embodiment of the present invention.

FIGS. 17A, 17B and 17C are flowcharts showing the content of fine scanning processings which are performed when second or following image output processing are performed on each photographic film according to the third embodiment of the present invention.

DESCRIPTION OF THE PREFERRED EMBODIMENTS

Figure 1:
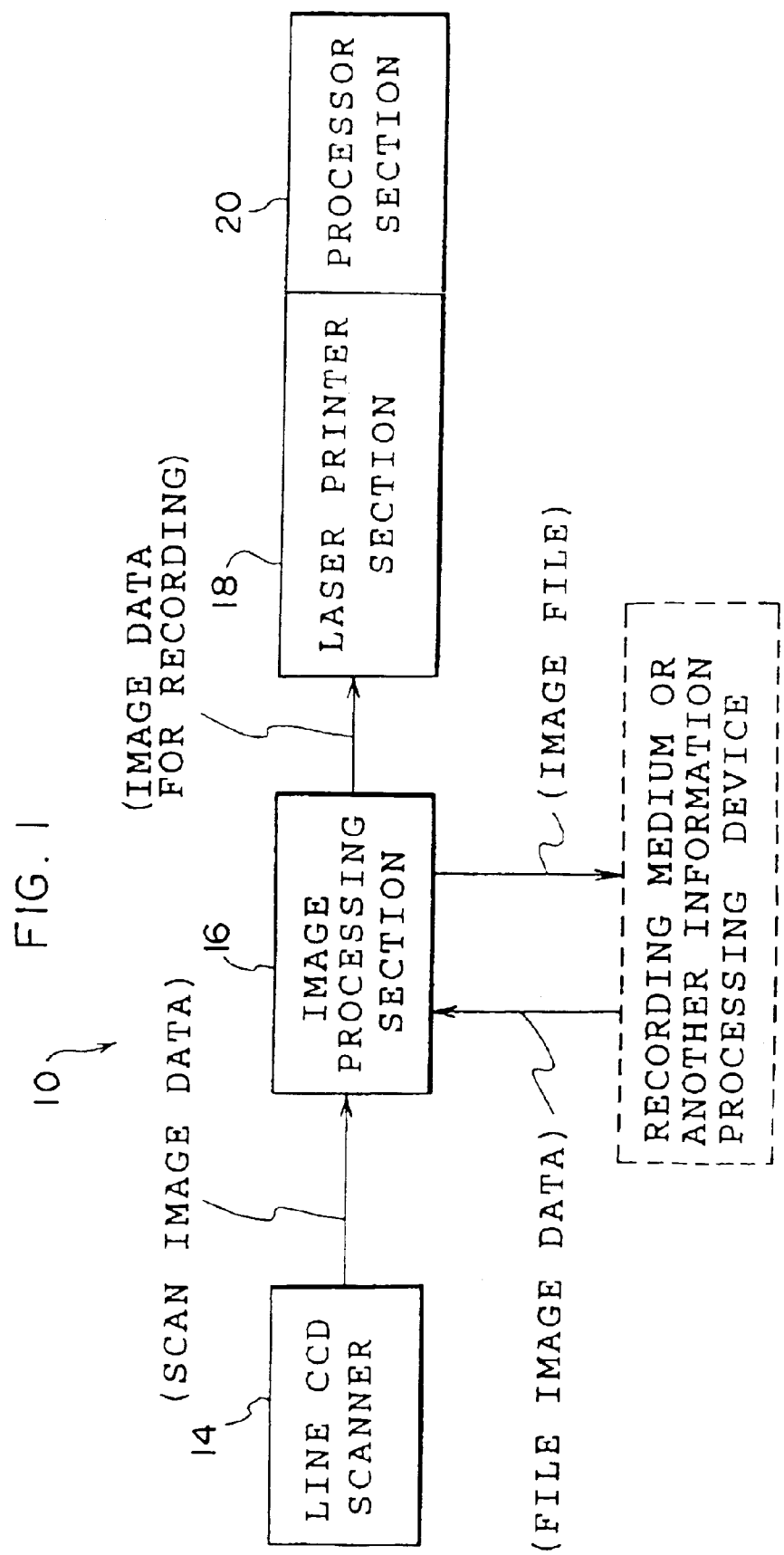
FIG. 1 is a schematic block diagram showing a digital laboratory system according to an embodiment of the present invention.

Referring to the drawings, the embodiments of the present invention will now be described in detail. Firstly the digital laboratory system according to the present embodiment which is structured so as to include the image processing device of the present invention will be described as the image processing system of the present invention.
(Schematic Structure of Overall System)

Figure 2:
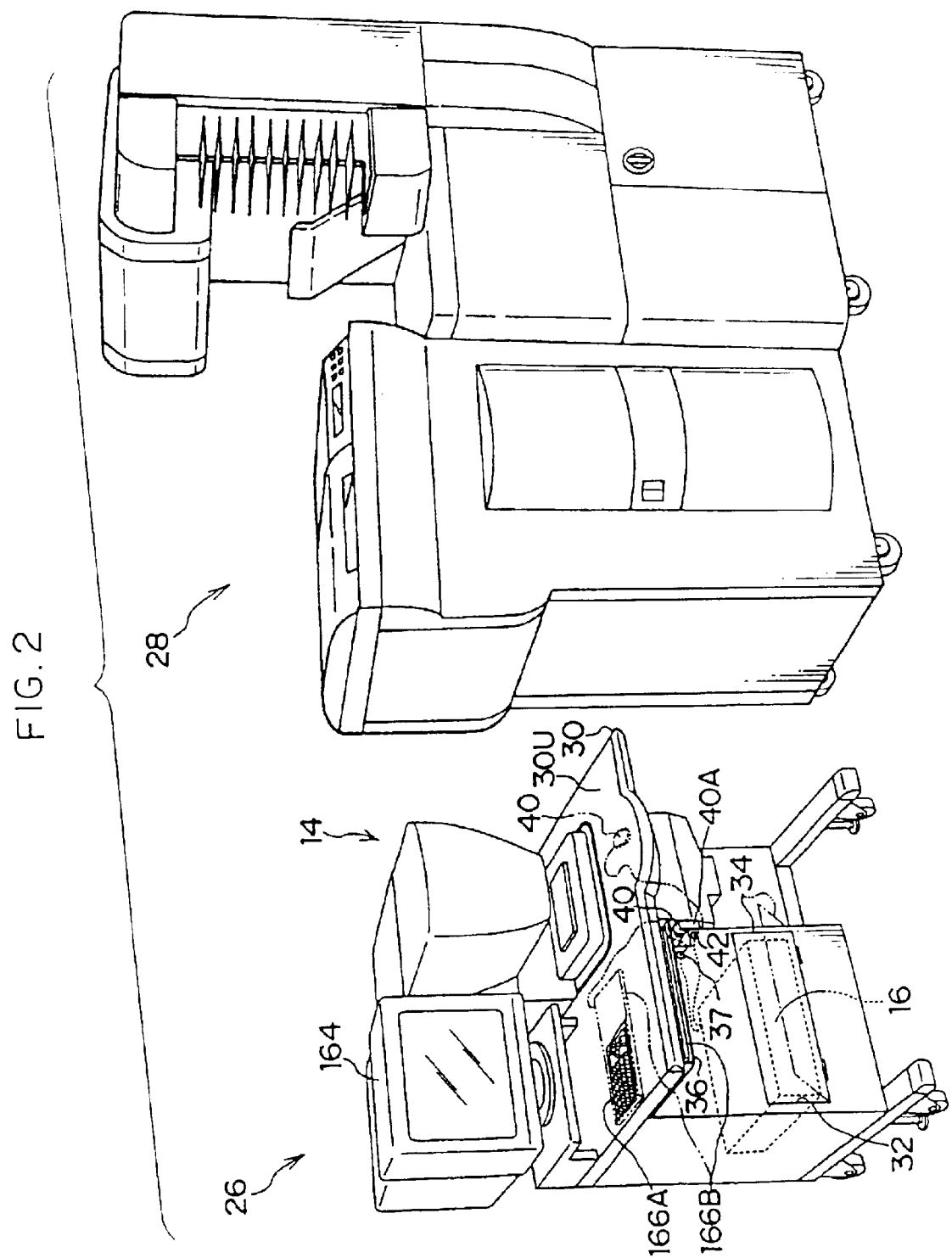
FIG. 2 is a perspective view showing an external view of the digital laboratory system according to each embodiment of the present invention.

FIG. 1 shows the schematic structure of a digital laboratory system 10 according to each embodiment of the present invention. FIG. 2 shows an external view of the digital laboratory system 10. As shown in FIG. 1, the digital laboratory system 10 comprises a line CCD scanner 14, an image processing section 16 serving as the image processing device of the present invention, a laser printer section 18 and a processor section 20. The line CCD scanner 14 and the image processing section 16 are integrated as an input section 26 shown in FIG. 2. The laser printer section 18 and the processor section 20 are integrated as an output section 28 shown in FIG. 2.

The line CCD scanner 14 reads a film image (a negative image or a positive image visualized by developing a photographed subject) recorded on a photographic photosensitive material (hereinafter simply called a "photographic film"), such as a photographic film (for example, a negative film or a reverse film). The film image may be read from a 135-size photographic film, a 110-size photographic film, a photographic film having a transparent magnetic layer (a 240-size photographic film which is known as a so-called APS film), a 120-size photographic film and a 220-size (Brownie size) photographic film. The line CCD scanner 14 reads the above-described film images using a 3-line color CCD so as to output R, G and G image data.

Figure 9:
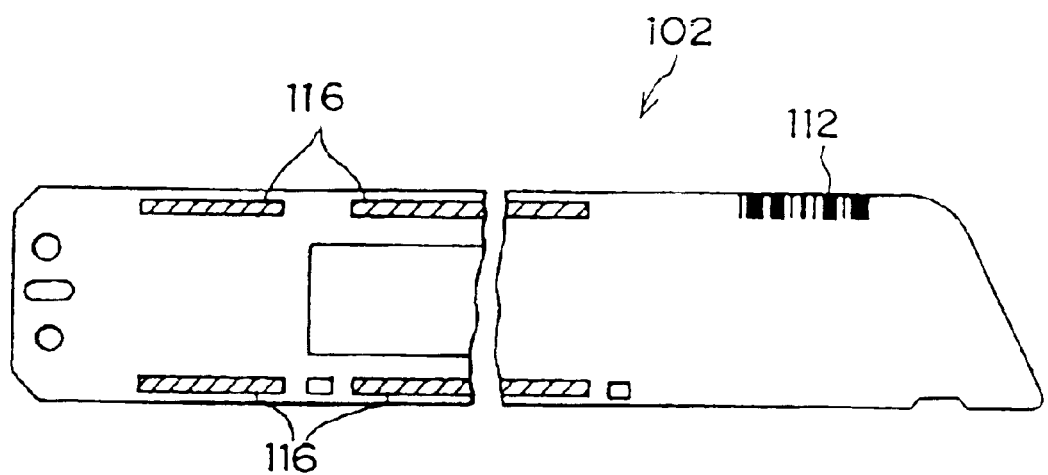
FIG. 9 is a plan view showing an APS film according to the second embodiment of the present invention.

FIG. 9 shows an APS film 102. As shown in FIG. 9, the APS film 102 is provided with a magnetic recording layer 116. Printing conditions and the type of the lens used in the photographic operation are recorded on the magnetic recording layer 116. The type of lens is used when the aberration of an image read from the APS film 102 is corrected. Note that in the case of a film with lens attached, the type of lens may be recorded in advance when it is manufactured or it may be recorded from the camera when a photographic operation is performed. Optical information (a bar code 112) is recorded in advance on the APS film 102 (for example, during manufacture). The bar code 112 indicates the ID of the film.

As shown in FIG. 2, the line CCD scanner 14 is mounted to a working table 30. The image processing section 16 is accommodated in an accommodating portion 32 formed below the working table 30. An opening/closing door 34 is attached to an opening portion of the accommodating portion 32. The inside of the accommodating portion 32 is usually closed by the opening/closing door 34. When the opening/closing door 34 is rotated, the inside portion is exposed to permit the image processing section 16 to be taken out.

A display unit 164 is mount towards the rear of the working table 30. Moreover, keyboards 166A and 166B are provided for the working table 30. The keyboard 166A is embedded in the working table 30. The other keyboard 166B is accommodated in a drawer 36 of the working table 30 when not in use. When the keyboard 166B is in use, it is taken out from the drawer 36 so as to be superimposed over the keyboard 166A. When the keyboard 166B is being used, a connector (not shown) joined to the leading end of a cable (a signal line) extending from the keyboard 166B is connected to a jack 37 provided in the working table 30. Thus, the keyboard 166B is electrically connected to the image processing section 16 via the jack 37.

A mouse 40 is disposed on a working surface 30U of the working table 30. A cable (a signal line) of the mouse 40 extends into the accommodating portion 32 via an opening 42 provided for the working table 30 so as to be connected to the image processing section 16. When the mouse 40 is not being used, it is accommodated in a mouse holder 40A. When the mouse 40 is being used, it is taken from the mouse holder 40A so as to be placed on the working surface 30U. Note that the mouse 40 corresponds to an specification means according to the present invention.

The image processing section 16 is input with image data (scan data) output from the line CCD scanner 14. Moreover, the image processing section 16 permits input of the following image data: image data obtained by a digital camera for performing a photographic operation; image data obtained from a scanner which reads an original document (for example, a reflected original document) other than a film image; and image data produced by a computer (hereinafter, the above image data items are collectively called "file image data") The above image data may be input from outside (for example, input through a recording medium, such as a memory card or input from another information processing device through a communication line).

The image processing section 16 subjects input image data to a variety of image processings including correction so as to output image data to be recorded to the laser printer section 18. Moreover, the image processing section 16 may be output, to the outside, image data subjected to the image processing and formed into an image file (for example, output to an information recording medium, such as a memory card or transmitted to another information processing device through a communication line).

The laser printer section 18 has R, G and B laser beam sources to irradiate photographic paper with laser beams modulated in accordance with data which has been input from the image processing section 16 and with which a recording operation is performed. The image is then recorded on the photographic paper by performing scan exposure. The processor section 20 subjects the photographic paper, on which the image has been recorded by the laser printer section 18, to color development, bleaching and fixing, water washing and drying. As a result, the image is formed on the photographic paper.

(Structure of Image Processing Section)

Figure 3:
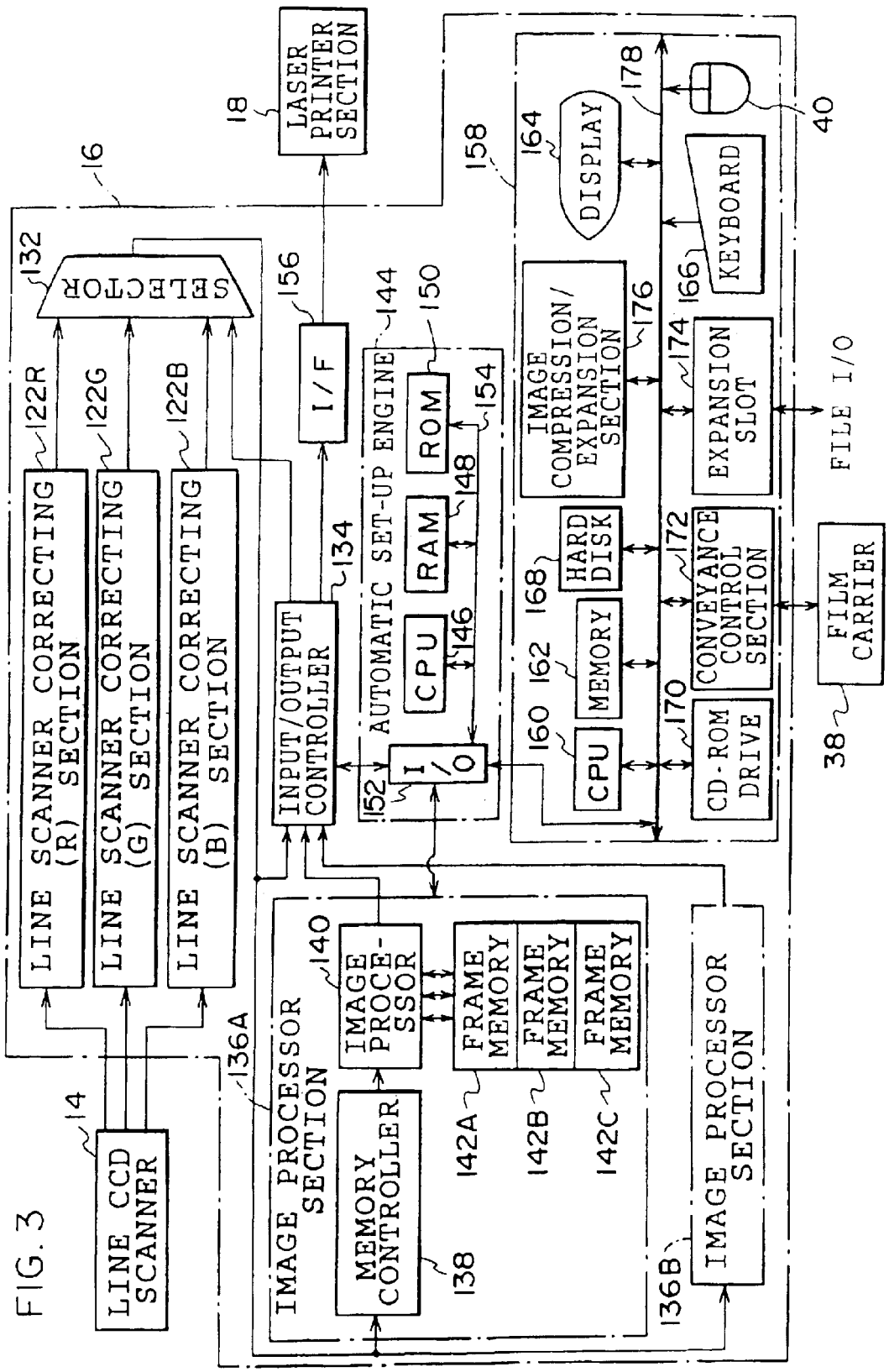
FIG. 3 is a block diagram showing the schematic structure of an image processing section according to each embodiment of the present invention.

The structure of the image processing section 16 will now be described with reference to FIG. 3. The image processing section 16 is provided with line scanner correcting sections 122R, 122G and 122B which correspond to R, G and B data items input from the line CCD scanner 14. The line scanner correcting sections 122R, 122G and 122B have the same structures. Therefore, the above sections are collectively called a "line scanner correcting section 122".

When the line scanner correcting section 122 is input with scan data from the line CCD scanner 14 which incorporates the line CCD which has read the photographic film, the line scanner correcting section 122 sequentially subjects input scan data to the following processings. One of the processings is a darkness correction for reducing the darkness output level of cells corresponding to each pixel from the input scan data. Further, a density conversion is performed in which data subjected to the darkness correction is logarithmically converted into data indicating the density of the photographic film. Moreover, shading correction is performed in which data subjected to the density conversion is corrected in pixel units in accordance with the non-uniformity of the quantity of light with which the photographic film is irradiated. Another processing is performed which corrects defective pixels such that data among data subjected to the shading correction and indicating a cell from which a signal accurately corresponding to the quantity of incident light cannot be output (a so-called "defective pixel") is interpolated in accordance with data of surrounding pixels so as to newly produce data.

The line CCD has three lines (CCD cell columns) sequentially disposed at predetermined intervals in the direction of conveyance of the photographic film. Therefore, there is a time difference in the times at which the output of image data for each of the R, G, B component colors from the line CCD scanner 14 is started. The line scanner correcting section 122 causes R, G and B image data to simultaneously be output on the film image by delaying the output timing of image data which is different for each color component.

An output end of the line scanner correcting section 122 is connected to an input terminal of a selector 132. Data subjected to the above various processings in the line scanner correcting section 122 is, as scan data, input to the selector 132. The input terminal of the selector 132 is also connected to the data output terminal of an input/output controller 134. The input/output controller 134 inputs file image data input from outside to the selector 132. An output terminal of the selector 132 is connected to a data input terminal of each of the input/output controller 134 and image processor sections 136A and 136B. The selector 132 is able to selectively output input image data to the input/output controller 134 and the image processor sections 136A and 136B.

The image processor section 136A incorporates a memory controller 138, an image processor 140 and three frame memories 142A, 142B and 142C. Each of the frame memories 142A, 142B and 142C has a capacity capable of storing the image data of film images in one or more frames. Image data input from the selector 132 is, by the memory controller 138, directly stored any one of the three frame memories 142. As an alternative to this, above image data is subjected to a predetermined image processing in a 1 dimensional image processing section 54 (to be described later in detail) of the image processor 140, and then stored as described above.

The inputting order of image data from the line CCD scanner 14 to the image processing section 16 coincides with the direction in which the photographic film is read by the line CCD scanner 14. That is, the above order coincides with a raster scan direction, the sub-scanning direction of which is a direction in which the photographic film is conveyed. Further, when image data is input to the image processor section 136 via the line scanner correcting section 122 and the selector 132, the data of each pixel is input in the order of the direction of the raster scan (specifically, the data of each pixel constituting each line is input in order from the pixel at the end on the side of the start of main scan of each line in units of lines in parallel with the main scanning direction which is orthogonal to the direction in which the photographic film is transported (corresponding to the first predetermined direction of the present invention and hereinafter called "direction y").

When image data is read from any one of the frame memories 142A, 142B and 142C (frame memories for storing image data to be processed which are hereinafter simply called "frame memory 142"), the memory controller 138 controls the reading addresses such that image data is read in the order of the direction of the above raster scan. As an alternative to this, the image data may be read in the order of the direction of a scanning different from the raster scanning direction by 90° (specifically, the data of each pixel constituting each line is sequentially read from the pixel at the end of each line in units of lines in parallel with the sub-scanning direction (corresponding to a predetermined second direction according to the present invention and hereinafter called "direction x") which is the direction in which the photographic film is transported.

The image processor 140 fetches image data stored in the frame memory 142 to perform the following image processings. That is, the image processor 140 subjects image data of all of the images to standard image processings (standard image processings) for improving the image quality of the output image (the main image). The image processings include enlargement/reduction of the main image, gradation conversion, color conversion, a hypertone processing for compressing the gradation of extremely low frequency luminance components of the main image and a hypersharpness processing for emphasizing the sharpness while suppressing graininess. The conditions of the standard image processings are determined for each image by an automatic set-up engine 144 (to be described later). The image processor 140 performs the standard image processings under the determined processing conditions.

The image processor 140 performs non-standard image processings which are selectively performed for each image (or a plurality of images, such as image groups recorded on one roll of a photographic film). The non-standard image processings include an image processing (for example, a processing for correcting distortion aberration of an original image arising from distortion aberration of a lens or color misregistration of the original image caused by chromatic aberration of magnification of the lens which are hereinafter collectively called an "LF aberration correction processing"). The above processing improves the image quality of the output image in a case where an image photographed and recorded by a film with lens attached or the like is used as an original image. Moreover, an image processing is included which intentionally changes the tone of the image (for example, an image processing for forming the output image into a monotone image, an image processing for forming the output image into a portrait shape and a processing for forming the output image into a sepia image). Another image processing is included (for example, an image processing for forming a person existing in an original image into a slim person on the main image). Whether or not each of the non-standard image processings is performed and the processing conditions are determined by a personal computer 158 (to be described later) for each image. The image processor 140 performs the non-standard image processings among the above various non-standard image processings which have been determined to be performed. The non-standard image processings are performed under the determined processing conditions.

The LF aberration correction processing among the above non-standard image processings may be performed as follows: whether or not image data to be processed is image data indicting a film image photographed and recorded on a photographic film by a film with lens attached is determined by the automatic set-up engine 144. In accordance with the results of the determination, the automatic set-up engine 144 automatically determines whether or not the LF aberration correction processing is performed and the conditions of the LF aberration correction processing. The determination whether or not image data is image data representing a film image photographed and recorded on a photographic film by the film with lens attached is performed by, for example, detecting whether or not marks or the like are provided. Marks are provided for the photographic film when the photographic film is taken from the body of the film with lens attached because the photographic film used as the film with lens attached is carried into the image processing system in a state where it is accommodated in the body of the film with lens attached. As an alternative to this, the marks may be provided for the photographic film for use as the film with lens attached when the film with lens attached is manufactured.

The image processor 140 according to the third embodiment, as shown in FIG. 13, incorporates a cropping processing section 140X, an LF-aberration correcting section 140Y and another image processing section 140Z which are connected sequentially. Thus, image data stored in the frame memory 142 (illustrated as a fine scan memory 142 in FIG. 13) is fetched. Next, the various image processings are performed under the processing conditions determined by an automatic set-up engine 144 (to be described later) for each image.

The cropping section 140X performs so-called cropping in which only the image portion among the images represented by the input image data which corresponds to the specified cropping range is output as an output image. Thus, the cropping section 140X cuts image data of the image portion corresponding to the specified cropping range. The cropping section 140X subjects only image data of the specific image specified to be cropped to the cropping processing (cropping is usually specified when image output is again requested).

The LF-aberration correcting section 140Y is turned on when image data, to be processed, is image data representing a film image photographed and recorded on the photographic film by the film with lens attached (also called an "LF"). The LF-aberration correcting section 140Y performs various correction processings for correcting deterioration in the image quality caused by the characteristics of the lens (specifically, a peripheral light reduction correction processing for correcting reduction in the brightness of the peripheral portions of the image caused by a reduction in the light in the peripheral portions of the lens, distortion aberration correction processing for correcting geometrical distortion aberration of the image caused by the distortion aberration of the lens, a processing for correcting chromatic aberration of magnification for correcting color misregistration of the image caused by the chromatic aberration of magnification of the lens, and the like which are called an "LF aberration correction processings"). The LF aberration correction processings will be described later. The LF-aberration correcting section 140Y corresponds to the processing means (specifically, the processing means according to the fifteenth and seventeenth aspects of the present invention) of the present invention.

The image processings which are performed by the image processing section 140Z include enlargement/reduction of the image, gradation conversion, color conversion, a hypertone processing for compressing the gradation of extremely low frequency luminance components of an image and a hypersharpness processing for emphasizing sharpness while suppressing graininess. The above image processings (standard image processings) are performed in order to improve the image quality of the output image. The image processing section 140Z may be structured to be capable of performing an image processing for intentionally changing the image tone (for example, an image processing for forming an output image into a monotone image, an image processing for forming the output image into a portrait shape and a processing for forming the output image into a sepia image); an image processing for processing the image (for example, an image processing for slenderizing in the main image a person existing in an original image). The above processings are non-standard image processings which must selectively be performed for each image (a plurality of images, such as image groups recorded on one roll of a photographic film).

Figure 24:
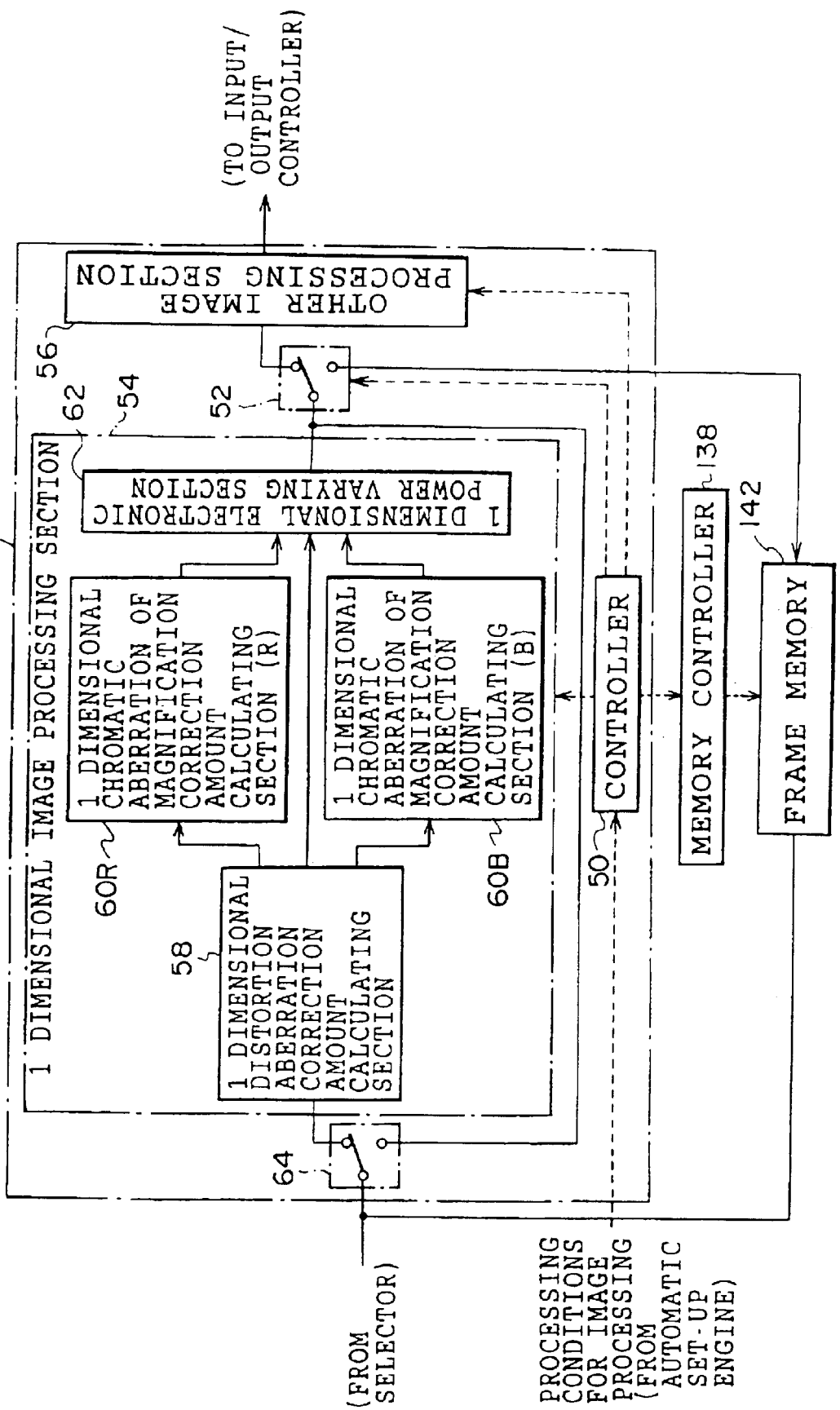
FIG. 24 is a schematic block diagram showing another structure of an image processor according to the fourth embodiment of the present invention.

The image processor 140 according to a fourth embodiment, as shown in FIG. 24, is provided with a controller 50, a 1 dimensional image processing section 54, a switch 52 and another image processing section 56. The 1 dimensional image processing section 54 comprises a 1 dimensional distortion aberration correction quantity calculating section 58, a 1 dimensional chromatic magnification aberration correction quantity calculating section 60R, a 1 dimensional chromatic magnification aberration correction quantity calculating section 60B, a 1 dimensional electronic power varying portion 62 and an effective-image-region extracting section 64. The 1 dimensional distortion aberration correction quantity calculating section 58, the 1 dimensional chromatic magnification aberration correction quantity calculating sections 60R and 60B and the 1 dimensional electronic power varying portion 62 correspond to the correcting section of the present invention (specifically, the correcting section according to a twenty-second aspect of the present invention), the effective image region extracting section 64 corresponds to an extracting means of the present invention (specifically, the extracting means according to a twenty-first aspect of the present invention), and the controller 50 corresponds to a control means according to the present invention.

Image data input to the image processor 140 is input to the 1 dimensional image processing section 54. On the basis of the conditions of the image processing communicated from the automatic set-up engine 144 (to be described later,) the controller 50 determines whether or not image data input to the image processor 140 is image data (hereinafter called "LF image data") representing a film image photographed and recorded on the photographic film by a film with lens attached (hereinafter called an "LF").

If image data to be processed is not LF image data, the controller 50 controls the 1 dimensional image processing section 54 such that the 1 dimensional electronic power-varying portion 62 in the 1 dimensional image processing section 54 performs only a 1 dimensional electronic power varying processing. The 1 dimensional electronic power varying processing is a processing for changing the number of pixels (the resolution) for enabling the image represented by the image data to be recorded on a recording material with a predetermined size and a predetermined recording density. In accordance with the electronic power variation which is one of the conditions of the image processing communicated from the automatic set-up engine 144, the number of pixels (the resolution) is changed in one direction (the direction x or the direction y) corresponding to the inputting order of the image data. Since the change in the number of pixels does not cause the positions of the changed pixels to coincide with the positions of the non-changed pixels, an interpolation calculation of the density value at the position of each of the changed pixels is also performed.

When image data to be processed is LF image data, the controller 50 controls the 1 dimensional image processing section 54 to cause the 1 dimensional distortion aberration correction quantity calculating section 58 to perform the 1 dimensional electronic power varying processing. Moreover, the 1 dimensional distortion aberration correction quantity calculating section 58 performs 1 dimensional distortion aberration correction for correcting geometrical distortion aberration of the image caused by the distortion aberration of the lens of the LF in one direction corresponding to the order in which the image data is input. The 1 dimensional chromatic magnification aberration correction quantity calculating sections 60R and 60B perform 1 dimensional correction of chromatic aberration of magnification for correcting color misregistration of the image arising from the lens of the LF in one direction corresponding to the order in which the image data is input. The 1 dimensional image processing section 54 is controlled to cause the effective-image-region extracting section 64 to perform the processing for extracting an effective image region from which image void portions at the two ends of image data in the one direction (the direction x or the direction y) corresponding to the inputting order of image data have been excluded by the 1 dimensional distortion aberration correction and correction of the chromatic aberration of magnification.

Image data subjected to the above processings in the 1 dimensional image processing section 54 is input to a switch 52. The switch 52 comprises a switching device which is controlled by the controller 50. Thus, the switch 52 can be switched between a first state in which input image data is output to the other image processing section 56 and a second state in which input image data is output to the frame memory 142 (that is, image data is not processed by the other image processing section 56 and image data is stored in the frame memory 142).

Image data input from the selector 132 is, in the 1 dimensional image processing section 54, image processed in the direction y corresponding to the inputting order of image data from the selector 132 to the image processor 140. The controller 50, via the switch 52, temporarily stores image data subjected to the image processing in the direction y in the frame memory 142. Then, reading of image data from the frame memory 142 in an order different from the above inputting order by 90° is enabled by controlling the reading order of image data via the memory controller 138. Read image data is sequentially input to the 1 dimensional image processing section 54 as described above. Thus, the 1 dimensional image processing section 54 performs the image processing in the direction x corresponding to the reading order. The controller 50 inputs image data also subjected to the image processing in the direction x to the other image processing section 56 via the switch 52. As described above, the frame memory 142 corresponds to a storage means according to the twenty aspect or the twenty-first aspect of the present invention.

The other image processing section 56 subjects input image data to a variety of image processings under the processing conditions determined for each image by the automatic set-up engine 144 and communicated to the controller 50. The other image processing section 56 performs the image processings including gradation conversion, color conversion, a hypertone processing for compressing the gradation of extremely low frequency luminance components in an image and a hypersharpness processing for emphasizing sharpness while suppressing graininess. The above processings are the processings (standard image processings) for improving the image quality of the output image.

The other image processing section 56 may be structured to be capable of performing an image processing which intentionally changes the tone of the image (for example, an image processing for forming an out put image into a monotone image, an image processing for forming the out put image into a portrait shape and a processing for forming the out put image into a sepia image). Moreover, the image processing for processing the image (for example, an image processing for forming a person existing in an original image into a slim person in the main image) may be included. The above processings are non-standard image processings which are selectively performed for each image (or a plurality of images, such as image groups recorded on one roll of a photographic film). Moreover, a peripheral reduced light correction processing for correcting reduction in the brightness of peripheral portions of the image caused by the lens of the LF and a blurred focussing correction processing for correcting reduction in the sharpness of the image caused by the characteristics of the lens of the LF may be performed. The above processings are LF aberration correction processings for correcting deterioration of the image quality of the output image caused by the characteristics of the lens of the LF.

The image processor 140 according to the third and fourth embodiments is connected to the input/output controller 134. Thus, image data subjected to the image processing is temporarily stored in the frame memory 142, and then output to the input/output controller 134 at predetermined times. The image processor section 136B has the same structure as that of the above image processor section 136A. Therefore, a description of the image processor section 136B is omitted.

In this embodiment, each film image is read twice by the line CCD scanner 14 at different resolutions. A first reading operation with a relatively low resolution (hereinafter called "pre-scan") is performed such that the overall surface of the photographic film is read. The reading operation is performed under conditions (the quantity of light for each wavelength of R, G and B light with which the photographic film is irradiated and time for which charges are accumulated in the line CCD) determined to prevent saturation of accumulated charges in the line CCD if the density of the film image is relatively low (for example, a negative image of a negative film in an under exposure state). Data (pre-scan data) obtained from the pre-scanning operation is output from the selector 132 to the input/output controller 134.

The automatic set-up engine 144 is connected to the input/output controller 134. The automatic set-up engine 144 is provided with a CPU 146, RAM 148 (for example, DRAM), ROM 150 (for example, a rewritable ROM) and an input/output port 152. The above elements are connected mutually via a bus 154. In the third embodiment, pre-scan data output from the input/output controller 134 is temporarily stored in a pre-scan memory 135 structured as shown in FIG. 13, and then subjected to a set-up calculation processing which is performed by the automatic set-up engine 144. Next, pre-scan data is subjected to a simulation image display processing which is performed by a personal computer 158 (to be described later). Note that the RAM 148 of the automatic set-up engine 144 or the memory 162 of the personal computer 158 (to be described later) is employed to serve as the pre-scan memory 135.

FIG. 13 shows a function for performing a set-up calculation processing among the various functions which are performed by the CPU 146 of the automatic set-up engine 144, the above function being expressed as a set-up calculating section 144A. The set-up calculation processing is performed in the third and fourth embodiments as follows: the automatic set-up engine 144 (the set-up calculating section 144A according to the third embodiment) determines the position of a frame of the film image on the basis of pre-scan data input from the input/output controller 134. Next, the automatic set-up engine 144 extracts data (pre-scan image data) corresponding to the region of the photographic film on which the film image has been recorded. Moreover, the automatic set-up engine 144 determines the size of the film image on the basis of the pre-scan image data and calculates the amounts of characteristics, such as the density, of the image. Next, the automatic set-up engine 144 determines the reading conditions under which re-reading (hereinafter called "fine scan") is performed with a relatively high resolution. Then, the automatic set-up engine 144 outputs the position of the frame and the reading condition to the line CCD scanner 14.

The automatic set-up engine 144 (the set-up calculating section 144A in the third embodiment) follows pre-scan image data of the film images for a plurality of frames. Thus, the automatic set-up engine 144 automatically determines the conditions of the image processings to which the image data (fine scan image data) obtained by the fine scan performed by the line CCD scanner 14 is subjected. The determined processing conditions are output to the image processor 140 of the image processor section 136. The determination of the conditions for the image processings is performed by determining whether or not a plurality of film images of photographed equivalent scenes exist in accordance with the light exposure, the type of the light source employed in the photographing operation and so forth. If a plurality of film images of photographed equivalent scenes exist, the conditions of the image processings for the film image are made to be the same or equivalent to the other conditions.

The optimum conditions for the image processings vary depending on whether the image processed image data is to be used to record the image on photographic paper using the laser printer section 18, displayed on a display means, such as a display unit, or stored in an information recording medium. The image processing section 16 is provided with the two image processor sections 136A and 136B. Therefore, when the image data is used to record the image on the photographic paper and to externally output the image, the automatic set-up engine 144 (the set-up calculating section 144A in the third embodiment) performs a set-up calculation for each purpose. Thus, optimum processing conditions for each purpose are determined. The optimum processing conditions are output to the image processor sections 136A and 136B. As a result, the same fine scan image data is subjected to image processing under different processing conditions.

Moreover, the automatic set-up engine 144 (the set-up calculating section 144A in the third embodiment) calculates parameters for recording the image by defining gray balance or the like when the image is recorded on the photographic paper by the laser printer section 18 in accordance with pre-scan image data of the film image input from the input/output controller 134. Next, the automatic set-up engine 144 outputs the above parameters simultaneously with the output of image data (to be described later) to the laser printer section 18. The automatic set-up engine 144 (the set-up calculating section 144A in the third embodiment) equivalently determines the conditions for the image processings to which file image data input from outside is subjected by performing a calculation.

LF aberration correction data for use in the LF aberration correction processing is stored in advance for each type of lens of each of a variety of films with lens attached in the ROM 150 of the automatic set-up engine 144. LF aberration correction data for use in this embodiment includes peripheral light reduction correction data, distortion aberration correction data and data of correction of chromatic aberration of magnification. The cutting range data above corresponds to information relating to the characteristics of the lens. The ROM 150 having data stored as described above corresponds to the acquiring means of the present invention. LF aberration correction data corresponds to information relating to the characteristics of the lens according to the present invention. The ROM 150 has a function to serve as an LF-aberration-correction-data storage section 144B (the storage means) structured as shown in FIG. 13.

Peripheral light reduction correction data is used to perform peripheral light reduction correction processing for correcting reduction in the brightness of a peripheral portions of the image caused by the peripheral light reduction of the lens. Peripheral light reduction correction data is set for each of the type of lens on the basis of the results of measurement of change in the quantity of received light (the light exposure) of each of the various lenses at each position on the film image caused by the light reduction in the peripheral portion of the lens. In this embodiment, coefficients $a_1$, $a_2$ and $a_3$ (refer to the following equation (1)) of an equation for obtaining correction light exposure for use in the peripheral light reduction correction processing are employed as peripheral light reduction correction data:

$$\text{Correction Exposure Amount log} E\ (r) = a_1 r + a_2 r^2 + a_3 r^3 \qquad (1)$$

where r is the distance from the center of the image. The relationship between coordinates (x, y) of an arbitrary pixel on an image expressed by an xy coordinate system having an origin which is a corner of the image, coordinates $(x_P, y_P)$ of an arbitrary pixel on an image expressed by an $x_P y_P$ coordinate system (refer to FIG. 14B) having an origin (=(0, 0)) which is the center $(x_{P0}, y_{P0})$ of the image, and the distance r is described by the following formula:

$$r = \sqrt{(x_P^2 + y_P^2)} = \sqrt{((x - x_{P0})^2 + (y - y_{P0})^2)} \qquad (2)$$

Peripheral light reduction correction data ($a_1$, $a_2$ and $a_3$ in the equation for obtaining correction light exposure) is set for each type of the lens to correct for the change in the light exposure at each position on the film image when each type of lens is employed.

Distortion aberration correction data is used in the distortion aberration correction processing for correcting geometrical distortion of an image caused by the distortion aberration of the lens. Distortion aberration correction data is set for each type of lens on the basis of the results of measuring the direction and amount of change of each lens at each position of the pixel on the film image caused by the distortion aberration of the lens. In this embodiment, green is employed as a reference color. The result of the measurement of the amount of change (the amount of the distortion aberration) at the position of the pixel of green at each position on the film image caused by the distortion aberration of the lens is broken down into the direction x (in the lengthwise direction of the photographic film) and the direction y (a direction perpendicular to the direction x). Then, the amount of the distortion aberration at each position on the image is expressed by the distortion aberration amount Dx $(x_P, y_P)$ in the direction x and the distortion aberration amount Dy $(x_P, y_P)$ in the direction y with respect to the $x_P y_P$ coordinate system. Next, the thus-obtained data is employed as the distortion aberration correction data.

In the ROM 150 of the automatic set-up engine 144, the above-mentioned distortion aberration correction data and data of correction of chromatic aberration of magnification for use in the distortion aberration correction processing and the processing for correcting chromatic aberration of magnification are stored in advance for each type of lens for use in each of a variety of LF. Aberration correction data corresponds to information relating to the characteristics of the lens.

Distortion aberration correction data is data for use in the distortion correction processing for correcting geometrical distortion of the image caused by the distortion aberration of the lens. Distortion aberration correction data is set for each type of lens on the basis of the results of measuring the direction and amount of change at each pixel position on the film image caused by the distortion aberration of the lens. In this embodiment, green is employed as a reference color. The result of the measurement of the amount of change (the amount of the distortion aberration) at the position of the pixel of green at each position on the film image caused by the distortion aberration of the lens is broken down into the directions x and y. Then, data is employed which expresses the amount of distortion aberration at each position on the image with distortion aberration amount Dx $(x_P, y_P)$ in the direction x and the distortion aberration amount Dy $(x_P, y_P)$ in the direction y. The expression is performed with respect to the $x_P y_P$ coordinate system (a coordinate system (see FIG. 14B) having an origin (=(0, 0) which is the center $(x_{P0}, y_{P0})$ of the image) and arranged to express an arbitrary pixel on the image with coordinate values $(x_P, y_P)$).

Data of correction of chromatic aberration of magnification is data for use in the processing for correcting chromatic aberration of magnification for correcting color misregistration of an image caused by the chromatic aberration of magnification of the lens. Data of correction of chromatic aberration of magnification is set for each type of lens on the basis of the results of the measurement of the direction and amount of change in the position of the pixel in a non-standard color with respect to the position of the pixel in the standard color at each position on the film image caused by the chromatic aberration of magnification of the lens.

In this embodiment, R and B are employed as the non-standard colors. Data of correction of chromatic aberration of magnification is obtained as follows: the results of the measurement of the amount of change (the chromatic aberration of magnification amount) of the position of the pixel in R with respect to G at each position on the film image caused by the chromatic aberration of magnification of the lens are broken down into the direction x and the direction y. The chromatic aberration of magnification amount of R at each position on the image is expressed with chromatic aberration of magnification amount ΔRx ($x_P$, $y_P$) of R in the direction x and chromatic aberration of magnification amount ΔRy ($x_P$, $y_P$) of R in the direction y with respect to the $x_P y_P$ coordinate system. Data of correction of chromatic aberration of magnification for B is obtained as follows: the results of the measurement of the amount of change (the chromatic aberration of magnification amount) of the position of the pixel in B with respect to G at each position on the film image caused by the chromatic aberration of magnification of the lens are broken down into the direction x and the direction y. The chromatic aberration of magnification amount of B at each position on the image is expressed with chromatic aberration of magnification amount ΔBx ($x_P$, $y_P$) of B in the direction x and chromatic aberration of magnification amount ΔBy ($x_P$, $y_P$) of B in the direction y with respect to the $x_P y_P$ coordinate system.

When cropping of a specific image has been specified at the time of re-request of image output, the CPU 146 of the automatic set-up engine 144 causes an operator to instruct the cropping range. The specification is caused such that image data (fine scan image data) of the image to be cropped is fetched from the frame memory (the fine scan memory) 142. Then, a processing for changing the resolution is performed to make the resolution of fetched image data the same as that of pre-scan image data. In the third embodiment, the function for changing the resolution is performed by a resolution converting section 144C shown in FIG. 13.

The input/output controller 134 is connected to the laser printer section 18 through an I/F circuit 156. When the image data subjected to the image processing is used to record an image on photographic paper, image data subjected to the image processing in the image processor section 136 is, as image data for recording, output from the input/output controller 134 to the laser printer section 18 through the I/F circuit 156. The automatic set-up engine 144 is connected to the personal computer 158. When image data subjected to the image processing is externally output as an image file, image data subjected to the image processing in the image processor section 136 is output from the input/output controller 134 to the personal computer 158 through the automatic set-up engine 144.

The personal computer 158 incorporates a CPU 160, memory 162, a display unit 164, a keyboard 166 (corresponding to the keyboard 166A and the keyboard 166B shown in FIG. 2), the mouse 40 (also refer to FIG. 2), a hard disk 168, a CD-ROM drive 170, a conveyance control unit 172, an expansion slot 174 and an image compression/expansion section 176. The above units are connected to one another via a bus 178. Note that the display unit 164 corresponds to the display means according to the present invention.

The personal computer 158 fetches pre-scan image data extracted from the pre-scan data by the automatic set-up engine 144. Moreover, the personal computer 158 fetches conditions for the image processing determined by the automatic set-up engine 144. In accordance with the fetched processing conditions, an image processing equivalent to the image processing for fine scan image data which is performed by the image processor 140 is performed for pre-scan image data so that simulation image data is produced.

Then, produced simulation image data is converted into a signal for displaying the image on the display unit 164. In response to the signal, the simulation image is displayed on the display unit 164. The image quality and the like of the simulation image displayed on the display unit 164 are examined by the operator. When information for specifying modification of the processing conditions as a result of the examination has been input via the keyboard 166, the input information is output to the automatic set-up engine 144. As a result, the automatic set-up engine 144 performs a processing, such as re-calculation of the conditions for the image processing.

On the other hand, the conveyance control unit 172 is connected to a film carrier 38 which is set to the line CCD scanner 14 so that conveyance of the photographic film by the film carrier 38 is controlled. The film carrier 38 is provided with a bar code sensor for reading the bar code 112 and a magnetic head for reading information recorded on the magnetic recording layer 116 (each of which is not shown). When an APS film has been set to the film carrier 38, information (for example, the print size) read from the magnetic layer of the APS film is input.

A driver (not shown) for reading/writing data to and from an information recording medium, such as a memory card, and a communication control device for performing communication with another information processing device are connected to the personal computer 158 via the expansion slot 174. When image data, to be externally output, is input from the input/output controller 134, image data is, as an image file, output to the outside (the driver or the communication control device) via the expansion slot 174. When file image data is input from outside via the expansion slot 174, the input file image data is output to the input/output controller 134 via the automatic set-up engine 144. In the above case, the input/output controller 134 outputs the input file image data to the selector 132.

The image processing section 16 is able to output pre-scan image data or the like to the personal computer 158, display film image read by the line CCD scanner 14 on the display unit 164, predict the appearance of the image when it is recorded on photographic paper and display the predicted image on the display 164, and allow modifications or the like specified by the operator via the keyboard 166 to reflect on the processing conditions for the image processing.

The CPU 160 of the personal computer 158 is able to correct the distortion aberration and the chromatic aberration of magnification caused by the aberration of the lens. The above correction processings are performed on the basis of values calculated using a polynominal (correction formula) with which the ratio of the correction is changed in accordance with the distance from the center of the read image. That is, the values calculated by using the above polynominal are used to determine the appropriate position of each pixel. Correction coefficients of the polynominal for performing the distortion aberration correction processing and the processing for correcting chromatic aberration of magnification are different for each type of lens. The above correction coefficients are stored in advance on the hard disk 168.

Figure 11A:
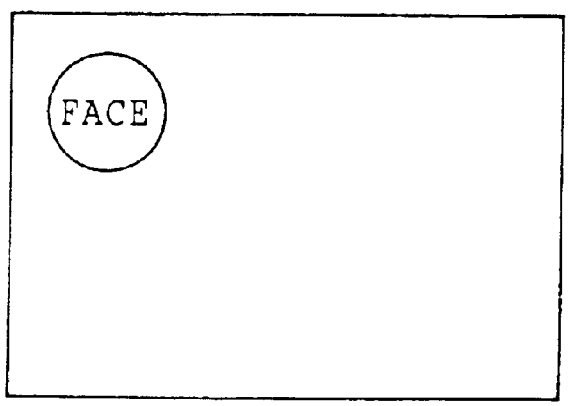
FIG. 11A is a diagram showing a conventional photographed image according to the second embodiment of the present invention.
Figure 11B:
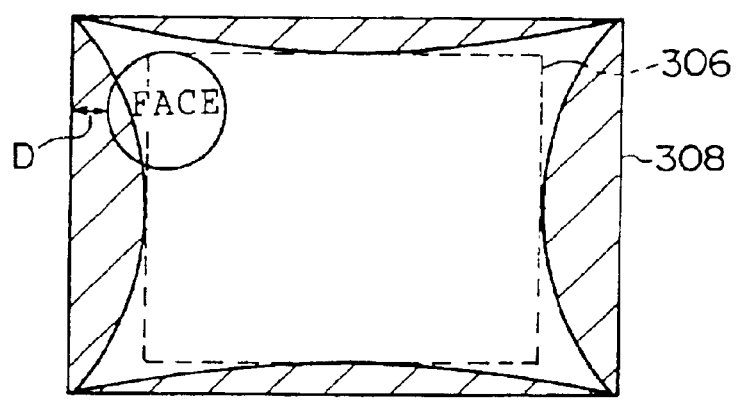
FIG. 11B is a diagram showing an image after aberration correction has been performed according to the second embodiment of the present invention.
Figure 12:
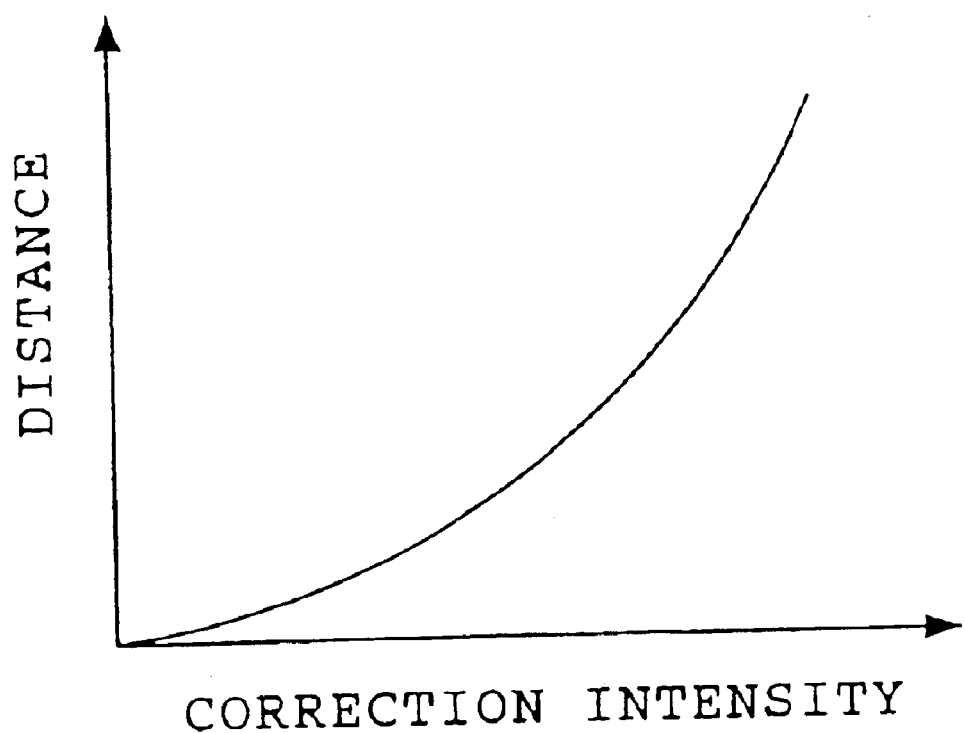
FIG. 12 is a graph showing the relationship between correction intensity and distance according to the second embodiment of the present invention.

The CPU 160 is able to extract a main object (for example, the face of a person) of a read image. If the face is eclipsed as shown in FIG. 11B as a result of the distortion aberration correction processing, the distortion aberration correction processing is performed only to the extent where the face is not eclipsed. The above operation is performed by changing the correction intensity of the aberration correction as shown in FIG. 12 in accordance with the distance D (see FIG. 11B) from an end of the image to an end of the face. As can be seen from FIG. 12, if the distance D is long the correction intensity of the aberration correction in the horizontal image data is increased. If the distance D is short, the correction intensity is decreased. Thus, the distortion aberration correction processing can be performed to a certain extent while eclipse of the face portion is prevented.

Note that the correction intensity can be changed by changing the correction coefficient in the above correction equation. Data about the correction coefficient corresponding to the distance D is stored in advance the hard disk 168 as table data.

FIG. 13 shows part of the various functions which can be performed by the CPU 160 of the personal computer 158 according to the third embodiment. The functions relate to the simulation image display processing and are illustrated as a plurality of blocks (that is, an image data processing section 158A, an image display section 158B and a key-correction input section 158C).

Figure 4C:
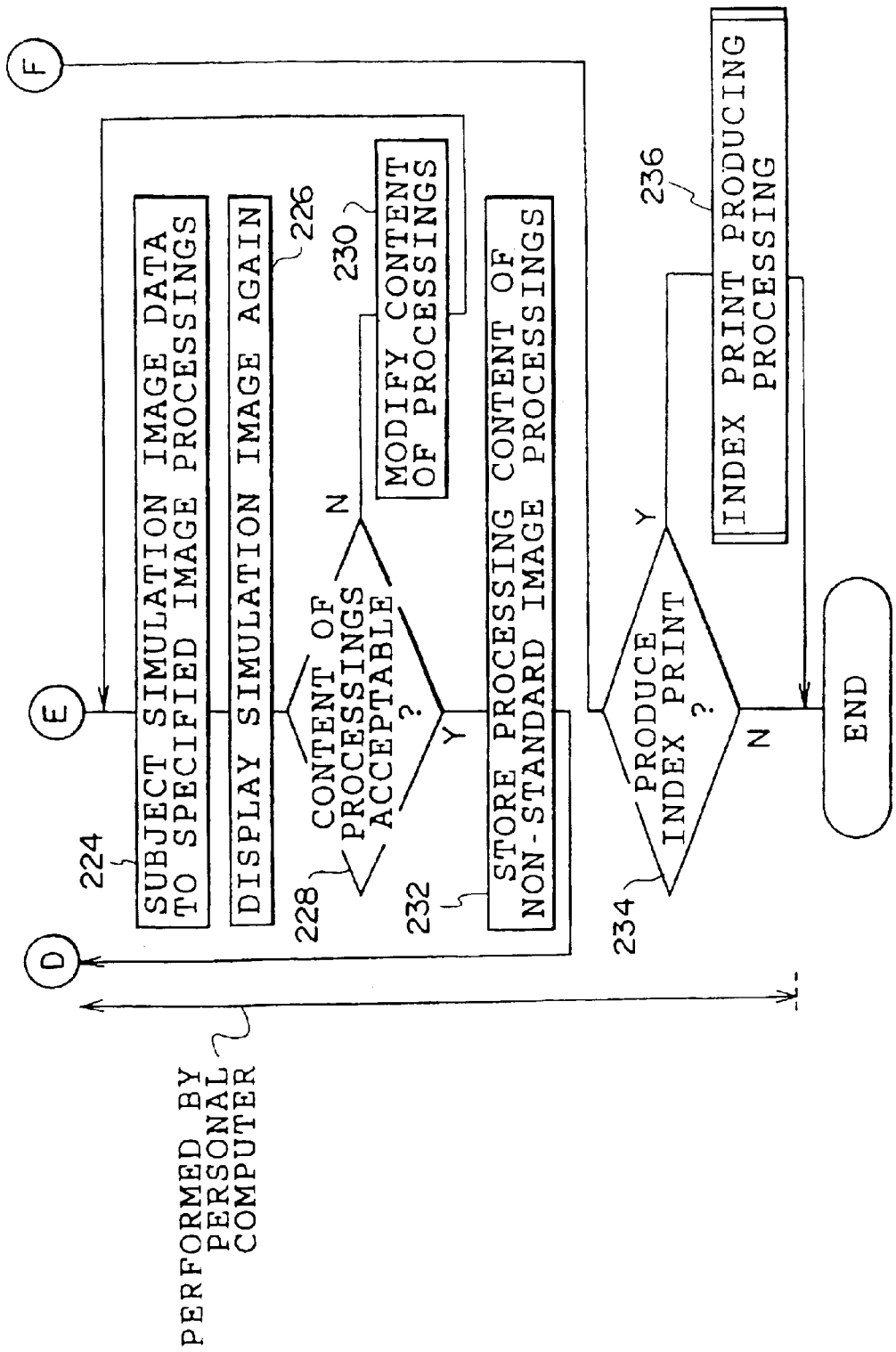

The image data processing section 158A fetches, from the pre-scan memory 135, pre-scan image data extracted from pre-scan data by the set-up calculating section 144A and re-stored in the pre-scan memory 135. Moreover, the image data processing section 158A fetches conditions for the image processing determined by the set-up calculating section 144A. In accordance with fetched processing conditions, the image data processing section 158A subjects pre-scan image data to an image processing equivalent to an image processing to which pre-scan image data is subjected by the image processor 140. Thus, the image data processing section 158A produces simulation image data. When cropping is performed, image data having the resolution reduced by the resolution converting portion 144C is fetched (see dashed line shown in FIG. 4) to produce simulation image data by performing a equivalent processing.

The image display section 158B includes a display unit 164. The image display section 158B converts simulation image data produced by the image data processing section 158A into a signal for displaying the image on the display unit 164. On the basis of the signal, the image display section 158B displays the simulation image on the display unit 164.

The key-correction input section 158C is constructed from a keyboard 166 and the mouse 40. The image quality and the like of the simulation image displayed on the display unit 164 are examined by the operator. When information for specifying modification of the processing conditions as a result of the examination has been input through the keyboard 166, input information is output to (the set-up calculating section 144A of) the automatic set-up engine 144. As a result, the set-up calculating section 144A performs a processing including a re-calculation of the conditions for the image processing. When the mouse 40 has been operated to perform cropping and a cropping range has thus been specified, the key-correction input section 158C outputs information indicating the cropping range to (the set-up calculating section 144A of) the automatic set-up engine 144.

(Operation)

The operation of the first embodiment will now be described. A processing which is performed by the image processing section 16 will now be described in which a film image recorded on a photographic film is read by the line CCD scanner 14. On the basis of the read scan data, the image is recorded on photographic paper by the laser printer section 18 so as to produce a main print (which is the main image according to the present invention).

As described above, the line CCD scanner 14 twice reads the film image recorded on the photographic film (pre-scan and fine scan). Initially, the line CCD scanner 14 pre-scans the overall surface of the photographic film. The, pre-scan data is then input to the image processing section 16. The image processing section 16 performs a pre-scan processing which will now be described with reference to flow charts shown in FIGS. 4A to 4C.

In step 200 the line scanner correcting section 122 subjects pre-scan data input from the line CCD scanner 14 to darkness correction, density correction, shading correction and defective-pixel correction. Pre-scan data output from the line scanner correcting section 122 is input to the automatic set-up engine 144 via the selector 132. In step 202 the recording position (the frame position) of the film image on the photographic film is determined on the basis of the pre-scan data input from the line CCD scanner 14. On the basis of the determined frame position, pre-scan image data corresponding to the position of the recorded film image is cut. The above-drscribed processing is performed for each film image recorded on the photographic film.

The digital laboratory system 10 according to this embodiment enables a film scanner of a different type from the type of the line CCD scanner 14 to be connected. In the above structure, scan data which is input to the image processing section 16 is slightly different depending on the type of reading scanner. Since the difference is caused by the difference of the structures of the scanners, the type of scanner which has input the scan data to the image processing section 16 is determined in step 204. To make the data of the same photographic film which has been read the same regardless of the type of reading scanner, pre-scan image data of each film image is corrected in accordance with the determined type of the scanner. That is, standardization of simulation image data is performed.

In step 206 the size of each film image is determined on the basis of the pre-scan image data of each film image. Moreover, the amount of the image characteristics such as the density of each film image is calculated. On the basis of the size and the amount of image characteristics of each film image, the reading conditions for fine scan of each film image which is performed by the line CCD scanner 14 are determined. Thus, the reading conditions and information (for example, the frame number) for identifying each film image are made to correspond to each other and stored in the RAM 148.

In step 208 the automatic set-up calculation is performed for each film image on the basis of the pre-scan image data of film images of a plurality of frames. Next, the conditions for the standard image processing which is performed when the main print is produced are determined for image data (fine scan image data) which can be obtained when the line CCD scanner 14 performs fine scan. The determined conditions for the standard image processing are made to correspond to information (for example, the frame number) for identifying each film image with each other and stored in the RAM 148.

In step 210 and ensuing steps, the personal computer 158 performs the image examination processing. In step 210 pre-scan image data is fetched from the automatic set-up engine 144. Moreover, the conditions for the standard image processing which have been determined by the automatic set-up engine 144 and which are used to produce the main print are fetched. On the basis of the fetched conditions for the standard image processing, pre-scan image data is subjected to an image processing equivalent to the standard image processing to which fine scan image data is subjected by the image processor 140 when the main print is produced. Thus, simulation image data is produced. On the basis of the simulation image data produced in step 210, a simulation image indicating the completed main print obtained when only the standard image processing is performed when the main print is produced is displayed on the display unit 164 in step 212.

FIG. 5 shows an example of the display of the simulation image. FIG. 5 shows simulation images 300 for six film images. Apart of the photographic film, which is being read by the line CCD scanner 14, on which is recorded the film image corresponding to the displayed simulation image 300, is displayed as an image 302. Moreover, a film image corresponding to the displayed simulation image 300 is, on the photographic film which is being displayed as the image 302, surrounded by a frame 304 so as to be clearly displayed. Also a message for requesting the operator to examine the image and input the results of the examination is displayed.

When the simulation image has been displayed on the display unit 164, the operator visually confirms the simulation image. Then, the operator examines whether or not the frame position determined by the automatic set-up engine 144 is a acceptable position and whether or not the image quality of the simulation image is acceptable (that is, whether or not the conditions for the standard image processing calculated by the automatic set-up engine 144 are acceptable). Then, the operator inputs information indicating the results of the examination via the keyboard 166.

When certain information (specifications) has been input by the operator via the keyboard 166, the routine moves to step 214. In accordance with the input information, the results of the examination, that is, the conditions for the image processing among the various standard image processings specified to be modified are determined. If the determination in step 214 is affirmed, the routine moves to step 216. Thus, modification information indicating the specification to modify the processing conditions input by the operator is output to the automatic set-up engine 144. Among the standard image processings which are performed when the main print of the specific film image is produced, the conditions for the image processing specified to be modified are modified in accordance with the input modification information. The above processing is performed by issuing an specification to the automatic set-up engine 144.

Accordingly, in the automatic set-up engine 144, the processing conditions of the image processing which is instructed to be modified, from among the standard image processings performed during the production of the main print of the film image which corresponds to the above specific simulation image, are recalculated (i.e. modified) in consideration of the modification information input from the operator. Next, the personal computer 158 again performs steps 210 and 212. Thus, the simulation image 300 is again displayed on the display unit 164 on the basis of the modified processing conditions. The re-displayed specific simulation image is visually confirmed by the operator. Thus, the operator is able to easily determine whether or not the contents of the input modification information are acceptable.

When the determination in step 214 is negated, the routine moves to step 218. On the basis of the information input from the operator, the result of the examination of the simulation image, that is, whether or not modification of the frame position of the specific simulation image has been specified, is determined. If the determination in step 218 is affirmed, the routine moves to step 220. Thus, modification information input from the operator and indicating an specification of the modification of the frame position is output to the automatic set-up engine 144. Thus, an specification is issued to the automatic set-up engine 144 to modify the frame position of the film image corresponding to the specific simulation image.

As a result, in step 202, the automatic set-up engine 144 modifies the frame position of the film image corresponding to the specific simulation image. On th basis of the modified frame position, the automatic set-up engine 144 again cuts pre-scan image data from the pre-scan data. Then, the automatic set-up engine 144 again performs the processings in steps 204 to 208. The personal computer 158 again performs the processings in steps 210 and 212. Thus, the simulation image 300 of the film image, the frame position of which has been modified, is again displayed on the display unit 164. If both of the determinations in steps 214 and 218 are negated, the routine moves to step 222. Thus, a determination is made as to whether or not a specific film image from among the film images corresponding to the simulation images displayed on the display unit 164 has been specified to be subjected to the non-standard image processing which is performed when the main print is produced.

As described above, the operator examines the frame position and the conditions for the standard image processing. If the operator determines the results of the examination are acceptable, the operator determines whether or not the non-standard image processing is performed when the main print is produced. If the execution of one or more specific non-standard image processings is specified by the user or if the operator determines that the specific non-standard image processing must be performed after the operator has visually checked the simulation image, the operator uses the keyboard 166 to input information for specifying the non-standard image processings to be processed when the main print is produced.

As a result, the determination in step 222 is affirmed, and then the routine moves to step 224. Thus, the simulation image data (image data subjected to the image processing equivalent to the standard image processing which is performed by the image processor 140) of the specific film image specified to be subjected to the non-standard image processings is subjected to the following processing: the image processing (the image processing equivalent to the non-standard image processing of fine scan image data which is performed by the image processor 140 when the main print is produced) equivalent to the non-standard image processing specified to be executed. The conditions for the image processing equivalent to the non-standard image processing may be performed by using a default value if it is previously set. As an alternative to this, the operator may set the processing conditions so as to be used.

On the basis of the simulation image data which has undergone an image processing equivalent to the non-standard image processing in step 224, a simulation image indicating the completed main print of the specific film image which has undergone the non-standard image processing during the production of the main print is displayed on the display unit 164 in step 226.

When the simulation image has been displayed on the display unit 164, the operator visually confirms the simulation image. Then, the operator examines whether or not the contents of the non-standard image processing of the corresponding specific film image which is performed when the main print is produced are acceptable conditions (that is, whether or not the non-standard image processing to be executed is a acceptable processing and whether or not the conditions for the non-standard image processing specified to be executed are acceptable conditions). The examination is performed on the basis of the image quality and so forth of the display simulation image. If the operator determines that the image quality and so forth of the simulation image are acceptable, the operator inputs information indicating "examination is OK". If the operator determines that the conditions for the non-standard image processing specified to be executed are unacceptable, if the operator determines that a non-standard image processing other than the non-standard image processing specified to be executed must be performed, or if the operator determines that a specific non-standard image processing among the non-standard image processings specified to be executed must be avoided, the operator operates the keyboard 166 to input modification information for specifying the modification of the contents of the non-standard image processing of the specific film image which is performed when the main print is produced.

If certain information (an specification) is input from the operator via the keyboard 166, the operation is shifted to step 228. On the basis of the information input from the operator, a determination is made as to whether or not the contents of the non-standard image processing of the specific film image which is performed when the main print is produced are acceptable. If the determination in step 228 is negated (if modification information is input), the routine moves to step 230. On the basis of the modification information input from the operator, the contents of the non-standard image processing of the specific film image which is performed when the main print is produced are modified. The routine then returns to step 224.

As a result, the simulation image data of the specific film (simulation image data subjected to only the image processing equivalent to the standard image processing) is again subjected to the following processing: the image processing equivalent to the non-standard image processing which is performed when the main print is produced is performed in accordance with the modified contents of the processing (step 224). On the basis of the simulation image data, a simulation image indicating the completed main print which is realized when the non-standard image processing is performed is displayed on the display unit 164 (step 226).

When the operator visually checks the simulation image of the displayed specific film image, the operator is able to easily determine whether or not the contents of the non-standard image processing specified to be modified on the basis of the input modification information are acceptable contents. If the contents of the non-standard image processing of the specific film image set initially and arranged to be performed when the main print is produced are unacceptable contents, steps 224 to 230 are repeated. Thus, the contents of the non-standard image processing of the specific film image which is performed when the main print is produced can be modified to appropriate contents.

If information indicating "examination is OK" is input by the operator, the determination in step 228 is affirmed. Then, the routine moves to step 232. Thus, the contents of the processing set at present are stored in the memory 162 or the likes as the contents of the non-standard image processing of the specific film image which is performed when the main print is produced. Then, the routine returns to step 222. As a result, the contents of the non-standard image processing of the film image determined to be subjected to the non-standard image processing by the operator are set. The determined film image is one of film images (the film images recorded on one photographic film roll) corresponding to the simulation images which are being displayed on the display unit 164.

When the contents of the non-standard image processing has been set as described above, the determination in step 222 is negated. Then, the routine moves to step 234. As a result, the contents of the image processing of each film image which is performed when the main print is produced and the conditions for the fine scan are decided. The reading conditions of each film image are communicated to the line CCD scanner 14 when the line CCD scanner 14 performs the fine scan. The contents (the conditions of the standard image processing, the non-standard image processing which is performed and the conditions for the non-standard image processing) of the image processing of each film image are communicated to the image processor 140 when fine scan image data of each film image is input from the line CCD scanner 14.

Figure 6A:
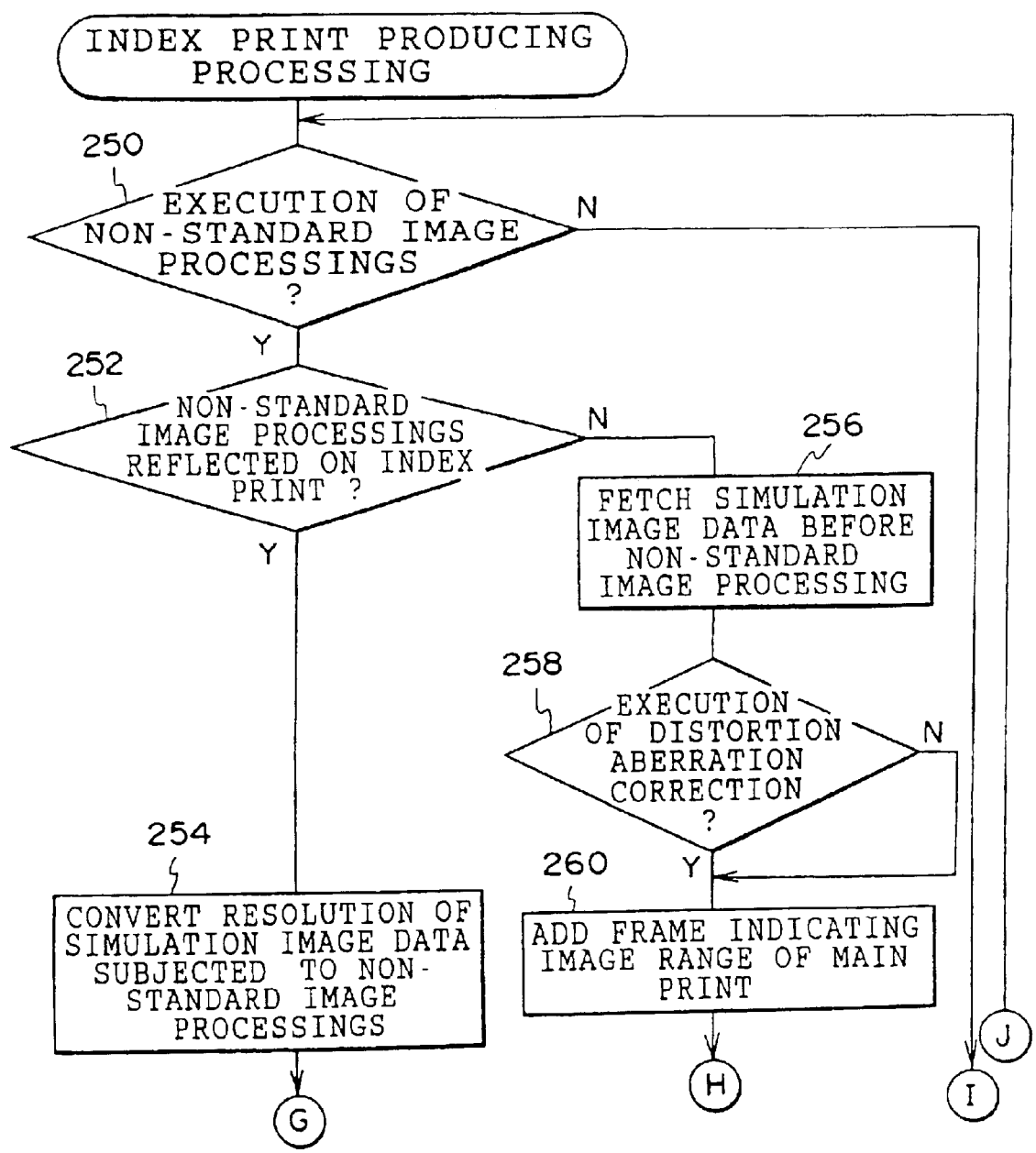
FIGS. 6A and 6B are flow charts showing the contents of index print producing processing which are performed in the image processing section according to the first embodiment of the present invention.
Figure 6B:
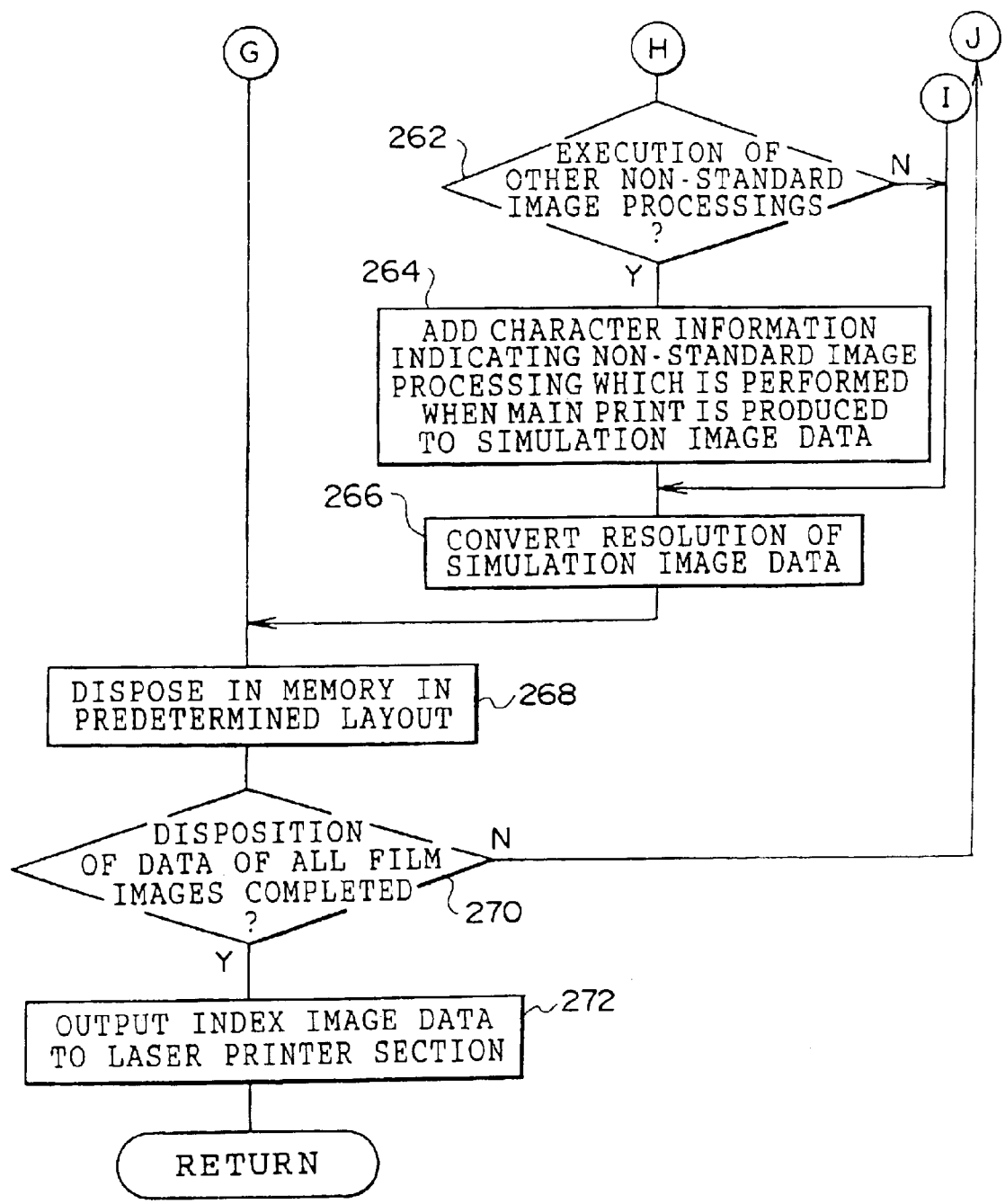

In step 234 whether or not an index print is produced is determined. If the determination is negated, no operation is performed and the pre-scan processing is completed. If the determination is affirmed, the routine moves to step 236 so that the index print producing processing is performed. The index print producing processing will now be described with reference to flow charts shown in FIGS. 6A and 6B.

In step 250, among the film images having the contents of the image processing which have been determined as described above, a film image recorded at the leading end of one photographic film roll is set as the film image to be processed. On the basis of the determined contents of the image processing of the film image to be processed which are performed when the main print is produced, whether or not the non-standard image processing of the film image to be processed is performed by the image processor 140 when the main print is produced is determined.

If the film image to be processed is the film image which is not subjected to the non-standard image processing by the image processor 140 when the main print is produced, the determination in step 250 is negated. Then, the routine moves to step 266 so that simulation image data (image data subjected to the image processing equivalent to the standard image processing) of the film image to be processed is fetched. Then, conversion of the resolution is performed for the purpose of producing the index print. In step 268 simulation image data subjected to the conversion of the resolution is stored at a storage position on a storage region of a storage means (for example, the frame memory 142 of the image processor section 136) corresponding to a predetermined layout (a layout in which each index image is disposed on the index print). The simulation image data is stored as index image data. Note that step 268 corresponds to the disposing means according to the fifth aspect of the present invention.

If the film image to be processed is a film image which is subjected to the non-standard image processing by the image processor 140 when the main print is produced, the determination in step 250 is affirmed. Then, the routine moves to step 252 so that a determination is made whether or not the non-standard image processing of the film image to be processed when the main print is produced is reflected (simulation image data subjected to the image processing equivalent to the non-standard image processing is used as index image data to realize the completed index image equivalent to the simulation image) to the completed index image on the index print corresponding to the film image to be processed.

The determination whether or not the non-standard image processing is reflected to the completed the index image is previously selected by the operator. Information indicating a result of the selection performed by the operator is stored in the memory 162. The determination made in step 252 is performed on the basis of the information stored in the memory 162. Note that the above operation corresponds to the fourth aspect of the present invention.

If the fact that the non-standard image processing which is performed when the main print is produced is reflected on the completed index image is selected, the determination in step 252 image data affirmed. Thus, the routine moves to step 254. Therefore, simulation image data of the film image which has been subjected to the processing equivalent to the non-standard image processing in step 224 which is performed when the main print is produced and to be processed is fetched. The conversion of resolution of the simulation image data is performed. Then, the routine moves to step 268 so that simulation image data is stored at the storage position in accordance with the predetermined layout on the storage region of the storage means as index image data.

When the simulation image data subjected to the processing equivalent to the non-standard image processing when the main print is produced is stored as the index image data, step 210 in which the processing equivalent to the standard image processing when the main print is produced and step 224 in which the processing equivalent to the non-standard image processing when the main print is produced correspond to the first image processing according to the first, second, third, fourth and fifth aspects of the present invention.

When the fact that the non-standard image processing when the main print is produced is not reflected to the completed index image (when simulation image data subjected to the image processing equivalent to the non-standard image processing is not used as index image) has been selected, the determination in step 252 is negated. Thus, the routine moves to step 256 so that a processing of fetching simulation image data is performed. The fetching processing is performed such that simulation image data (that is, simulation image data subjected to only the standard image processing) before the image processing equivalent to the non-standard image processing and arranged to be performed is fetched in step 224.

In step 258 a determination is made whether or not the film image to be processed is subjected to the distortion aberration correction processing which is one of the non-standard image processings by the image processor 140. In general, each lens has distortion aberration. The lens of, for example, film with lens attached constituted by a low-cost plastic lens has a great distortion aberration quantity. A film image recorded on a photographic film by the film with lens attached or the like has relatively considerable geometrical distortion aberration according to the distortion aberration of the lens. In this embodiment, a film image of the above type is usually subjected to the distortion aberration correction processing for correcting the geometrical distortion aberration.

Specifically, the distortion aberration correction processing is performed such that the amount and the direction of movement of the position of each of pixels to be positioned in the lattice configuration on the film image and which are moved according to the distortion aberration of the lens are previously measured for each type of lens. Results of the measurements are stored as aberration correction data. On the basis of the aberration correction data, an interpolation processing is performed to obtain the value (for example, the density level of each of component colors (R, G and B or C, M and Y) at the original position (the lattice position) for data of each pixel which constitutes the image data. Since the contour of the image indicated by image data before the distortion aberration correction processing is in the form of a rectangular, the contour of the image indicated by image data after the distortion aberration correction processing is formed into a non-rectangular shape. Therefore, image data which is used when the main print is produced must be cut from image data subjected to the distortion aberration correction processing.

When the non-standard image processing which is performed when the main print is produced is reflected to the completed index image, simulation image data of the film image subjected to the image processing to the non-standard image processing is used to produce the index print. Therefore, on the index image, the image range of a film image which is subjected to the distortion aberration correction processing by the image processor 140 when the main print is produced coincides with the image range on the main print. When the non-standard image processing which is performed when the main print is produced is not reflected to the completed index image, the image range on the index image of the film image which is subjected to the distortion aberration correction processing by the image processor 140 does not coincide with the image rage on the main print.

Therefore, in this embodiment, if the determination in step 258 is negated (if the distortion aberration correction processing is not performed when the main print is produced), no processing is performed and the operation is shifted to step 262. If the determination in step 258 is affirmed, the operation is shifted to step 260. Thus, frame data for overlaying and displaying, on the index image, a frame indicating the image range on the main print is added to simulation image data. Then, the routine moves to step 262. If another image processing for omitting a portion of the original image from the main image is performed when the main print is produced, the above processing may be performed.

In step 262, a determination is made whether or not a non-standard image processing of the film image to be processed except for the distortion aberration correction processing is performed by the image processor 140 when the main print is produced. If the determination is negated, the routine moves to step 266. If the determination is affirmed, the routine moves to step 264. Thus, character information (text data or bit map data) indicating the non-standard image processing except for the distortion aberration correction processing and arranged to be performed by the image processor 140 when the main print is produced is added to simulation image data.

Step 264 corresponds to a second image processing according to the present invention (specifically a second image processing according to the second aspect of the present invention). In the above case, step 210 in which the processing equivalent to standard image processing when the main print is produced corresponds to a fact that "only an image processing equivalent to a standard image processing from among the image processings when the main image is output is performed". Moreover, above step 260 corresponds to a fact that "a frame instructing the portions cut out from the main image is superposed and recorded" according to the third aspect of the present invention.

In step 266 resolution of simulation image data subjected to the above processing is converted for the purpose of producing an index print. In step 268 simulation image data subjected to the conversion of the resolution is, as index image data, stored at a storage position corresponding to the predetermined layout on the storage region of the storage means. In step 270 a determination is made whether or not, with respect to all of the film images recorded on one photographic film roll, the simulation image data corresponding to the index image data, have been disposed on the storage region of the storage means. If the determination is negated, the routine moves to step 250. Then, steps 250 to 270 are repeated until the determination in step 270 is affirmed.

As a result, each of the film image recorded on the photographic film is, as a film image to be processed, set in the recording order on the photographic film. Thus, the above processings are performed. On the storage region of the storage means, index print image data is produced which has index image data (simulation image data subjected to the conversion of the resolution) of the film images. Index print image data is disposed in the matrix configuration. If the determination in step 270 is affirmed, the routine moves to step 272. Then, index print image data produced on the storage region of the storage means is transferred to the laser printer section 18. Thus, the index print producing processing (and the pre-scan processing) is completed. Step 272, the laser printer section 18 and the processor section 20 correspond to a producing means according to the fifth aspect of the present invention.

When index print image data has been transferred to the laser printer section 18, R, G and B laser beams emitted from the laser beam source are modulated on the basis of the index print image data. Then, the modulated laser beams are scanned on the photographic paper so that the index print image is exposed and recorded on the photographic paper. The photographic paper on which the index print image has been exposed and recorded is, in the processor section 20, subjected to color development, bleaching and fixing, water washing and drying. Thus, the image exposed and recorded on the photographic paper is formed into a visible image. As a result, an index print having a plurality of index images disposed in the matrix configuration as shown in FIGS. 7A to 7C are produced.

FIG. 7A shows an example of an index print which is produced when reflection of the non-standard image processing which is performed when the main print is produced on the completed index image has been selected and an image processing (a non-standard image processing) is performed in which the tone of the index image on the index print corresponding to a seventh film image is completed in sepia when the main print is produced. As can be understood from FIG. 7A, simulation image data is used which has been subjected to the image processing which is equivalent to the above image processing and in which the tone of the index image on the index print corresponding to the seventh film image is completed in sepia enables a sepia image equivalent to the main print.

In the above case, all of the film images including the film image which is subjected to the non-standard image processing when the main print is produced have substantially the same finish state of each of the index images on the index print. Thus, when a reference to each index image of the index print is made, the finish state of the corresponding main print can easily be recognized by the user.

FIG. 7B shows an example of an index print which is produced when reflection of the non-standard image processing which is performed when the main print is produced on the completed index image has not been selected and an image processing (a non-standard image processing) is performed in which the tone of the index image on the index print corresponding to a seventh film image is completed in sepia when the main print is produced. As can be understood from FIG. 7B, the index image which corresponds to the film image in the seventh frame and which is positioned on the index print has character information "sepia" indicating the contents of the non-standard image processing which is performed when the main print is produced which is added according to the processing in step 264.

In the above case, the completed index image of the film image which is subjected to the non-standard image processing when the main print is produced on the index print does not coincide with the finish state of the corresponding main print. When a reference to character information added to the index image is made, the user is able to easily recognize the contents of the non-standard image processing which is performed when the main print is produced. Therefore, the user is able to easily recognize the finish state of the corresponding main print. Another effect can be obtained in that the finish state of the main print which is produced when any non-standard image processing is not performed can easily be recognized by the user.

FIG. 7C shows an example of an index print which is produced when reflection of the non-standard image processing which is performed when the main print is produced on the completed index print is not selected and the distortion aberration correction processing (the non-standard image processing) is performed when the main print is produced. As can be understood from FIG. 7C, a frame indicating the image range of the main print which is changed owing to the distortion aberration correction processing which is performed when the main print is produced is superposed on the displayed index image as a result of the processing in step 260.

When the non-standard image processing which is performed when the main print is produced is not reflected on the finish of the index image, the image range of the index image of the film image which is subjected to the distortion aberration correction processing which is one of the non-standard image processings when the main print is produced does not, on the index print, coincide with the image range of the corresponding main print (the range is wider than the image range of the main print). When a reference to the frame superposed on the index image is made, the user is able to easily be recognize the image range on the main print.

When pre-scan of the photographic film has been completed, the line CCD scanner 14 performs fine scan such that the photographic film is read for each film image. The fine scan is performed such that the reading conditions of each film image is communicated from the automatic set-up engine 144 to the line CCD scanner 14. The line CCD scanner 14 reads (fine-scans) each film image under the communicated reading conditions.

The contents (the conditions of the standard image processing, the non-standard image processing to be performed and its processing conditions) of the image processing to which each film image is subjected are communicated from the automatic set-up engine 144 to the image processor 140 when fine scan image data of each film image is input from the line CCD scanner 14. The image processor 140 subjects the input fine scan image data of each film image to the image processing having the communicated contents. Then, the image processor 140 transfers image data for recording to the laser printer section 18.

The laser printer section 18 modulates R, G and B laser beams emitted from the laser beam sources on the basis of the transferred image data for recording. Then, the modulated laser beams are scanned on the photographic paper so that the image is exposed and recorded on the photographic paper. The processor section 20 subjects the photographic paper on which the image has been exposed and recorded to the color development, bleaching and fixing, water washing and drying. Thus, the image exposed and recorded on the photographic paper is formed into a visible image. Thus, the main print is produced.

In addition to image data for recording, the image processor 140 transfers information indicating the executed non-standard image processing to the laser printer section 18. As shown in FIGS. 7A, 7B and 7C, characters indicating the non-standard image processing executed by the image processor 140 is recorded on the reverse side of the main print. The user makes a reference to the characters printed on the reverse side of the main print so as to recognize the non-standard image processing performed when the main print has been performed.

When character information indicating the contents of the non-standard image processing which is performed when the main print is produced is added, addition of a multiplicity of characters indicating a multiplicity of non-standard image processings performed when the main print has been produced sometimes inhibit easy recognition of the index image. In consideration of this, a priority order of the various non-standard image processings is previously determined. When a multiplicity of non-standard image processings are performed when the main print is produced, character information indicating only a predetermined number (one or more) of non-standard image processings given priority may be added.

In the above embodiment, data of the original image according to the present invention is pre-scan image data obtained by reading (pre-scanning) the film image recorded on the photographic film with a relatively low resolution. Image data (simulation image data) obtained by subjecting pre-scan image data to at least the standard image processing among the image processings which are performed when the main print is produced is used to produce the index print. The present invention is not limited to the above arrangement. Fine scan image data obtained by reading (fine-scanning) the film image with a resolution higher than that employed when pre-scan has been performed may be used as the data of the original image to produce the index print.

Fine scan image data has a resolution higher than that of pre-scan image data. Since the resolution is considerably different from that of index image data, the image processing system including the processing for changing the resolution becomes too complicated to quickly complete the processing. The reading conditions are usually different between pre-scan and fine scan. Since the main print is produced by using fine scan image data, the completed index image can be made accurately coincide with the completed main print by producing the index print by using fine scan image data.

When fine scan image data is used to produce the index print, index image data may be produced by the personal computer 158 as described above. Since the image processor 140 has a function of performing the various image processings of fine scan image data, index image data may be produced by the image processor 140. In the above case, the image processor 140 may be structured as shown in FIG. 8.

Figure 8:
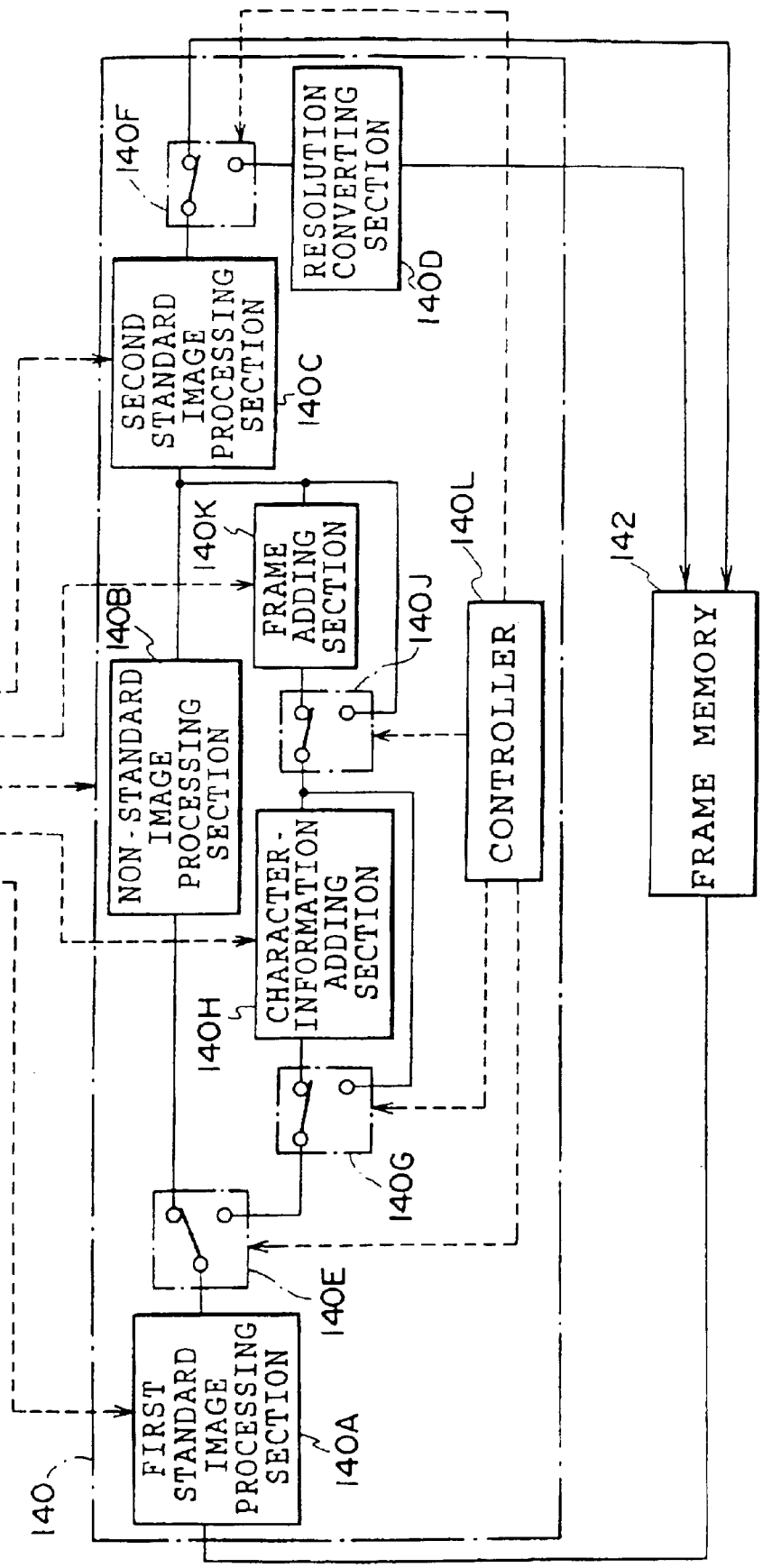
FIG. 8 is a block diagram showing the schematic structure of an image processor when an image processor is used to produce an index print according to the first embodiment of the present invention.

The image processor 140 shown in FIG. 8 incorporates a first standard-image processing section 140A for subjecting input image data to a portion of the standard image processings. A switch 140E is provided for the output side of the first standard-image processing section 140A. The switch 140E selectively outputs input image data to a non-standard-image processing section 140B, which subjects image data to the non-standard image processings, or a switch 140G. A second standard-image processing section 140C for subjecting image data to standard image processings which are not performed by the first standard-image processing section 140A is provided for the output side of the non-standard-image processing section 140B. A switch 140F is provided for the output side of the second standard-image processing section 140C. The switch 140F selectively outputs input image data to the frame memory 142 or a resolution converting section 140D. The resolution converting portion 140D changes the resolution of input image data to the resolution which is the same as that of index image data, and then outputs image data to the frame memory 142.

The switch 140G selectively outputs input image data to a character-information adding section 140H which adds character information indicating the contents of the non-standard image processings which are performed by the non-standard-image processing section 140B when the main print is produced or a switch 140J provided for the output side of the character-information adding section 140H. The switch 140J selectively outputs input image data to a frame adding section 140K, which adds frame information indicating an image range of the main print realized when the distortion aberration correction processing is performed by the non-standard-image processing section 140B when the main print is produced, or a second standard-image processing section 140C connected to the output side of the frame adding section 140K.

When the main print is produced, a controller 140L controls the switches 140E and 140F. Thus, fine scan image data temporarily stored in the frame memory 142 is processed sequentially by the first standard-image processing section 140A, the non-standard-image processing section 140B and the second standard-image processing section 140C so as to be again stored in the frame memory 142. When the index print is produced and reflection of the non-standard image processing to the completed index image has been selected, the switches 140E and 140F are controlled. Thus, fine scan image data is sequentially processed by the first standard-image processing section 140A, the non-standard-image processing section 140B, the second standard-image processing section 140C and the resolution converting portion 140D. Then, fine scan image data is again stored at the storage position corresponding to the predetermined layout on the storage region of the frame memory 142.

When index print is produced and reflection of the non-standard image processings to the completed index image has been selected, the controller 140L controls the switches 140E and 140F. Thus, fine scan image data output from the first standard-image processing section 140A to the switch 140G, image data output from the second standard-image processing section 140C is output to the switch 140G and image data output from the resolution converting portion 140D is again stored at the storage position corresponding to the predetermined layout on the storage region of the frame memory 142. When fine scan image data, to be processed, is subjected to the non-standard image processings except for the distortion aberration correction processing when the main print is produced, the controller 140L controls the switch 140G so as to input the image data to the character-information adding section 140H. Except above cases, image data bypasses the character-information adding section 140H, and then it is input to the switch 140J. When fine scan image data, to be processed, is subjected to the distortion aberration correction processing when the main print is produced, image data is input to the frame adding section 140K. In the other cases, the switch 140J is controlled so that image data bypasses the frame adding section 140K and it is input to the second standard-image processing section 140C.

When the image processor 140 is structured as described above, index image data can be produced from fine scan image data by the image processor 140.

In the above embodiment, all of the image processings of the fine scan image which are performed when the main print is produced are performed by the image processor 140. The structure is not limited to this. A portion (for example, the non-standard image processings or a portion of the same) of the image processings which are performed when the main print is produced may be performed by the personal computer 158.

Hitherto, an index print (also called a file print) is sometimes recorded and produced such that each image of the index print has a relatively large size from a plurality of film images recorded on a reversal film. As a matter of course, the index print according to the present invention includes the file print.

In the above embodiment, data of the original image is scan image data obtained by reading a film image recorded on a photographic film. The present invention is not limited to the above arrangement. Image data obtained by reading an image recorded on a recording medium, such as paper, except for the photographic film, image data recorded on an information recording medium according to the photographing operation using a digital camera or image data produced by a computer may be data of the original image.

In the above embodiment, an example of the processing for outputting a main image is a processing for exposing and recording an image (a main image) on photographic paper to produce a main print. The present invention is not limited to this. The main image may be displayed on a display unit, such as a CRT or an LCD, or image data indicating the main image may be stored in an information recording medium, such as a magnetic disk, such as a floppy disk, or magneto-optical disk.

The standard image processings and the non-standard image processings according to the above embodiment are taken as examples. As a matter of course, arbitrary standard image processings or non-standard image processings may be employed.

The first embodiment of the present invention has been described. The first embodiment including the index print producing method according to the first, second, third and fourth aspects of the present invention and the image processing system according to the fifth aspect of the present invention includes the following aspects.

(1) An aspect of an index print producing method according to the first aspect of the present invention, wherein data of the original image is generated obtained by reading a film image recorded on a photographic film, the contents of image processings which are performed when the main image is output are determined on the basis of the image data obtained by previously reading the film image with a predetermined resolution, image data obtained by main-reading the film image with a resolution higher than the predetermined resolution is subjected to the image processings having the determined contents so as to obtain image data for outputting the main image, and image data of a plurality of original images obtained by the previous reading is used as data of the original image of the plurality of original images so as to produce an index print.

(2) An aspect of an index print producing method according to the first aspect of the present invention, wherein data of the original image is generated obtained by reading a film image recorded on a photographic film, the contents of image processings which are performed when the main image is output are determined on the basis of the image data obtained by previously reading the film image with a predetermined resolution, image data obtained by main-reading the film image with a resolution higher than the predetermined resolution is subjected to the image processings having the determined contents so as to obtain image data for outputting the main image, and image data of a plurality of original images obtained by the main reading is used as data of the original image of the plurality of original images so as to produce an index print.

As described above, the index print producing method according to the tenth aspect of the present invention is arranged to subject original image data of a plurality of original images to the first image processing equivalent to the image processing which is performed when the main image is output or a second image processing for adding information indicating the contents of the image processings which are performed when the main image is output. Image data of the plurality of original images subjected to the first image processing the second image processing is disposed to form a predetermined layout. Image data disposed to form the predetermined layout is used to record the image on a recording material so as to produce an index print. Therefore, an excellent effect can be obtained in that an index print having a plurality of images disposed to form a predetermined layout can be produced such that the completed main image of each image can easily be recognized.

The index print producing method according to the second aspect of the present invention has an arrangement according to the first aspect of the present invention, wherein when data of the original image is subjected to the second image processing when an index print is produced, data of a plurality of original images is subjected to only an image processing equivalent to a specific image processing among image processings which are performed when the main image is output. Therefore, the completed main image formed if the image processing except for the specific image processing is not performed can easily be recognized. Therefore, an effect can be obtained in that a user is able to easily select whether or not the image processing except for the specific image processing is executed when output of the specific image is again specified.

The index print producing method according to the third aspect of the present invention has an arrangement according to the first aspect of the present invention, wherein when data of the original image is subjected to the second image processing when an index print is produced, an original image having a portion which is omitted from the main image when the image processing is performed when the main image is output is processed such that a frame indicating the portion which is omitted from the main image is superposed on the image of the index print corresponding to the original image and recorded on the image or the comopleted portion on the image of the index print which is omitted is changed. In addition to the above effects, an effect can be obtained in that the portion which is omitted from the main image can easily be recognized by making a reference to the index print if the portion is omitted from the main image according to the image processing which is performed when the main image is output.

The index print producing method according to the fourth aspect of the present invention has an arrangement according to the first aspect of the present invention, wherein when an index print is produced, the first image processing the second image processing is selected, and the first image processing the second image processing is performed on the basis of the result of the selection. Therefore, in addition to the above effects, an effect can be obtained in that two types of index prints can selectively be produced to meet a requirement of a user.

The image processing system according to the fifth aspect of the present invention has a structure that the processing means subjects image data of a plurality of original images to the first image processing equivalent to the image processing which is performed when a main image is output or the second image processing for adding information indicating the contents of image processings which are performed when the main image is output, the disposing means disposes image data of the plurality of original images subjected to the first image processing the second image processing to form a predetermined layout, the producing means records the image on a recording material by using image data disposed to form the predetermined layout so as to produce an index print. Therefore, an excellent effect can be obtained in that the index having the plurality of images disposed to form a predetermined layout can be produced such that the completed main image of each image can easily be recognized.

The operation of the second embodiment will now be described. In this case, control routines of a processing for reading a film image and an image processing which are performed by the CPU 160 of the personal computer 158 will now be described with reference to a flow chart shown in FIG. 10.

When an operator has inserted an APS film 102 into an insertion opening (not shown) of the film carrier 38 followed by specifying start of a predetermined processing, the control routine shown in FIG. 10 is performed by the CPU 160.

In step 402 shown in FIG. 10, a magnetic head (not shown) of the film carrier 38 is operated to read the type of lens. In step 404 pre-scan is performed. That is, images on the APS film 102 are read with a low resolution while the APS film 102 is being moved. In step 406 fine scan is performed. That is, reading conditions for each film image are determined on the basis of the images read in the pre-scanning operation. Then, the images are read with a high resolution.

In step 408 a processing is performed to extract a main object (for example, the face of a person) in the read image. The above processing is performed by obtaining change value (an edge intensity) in the density from surrounding pixels to trace the outline of the face of the person in accordance with the edge intensity.

In step 410 whether or not the face portion is eclipsed (has image voids) if the distortion aberration correction processing is performed is determined on the basis of the obtained outline data. The above processing is performed by using obtained outline data such that distance D from the coordinates of each of four ends to the four ends of the rectangular region 308 is obtained. On the basis of the distance D, whether or not the face portion is eclipsed is determined.

If a determination is made that the face portion is not eclipsed, a correction coefficient corresponding to the type of lens is read from the hard disk 168 in step 412. On the basis of the correction coefficient, a usual aberration correction processing is performed. If a determination is made that the face portion is eclipsed, a correction coefficient corresponding to the type of lens and the distance D is read from the hard disk 168. On the basis of the correction coefficient, the correction intensity is weakened such that the aberration correction processing is performed to an extent with which the face portion is not eclipsed. In an example shown in FIG. 11B, the illustrated left-hand end of the face is eclipsed. Therefore, the correction intensity in the horizontal direction is weakened when the aberration is corrected. When the above-mentioned aberration correction is performed, eclipse of the face portion can be prevented as shown in FIG. 11C.

Figure 11C:
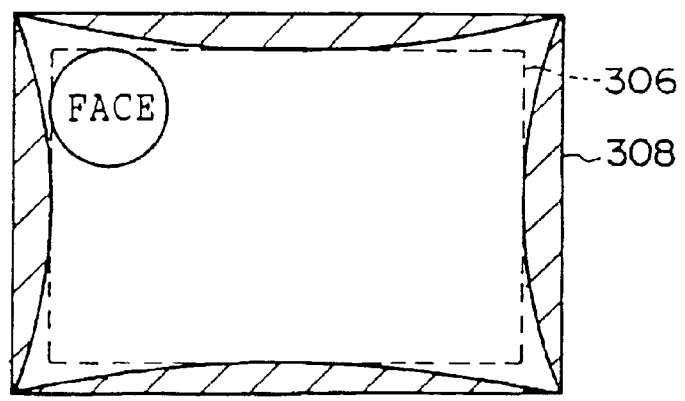
FIG. 11C is a diagram showing an image after aberration correction has been performed outside the range including the face portion according to the second embodiment of the present invention.

In step 416 a rectangular region 306 which is a dashed-line portion shown in FIG. 11C is subjected to an electronic power varying processing to enlarge the size to a predetermined print size. In step 418 image data subjected to the aberration correction and the electronic power varying processing is output to the laser printer section 18.

In the laser printer section 18, printing and exposing of the image on photographic paper are performed on the basis of the image data output from the image processing section 16. In the processor section 20, color development, bleaching and fixing, water washing and drying are performed. Thus, the image is formed on the photographic paper.

If the face of a person exists at an end of the photographed image, the face portion is automatically extracted and aberration correction is performed in accordance with the position of the face. Therefore, eclipse of the photographed face portion can be prevented so that a printed image is finished naturally.

If eclipse of the face portion occurring according to the aberration correction is expected, aberration correction may be omitted. In the above case, step 414 shown in FIG. 10 is not performed and step 416 is performed.

The determination whether or not the aberration correction is performed may be made by order information from a customer. For example, selection from three types of specifications is permitted at the laboratory. The three types include an specification that the aberration correction is given priority (eclipse of the face portion is allowed), an specification that the aberration correction is not performed and including of the face portion in the print range is given priority and an specification that the aberration correction is performed to an extent with which eclipse of the face portion does not take place. On the basis of the order information from the customer, the processing is performed. Thus, a print process satisfying the requirement from the customer can be performed.

Although the third embodiment has been described to prevent eclipse of the face portion, the present invention is not limited to this. The present invention may be applied to a characteristic shape which can easily be extracted.

In the third embodiment, the type of lens is previously recorded on the photographic film. Data (the correction coefficient) of the lens may be recorded on the photographic film.

The image processing method according to the sixth, seventh and ninth aspects of the present invention and the image processing device according to the tenth, eleventh, twelfth and thirteenth aspects of the present invention have the above arrangement. That is, an image recorded on a photo sensitive material is read, and the main object of the read image is extracted. If determination is made that the extracted main object is eclipsed according to the aberration correction, the aberration correction is performed to an extent with which the main object is not eclipsed. Therefore, an excellent effect can be obtained in that the main object can be included in the print range such that the distortion aberration of the image is appropriately corrected.

The operation of the third embodiment will now be described. In this case, a processing will now be described which is performed when a first request is an output of an image of a certain photographic film (equivalently to so-called simultaneous printing, development of a photographic film and output of images recorded on the photographic film is requested). When the first output of the images is performed, the photographic film to be processed is subjected to processings such as development by a film processor (not shown). Then, the film image is formed into a visible image, and then photographic film is set to the line CCD scanner 14 so that the film image is read.

As described above, the line CCD scanner 14, two times, reads the film images recorded on the photographic film (pre-scan and fine scan). The overall surface of the photographic film to be processed (to be read) is pre-scanned by the line CCD scanner 14. When pre-scan data has been input from the line CCD scanner 14 to the image processing section 16, the line scanner correcting section 122 subjects input pre-scan data to the dark correction, density conversion, shading correction and defective-pixel correction.

Figure 15A:
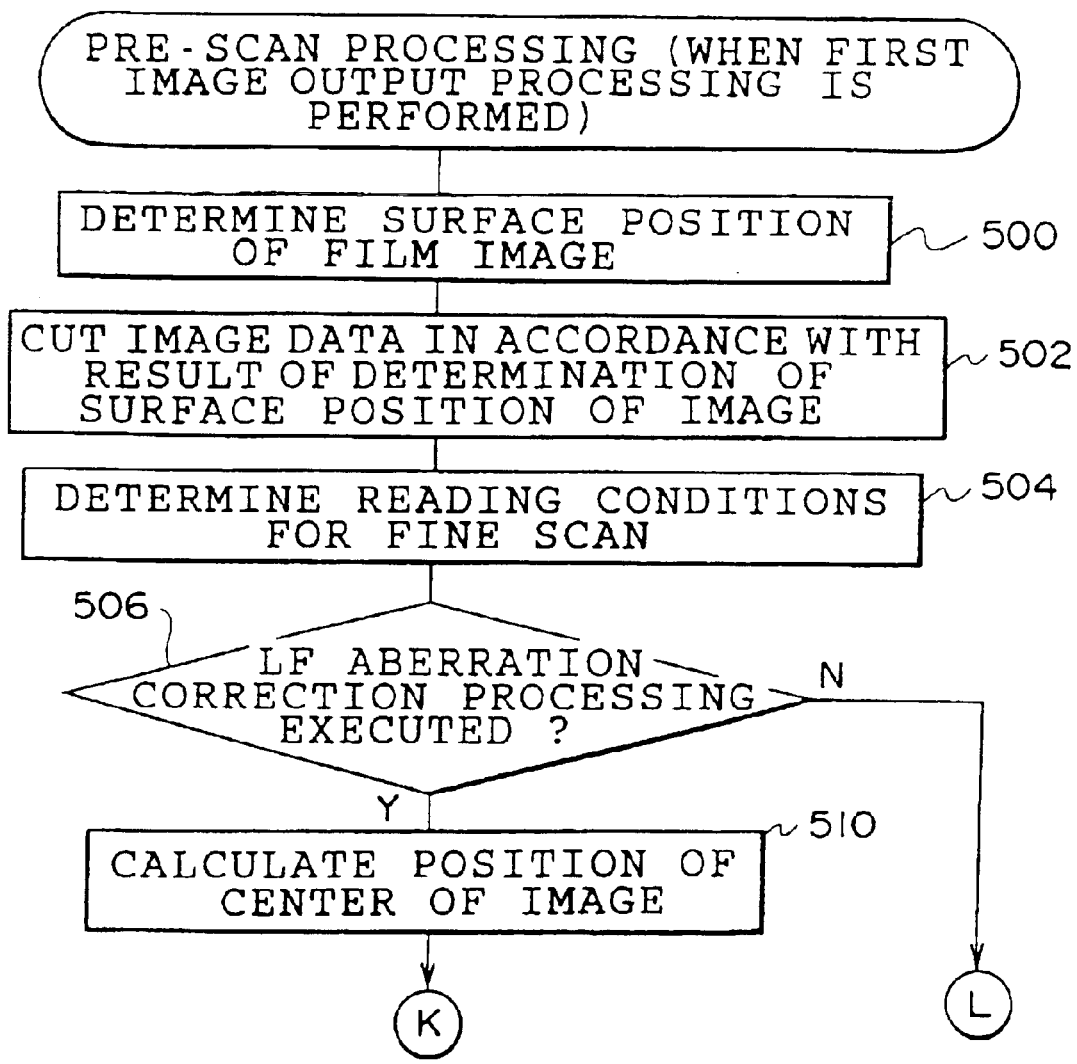
FIGS. 15A, 15B and 15C are flow charts showing the content of pre-scanning processing which are performed when image out processing is performed for a first image of each photographic film according to a third embodiment of the present invention.
Figure 15B:
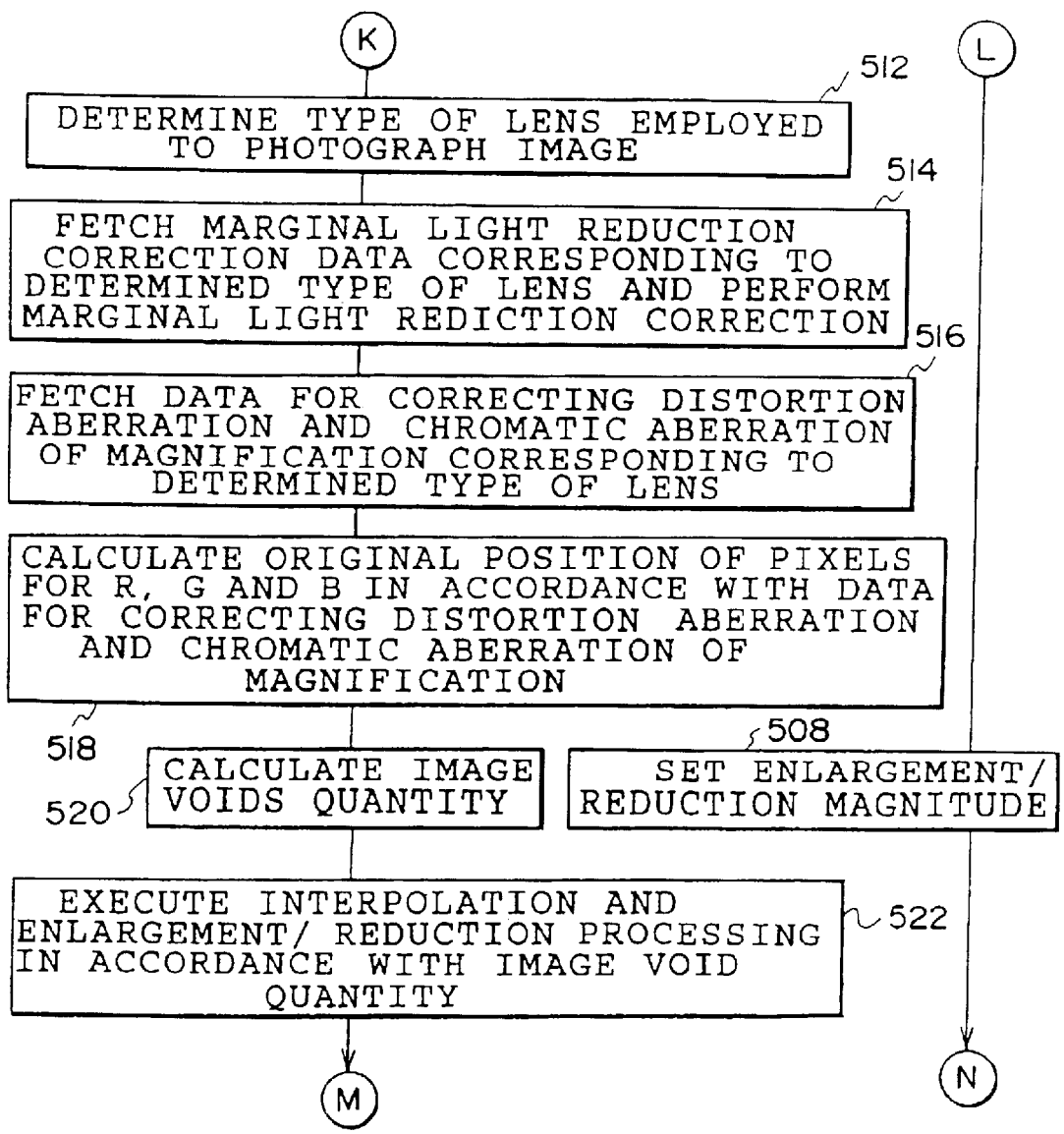
Figure 15C:
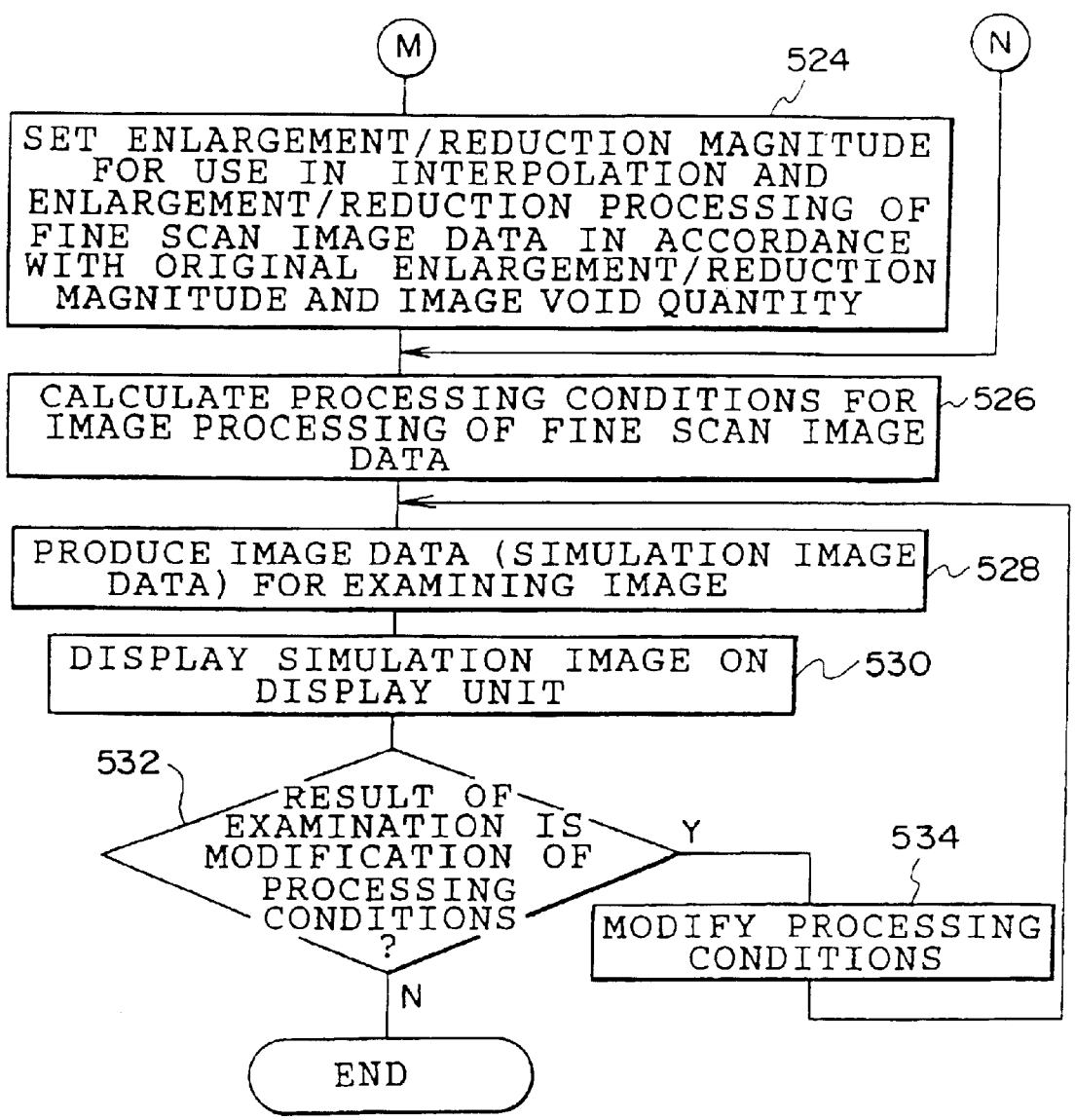

Pre-scan data output from the line scanner correcting section 122 is temporarily stored in the pre-scan memory 135 through the selector 132. Then, pre-scan data is fetched by the automatic set-up engine 144. Then, (the set-up calculating section 144A) of the automatic set-up engine 144 and (the image-data processing section 158A and the image display section 158B) of the personal computer 158 perform the pre-scan processing. The pre-scan processing which is performed when a first output of the image of the photographic film will now be described with reference to the flow charts shown in FIGS. 15A, 15B and 15C. FIGS. 15A, 15B and 15C show the flow of the pre-scan processing for one film image. Note that a plurality of film images recorded on one photographic film are simultaneously subjected to the following pre-scan processing.

In step 500 the image plane position of film image (the position of the frame) recorded on the photographic film is determined on the basis of the pre-scan data fetched from the pre-scan memory 135. The determination of the image plane position can be performed by determining edge positions (positions of the outer ends of the image) of the two sides (upstream and downstream) in the direction (in the lengthwise direction of the photographic film) of movement of the photographic film and two sides of the widthwise direction of the photographic film which is perpendicular to the direction of movement.

The determination of the edge positions of the two sides in the lengthwise direction of the film can be made as disclosed by the applicant of the present invention in JP-A Nos. 8-304932, 8-304933, 8-304934 and 8-304935. According to the disclosures, change value in the density of each pixel in the lengthwise direction of the film is calculated on the basis of the density of each pixel indicated by pre-scan data. Then, change values in the densities of pixels in the lengthwise direction of the film are, in line units, accumulated in the widthwise direction of the film. Then, the accumulated values of the lines are compared with one another. Also the edge positions of the two sides in the widthwise direction of the film can be made such that change value in the density of each pixel in the widthwise direction of the film is calculated on the basis of the density of each pixel indicated by pre-scan data. Then, change values in the densities of pixels in the widthwise direction of the film are, in line units, accumulated in the lengthwise direction of the film. Then, the accumulated values of the lines are compared with one another. When the photographic film 22 is an APS film, a region which has a possibility that edges exist from the perforation positions is set as a searching range. Then, the edges are searched in the range to be searched. Thus, time required to determine the edge positions can be shortened.

In step 502 image data (pre-scan image data) corresponding to the film image for one frame is cut from pre-scan data on the basis of the determined image plane position. In step 504 a variety of image characteristic quantities such as the density of a specific film image corresponding to cut the pre-scan image data are calculated on the basis of the pre-scan image data cut from pre-scan data in step 504. On the basis of the calculated image characteristic quantities, reading conditions for the fine scanning operation of the specific film image which is performed by the line CCD scanner 14 are calculated.

In step 506 whether or not image data is subjected to the LF aberration correction processing, such as the distortion aberration correction processing and the correction of chromatic aberration of magnification, is determined. In this embodiment, the LF aberration correction processing is performed only when the image data to be processed is image data indicating a film image photographed and recorded on the photographic film by the film with lens attached. A determination whether or not the image data to be processed is image data indicating the film image photographed and recorded on the photographic film by the film with lens attached can be performed as follows: the photographic film used as a film with lens attached is carried to the image processing system in a state in which the photographic film is accommodated in the body of the film with lens attached. Therefore, the type of lens of the film with lens attached is determined when the photographic film is taken from the body of the film with lens attached to provide a mark indicating the type of the film with lens attached among many types of films, which are on the market and each of which with lens attached which has photographed the image. As an alternative to this, an identification code indicating information equivalently to the above mark is recorded on a magnetic layer. Therefore, detection can whether or not the film with lens attached has the mark or the identification code. When a film with lens attached is produced, the mark may be provided for a photographic film in the form of the film with lens attached or an identification code may be recorded on a magnetic layer.

If the determination is negated in step 506, the routine moves to step 508. Thus, an enlargement/reduction magnification for use in a processing for enlarging/reducing fine scan image data is set in accordance with the size of the film image or the size of an output image (an image to be recorded on photographic paper, an image to be displayed on the display or an image indicated by image data to be stored in an information recording medium). Then, the routine moves to step 526. If the determination in 506 is affirmed, the routine moves to step 510. In steps 510 to 524, the LF aberration correction processing of pre-scan image data is performed.

That is, in step 510 the position of the center of the image is calculated on the basis of the pre-scan image data cut in step 502. The calculation of the position of the center of the image is performed as follows: the number $x_0$ of pixels of pre-scan image data in the direction x (in the lengthwise direction of the photographic film: see FIG. 14A) and the number $y_0$ of pre-scan image data in the direction y (in the widthwise direction of the photographic film: see FIG. 14A). Then, as the pixel at the center of the image, the pixel (the pixel of coordinates ($X_{P0}$, $y_{P0}$) shown in FIG. 14A: $x_{P0}$= $x_0/2$, $y_{P0}=y_0/2$) at the ($x_0/2$) th position in the direction x and ($y_0/2$) th position in the direction y are extracted.

In step 512 the type of lens employed in the processing for photographing the film image indicated by pre-scan image data is determined. The type of lens can be determined by reading the above-described mark or identification code to determine the type of film with lens attached which has photographed the image on the photographic film. In step 514 marginal-light-extinction correction data corresponding to the type of lens determined in step 512 is fetched. Fetched marginal-light-extinction correction data is used to perform marginal light extinction correction in accordance with equation (1).

The marginal light-extinction correction processing includes the following processings of data of each pixel. That is, the coordinates (x, y) of the pixel to be processed in the xy coordinate system and the extracted coordinates ($x_{P0}$, $y_{P0}$) of the position of the center of pixel are substituted for equation (2) in step 510. Then, the distance r from the center of the image of the pixel to be processed is calculated. Then, the distance r and the fetched marginal-light-extinction correction data (coefficients $a_1$, $a_2$ and $a_3$) are substituted for equation (1) so that correction exposure quantity logE is obtained. On the basis of the relationship between the exposure and density of the photographic film, the correction exposure logE is converted into correction density. Thus, the density of the pixel to be processed is shifted in a quantity corresponding to the correction density. Thus, reduction in the brightness of the marginal portion of the image caused by the marginal light extinction of the lens can be corrected.

The calculation using equation (2) corresponds to standardization of the coordinates (x, y) of each pixel from the position of the center of the image calculated in step 510. Since the marginal light extinction correction is performed with respect to the position of the center of the image, reduction in the brightness of the marginal portion of the image caused by the marginal light extinction of the lens can accurately be corrected.

In steps 516 to 522 pre-scan image data is subjected to the distortion aberration correction processing and the chromatic aberration of magnification processing. That is, in step 516 distortion aberration correction data and data of correction of chromatic aberration of magnification determined in step 512 and corresponding to the type of lens are fetched. On the basis of the fetched distortion aberration correction data and data of correction of chromatic aberration of magnification, the original position of the pixel (the position of the pixel in a case free from distortion aberration and the chromatic aberration of magnification) is calculated for R, G and B.

The above calculation will now be described. With respect to the position of the center of the image calculated in step 510, the coordinates (x, y) of each pixel are converted into coordinates. $(x_P, y_P)$ in the $x_P y_P$ coordinate system (see FIG. 14B) ($x_P = x - x_{P0}$, $y_P = y - y_{P0}$: that is standardization). The coordinates $(x_P, y_P)$ are used as a key to search corresponding distortion aberration quantity Dx $(x_P, y_P)$, Dy $(x_P, y_P)$, chromatic aberration of magnification quantities $\Delta Rx$ $(x_P, y_P)$, $\Delta Ry$ $(x_P, y_P)$, $\Delta Bx$ $(x_P, y_P)$ and $\Delta By$ $(x_P, y_P)$. The coordinates of data R $(x_P, y_P)$, G $(x_P, y_P)$ and B $(x_P, y_P)$ indicating the densities of R, G and B of the pixel having the coordinates $(x_P, y_P)$ are converted in accordance with the following equations (3) to (5):

$$R(x_{PR}, y_{PR}) \leftarrow R(x_P, y_P) \quad (3)$$

where $$x_{PR} = x_P + \Delta Rx(x_P, y_P) + Dx(x_P, y_P)$$

$$y_{PR} = y_P + \Delta Ry(x_P, y_P) + Dy(x_P, y_P)$$

$$G(x_{PG}, y_{PG}) \leftarrow G(x_P, y_P) \quad (4)$$

where $$x_{PG} = x_P + Dx(x_P, y_P)$$

$$y_{PG} = y_P + Dy(x_P, y_P)$$

$$B(x_{PB}, y_{PB}) \leftarrow B(x_P, y_P) \quad (5)$$

where $$x_{PB} = x_P + \Delta Bx(x_P, y_P) + Dx(x_P, y_P)$$

$$y_{PB} = y_P + \Delta By(x_P, y_P) + Dy(x_P, y_P)$$

Figure 16B:
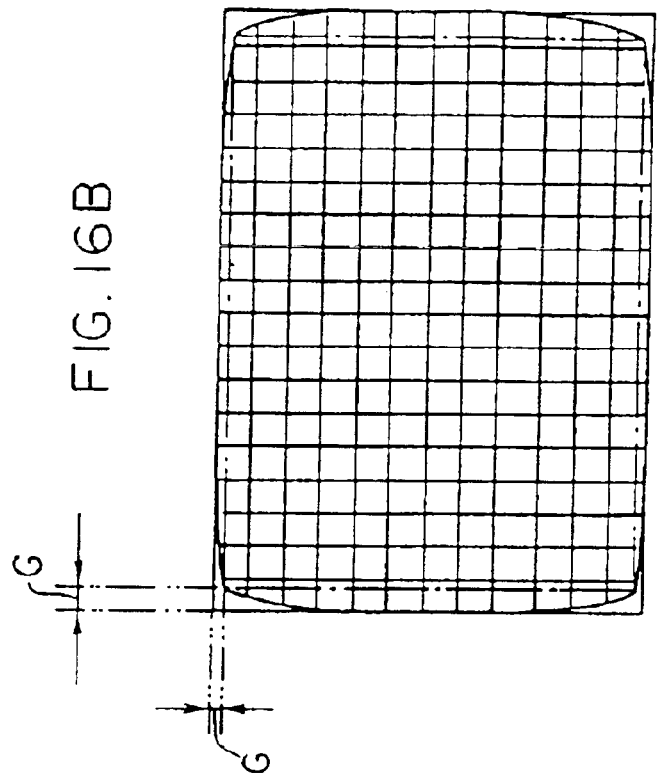
FIG. 16B is an image drawing showing the shape of the outline of an image represented by image data subjected to correction of distortion aberration according to the third and fourth embodiments of the present invention.
Figure 16A:
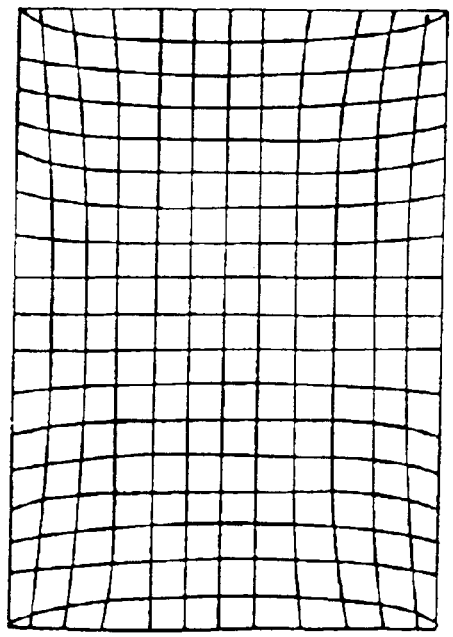
FIG. 16A is an image diagram showing geometrical distortion of an image arising from distortion aberration of a lens according to the third and fourth embodiments of the present invention.

The film image photographed and recorded on a photographic film by the film with lens attached encounters geometrical distortion aberration (so-called pincushion type distortion aberration) as shown in FIG. 16A. FIGS. 16A and 16B show examples in which an image having a multiplicity of lines disposed in a lattice configuration has been photographed and recorded on a photographic film by a film with lens attached. If the image having the above-mentioned geometrical distortion aberration is subjected to the distortion aberration correction processing, the contour of the image is formed into a so-called barrel shape, as shown in FIG. 16B. Thus, a region having uncertain density (a bland region or a region having an uncertain density indicated with void portions adjacent to the four corners of the image shown in FIG. 16B. Hereinafter, call image void region) is produced. Therefore, when the distortion aberration correction processing is performed, image data (for example, image data in a range indicated with an alternate long and short dash line shown in FIG. 16B) must be cut from image data subjected to the distortion aberration correction processing to prevent the fact that the image void region is not included in the output image. Then, cut image data must be subjected to an enlarging/reducing processing in accordance with the size of the output image.

The size of the image void region (the quantity of image voids) is changed in accordance with the distortion aberration of the lens. Therefore, in step 520, the quantity of image voids is calculated on the basis of the fetched distortion aberration quantities Dx and Dy. In step 522 an enlargement/reduction ratio is set on the basis of the quantities of image voids calculated in step 520 and the size of a simulation image which is displayed on the display unit 164 and with which such as the conditions for the image processing are examined. In accordance with the set enlargement/reduction ratio, interpolation and enlarging/reducing processing are performed.

In step 518 the coordinates of each pixel of image data are converted in accordance with the distortion aberration and chromatic aberration of magnification of the lens. Therefore, the position of each pixel indicated by image data subjected to the conversion of the coordinates is usually shifted from the lattice position. Therefore, the interpolation and the enlarging/reducing processing is performed such that image data subjected to the conversion of the coordinates in step 518 is subjected to the enlarging/reducing processing in accordance with the size of the simulation image by using the set enlargement/reduction ratio. Then, the densities of R, G and B of pixels positioned on the lattice positions are obtained by performing interpolation on the image indicated by image data subjected to the enlarging/reducing processing in accordance with the densities of R, G and B pixels positioned around the lattice position.

In the above processing, the coordinates (x, y) of each pixel is standardized with respect to the position of the center of the image. Thus, the distortion aberration correction and correction of chromatic aberration of magnifications are performed with respect to the position of the center of the image. Therefore, geometrical distortion aberration and color misregistration can accurately be corrected by the distortion aberration correction and the correction chromatic aberration of magnification of the lens. Moreover, image data subjected to the enlarging/reducing processing for removing image void region can be obtained.

The enlargement/reduction ratio of fine scan image data is as well as changed according to the size of the output image. In step 524 the original enlargement/reduction ratio obtained in accordance with the size of the film image and that of the output image is modified in accordance with the image void quantity calculated in step 520. Thus, the enlargement/reduction ratio to be employed in the processing for interpolating and enlarging/reducing fine scan image data is set.

In step 526 various image characteristic quantities of the film image are calculated on the basis of the pre-scan image data. On the basis of the calculated image characteristic quantities, conditions for the image processing to which fine scan image data are determined. Then, pre-scan image data is transferred to the personal computer 158 via the pre-scan memory 135. Moreover, conditions for the image processing to which fine scan image data is subjected are transferred to the personal computer 158.

As a result, the personal computer 158 performs an image examining processing in step 528 and ensuing steps. On the basis of the conditions for the image processing transferred from the automatic set-up engine 144, the pre scan image-data data processing section 158A subjects pre scan image-data to an image processing equivalent to the image processing which is performed by the image processor 140 and to which fine scan image data is subjected to produce simulation image data (step 528). On the basis of the simulation image data produced by the pre scan image-data processing section 158A, the image display section 158B displays a simulation image on the display unit 164, in which the simulation image indicating the finish state when a print is produced by using fine scan image data subjected to the image processing in the image processor 140 (step 530).

When the simulation image has been displayed on the display unit 164, the operator visually confirms the simulation image to examine whether or not the image quality of the simulation image is acceptable (that is, whether or not the conditions for the image processing calculated by the automatic set-up engine 144 are acceptable). Then, the operator inputs information indicating a result of the examination via the keyboard 166. In step 532 a determination is made whether or not information for specifying modification of the processing conditions has been input from the operator as information indicating the result of the examination.

If information for specifying modification of the conditions for the image processing is input from the operator, the determination in step 532 is affirmed. Then, the routine moves to step 534 so that the automatic set-up engine 144 is caused to modify the processing conditions in accordance with the input specification for the modification. Then, the operation is returned to step 528. As a result, the simulation image modified in accordance with the input specification for the modification is again displayed on the display unit 164. When the operator visually confirms the re-displayed specific simulation image, the operator is able to easily determines whether or not the contents of the input modification information are acceptable. When the operator has input information indicating acceptance of the verification, the determination in step 532 is negated. Thus, the processing for verifying the image, that is the pre-scan processing is completed.

When pre-scan of the photographic film has been completed, the line CCD scanner 14 performs fine scan for reading the photographic film for each film image. The fine scanning operation is performed such that reading conditions for each film image are communicated from the automatic set-up engine 144 to the line CCD scanner 14. The line CCD scanner 14 reads (fine-scans) each film image in accordance with the communicated reading conditions.

The conditions under which the image processing of each of the film images are communicated from the automatic set-up engine 144 to the image processor 140 when fine-can image data of each film image has been input from the line CCD scanner 14. The image processor 140 subjects input fine scan image data of each film image to the image processings, the contents of which have been communicated as described above.

When the photographic film set to the line CCD scanner 14 is a photographic film having images photographed and recorded by a film with lens attached, the LF-aberration correcting section 140Y of the image processor 140 subjects fine scan image data to the processings equivalent to those in the pre-scan processing and performed in steps 510 to 518. The image processing section 140Z of the image processor 140 subjects fine scan image data to the enlarging/reducing processing equivalent to the interpolating and enlarging/reducing processing which have been performed in step 522 by using the enlargement/reduction ratio calculated in step 524. As a result, reduction in the brightness in the marginal portion of the image caused by the marginal light extinction of the lens, the geometrical distortion and color misregistration caused by the distortion aberration and of chromatic aberration of magnifications of the lens with respect to the position of the center of the image can accurately be corrected. Moreover, image data from which the image void region has been removed and which has been subjected to the enlarging/reducing processing to match the size of the output image can be obtained.

Fine scan image data input to the image processor 140 is subjected to a variety of image processings in addition to the above enlarging/reducing processing by the image processing section 140Z. Then, fine scan image data is output from the image processor 140 as data for an output image. Data for the output image is used to record the image on the photographic paper by the laser printer section 18 or used to display the image on the display unit 164. As an alternative to this, data for the output image is stored in an information storage medium, such as a memory card, via the expansion slot 174.

Figure 17A:
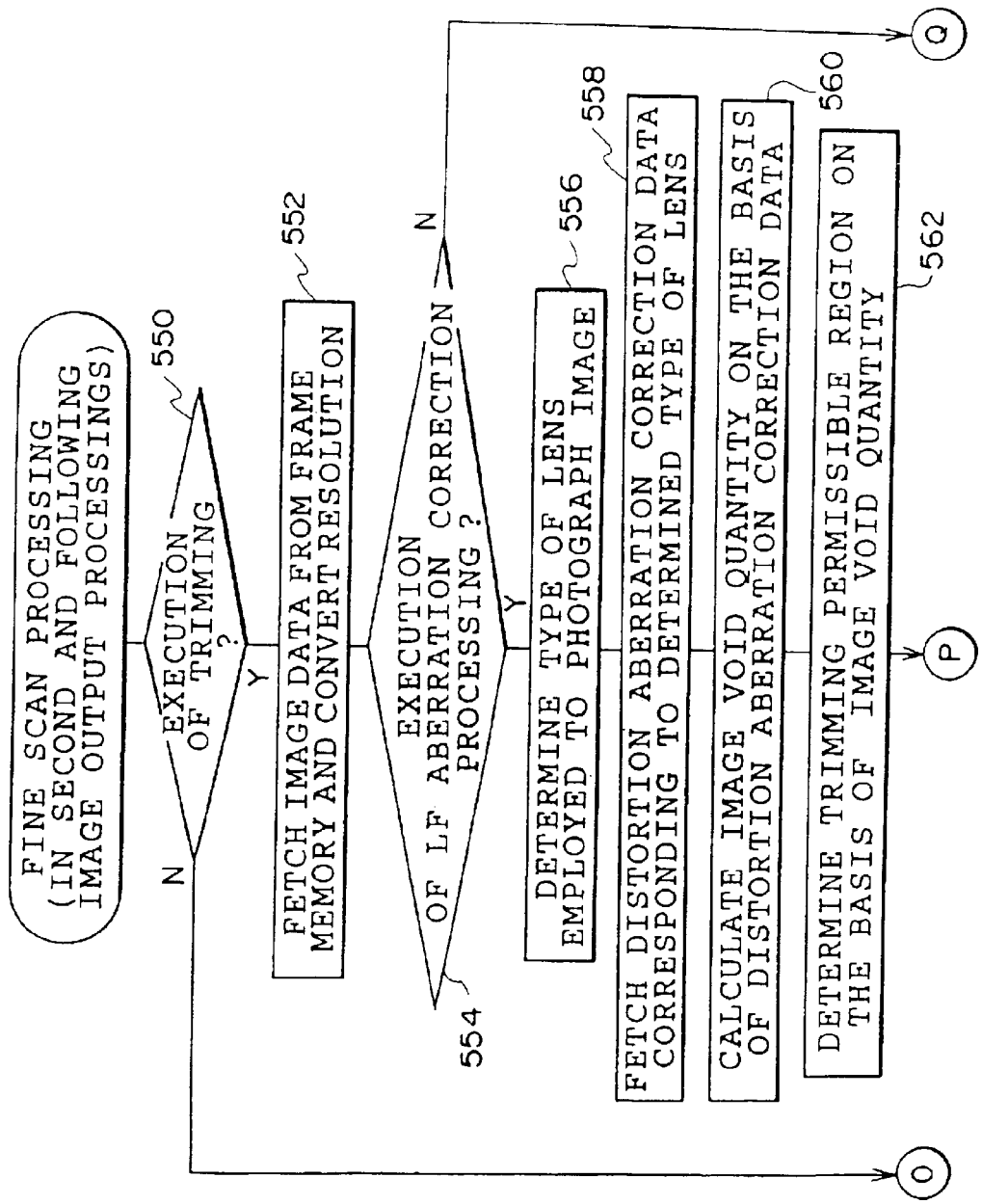

When an n-th (where $n \geq 2$) request for an image output processing of each photographic film has been made, the line CCD scanner 14 and the image processor 140 inputs fine scan image data. Simultaneously, the automatic set-up engine 144 and the personal computer 158 perform the fine scanning processing. The fine scanning processing will now be described with reference to flow charts shown in FIGS. 17A, 17B and 17C. FIGS. 17A, 17B and 17C show a flow of the fine scanning processing of a single film image. In actual, the following fine scanning processing is sequentially performed for a plurality of images recorded on one photographic film.

In step 550 whether or not execution of cropping of the image to be processed has been specified is determined by the CPU 146 (the set-up calculating section 144A) of the automatic set-up engine 144. If the determination is negated, the routine moves to step 586. Thus, conditions (including the coordinate of the position of the center of the image) for the image processing to which fine scan image data of the image to be processed is subjected are communicated to the image processor section 136. Then, the processing is completed.

The processing conditions can be determined by again performing pre-scan prior to the fine scan. Then, a calculation is performed on the basis of the image data obtained by the pre-scan which has again be performed. As an alternative to this, processing conditions determined when the first image output processing has been performed may previously be stored in a predetermined information storage medium.

Then, the processing conditions are fetched from the information storage medium when the n-th image output processing is performed. In the above case, pre-scan can be omitted when the n-th image output processing is performed. As the information storage medium for storing the processing conditions, an information storage medium (the hard disk 168 or the like) included by the digital laboratory system 10, any one of the following medium may be employed: an information storage medium disposed at a remote place and connected via a communication line or an information storage section provided for the cartridge for accommodating the photographic film.

If the determination in step 550 is affirmed, the operation is shifted to step 552. Thus, image data (fine scan image data) is fetched from the frame memory 142. Then, the resolution changing processing (which corresponds to the resolution converting portion 144C) is performed to make the resolution to be equivalent to that of pre-scan image data. Image data subjected to change in the resolution is transferred to the personal computer 158. In step 554 a determination is made that whether or not image data of the image to be processed is subjected to the LF aberration correction processing by the image processor 140. The determination in step 554 can be made equivalently to that in step 506 (see FIG. 15A).

If the above determination is negated, the routine moves to step 572. Thus, (the image display section 158B of) the personal computer 158 displays, on the display unit 164, the image to be processed. Moreover, a message for requesting specification of the cropping range on the display unit 164. In the above case, the overall image to be processed is displayed on the display unit 164. If the determination in step 554 is affirmed, the routine moves to step 556. In the same way in steps 512, 516 and 520 (see FIG. 15B), the type of lens employed to photograph the image to be processed is determined (step 556). Then, distortion aberration correction data corresponding to the determined type of lens is fetched (step 558). Then, the quantity of the image voids is calculated on the basis of the distortion aberration quantities Dx and Dy indicated by fetched distortion aberration correction data (step 560).

In step 562 a processing is performed on the basis of the quantity of the image voids calculated in step 560. That is, a region (a region free from image voids) in the form of a rectangular shape having a predetermined aspect ratio and having four corners (or four sides) which inscribe in the outer end of the image indicated by image data subjected to the distortion aberration correction processing is determined as a cropping-permitted region of the image to be processed. An assumption is made that the contour of the image indicated by image data subjected to the distortion aberration correction processing is in the form of a barrel shape as shown in FIG. 16B. In this case, as the cropping-permitted region, a region (a region having four corners each of which inscribes in the contour) is extracted which is free from image void region produced adjacent to the four corners of the image and which is enclosed by an alternate long and short dash line shown in FIG. 16B.

In the above case, the image voids quantity is considerably large according to the distortion aberration correction processing as compared with the processing for correcting chromatic aberration of magnification. Therefore, the image void quantity is calculated in accordance with the distortion aberration quantities Dx and Dy to determine the cropping-permitted region. If the quantity of the image void rcaused by the processing for correcting chromatic aberration of magnification cannot be ignored, the image void quantity may be calculated in consideration of the chromatic aberration of magnification quantities $\Delta Rx$, $\Delta Ry$, $\Delta Bx$ and $\Delta By$ so as to determined the cropping-permitted region.

In step 564 a display method of a cropping-inhibited region (a region obtained by omitting the cropping-permitted region from the image indicated by image data subjected to the distortion aberration correction processing) is determined. In accordance with a result of the determination, the processing is branched. In this embodiment, "monochromatic display" and "non-display" are prepared to display the cropping-inhibited region. Either of the two display methods is previously selected and set.

If the "monochromatic display" is selected and set as the display method of the cropping-inhibited region, the routine moves to step 566. Thus, the position of the boundary between the cropping-permitted region and the cropping-inhibited region is communicated to the personal computer 158 and issues an specification to display the cropping-inhibited region in the monochromatic display. In accordance with the communicated position of the boundary, (the image-data processing section 158A) of the personal computer 158 produces line-drawing data indicating the boundary between the cropping-permitted region and the cropping-inhibited region to synthesize to image data (step 566). To make the image portion corresponding to the cropping-inhibited region to be a monotone image (to make the hue to be achromatic color), data of all pixels existing in the cropping-inhibited region is changed (step 568).

If the "non-display" is selected and set as the display method of the cropping-inhibited region, the routine moves to step 570. Thus, the position of the boundary between the cropping-permitted region and the cropping-inhibited region is communicated to the personal computer 158 and issues an specification to inhibit display of the cropping-inhibited region. On the basis of the communicated position of the boundary, (the image-data processing section 158A of) the personal computer 158 delates data of all pixels existing in the cropping-inhibited region to inhibit display of the image portion corresponding to the cropping-inhibited region (step 570).

Figure 18A:
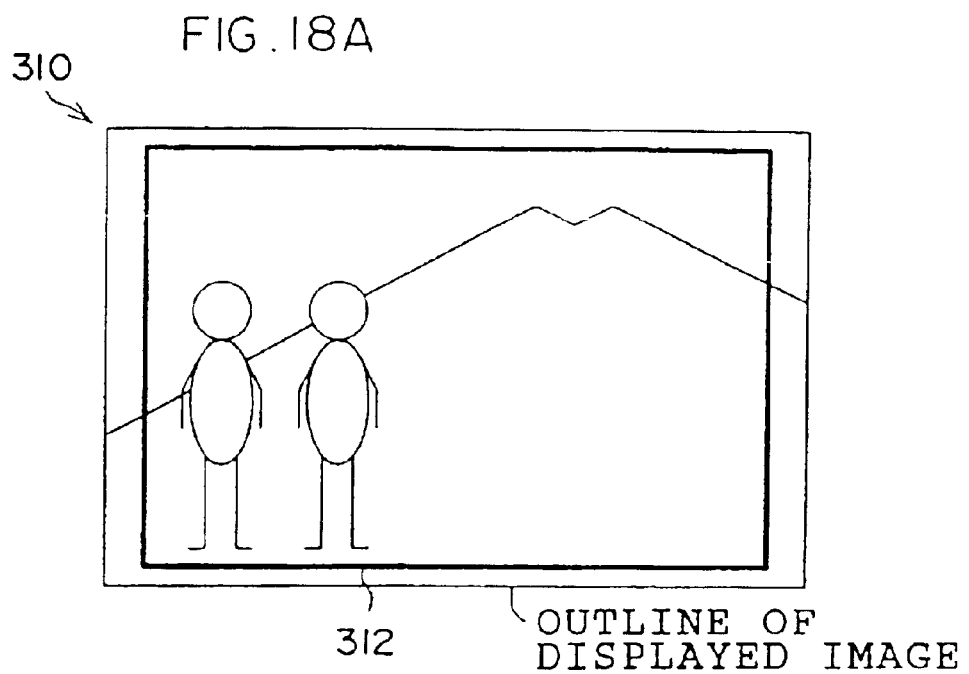
FIG. 18A is an image diagram showing an example of the display of an image for specifying a cropping range when a cropping-prohibited region is displayed using a "monochrome display" method according to the third embodiment of the present invention.

In step 572 (the image display section 158B of) the personal computer 158 displays, on the display unit 164, the image to be processed. Moreover, the personal computer 158 displays, on the display unit 164, a message for specifying the cropping range. If the method is selected and set as the display method of the cropping-inhibited region, for example, an image 310 is displayed on the display unit 164 such that its boundary between the cropping-permitted region and the cropping-inhibited region is indicated with a line drawing (a frame 312 in FIG. 18A) according to steps 566 and 568, as shown in FIG. 18A. Moreover, the image portion corresponding to the cropping-inhibited region (a region on the outside of the frame 312) is displayed in a monochromatic manner.

Figure 18B:
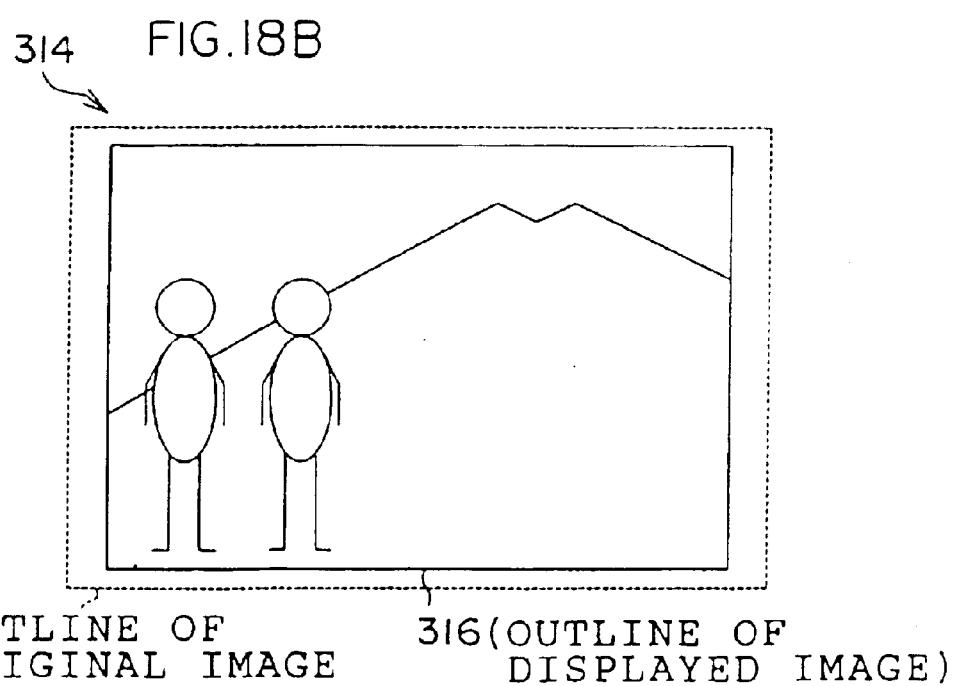
FIG. 18B is an image diagram showing an example of display of an image for specifying a cropping range when the display method is a "non-display" method according to the third embodiment of the present invention.

When the "non-display" has been selected and set as the display method of the cropping-inhibited region, the display range is, for example, a range (the same range as the range enclosed by a thick frame shown in FIG. 18A) enclosed by a frame 316 illustrated with a thin line shown in FIG. 18B. The outer end of the displayed image coincides with the boundary between the cropping-permitted region and the cropping-inhibited region. When a reference is made to the image 310 or the image 314, the operator is able to easily recognize the cropping-permitted region. Above steps 560 to 572 correspond to the display control means according to the present invention. Steps 560 and 562 correspond to the display control means according to a sixteenth aspect of the present invention.

In step 574 whether or not the cropping range has been specified is determined. Then, affirmation of the determination is waited for. During the above period of time, the operator operates the mouse 40 to instruct the cropping range by drawing a rectangular frame indicating the cropping range required by the user on the screen of the display unit 164. Thus, the determination in step 574 is affirmed so that the routine moves to step 576. Thus, whether or not the specified cropping range is included in the cropping-permitted region is determined.

If a portion of the specified cropping range is deviated from the cropping-permitted region, there is apprehension that image voids occurs in the cropped image according to the distortion aberration correction processing in a case where the cropping processing has simply been performed in accordance with the specified cropping range. Therefore, if the determination in step 576 is negated, the routine moves to step 578. Thus, the drawn frame is erased, and an error message for communicating a fact that the specified cropping range is unacceptable and a message for requesting specification of the cropping range to be included in the cropping-permitted region are displayed on the display unit 164. Then, the operation is returned to step 574. As a result, the operator is caused to instruct an appropriate range included in the cropping-permitted region as the cropping range. As long as the decision in step 576 is not affirmative (as long as the instructed cropping range is not held in the cropping-permitted region), the instructed cropping range is not adopted. Therefore, the range which can be instructed as a cropping range is limited in the range which is not substantially deviated from the cropping-permitted region. The steps 576 and 587 is corresponding to the limiting means of the twenty-third aspect of the present invention.

When the determination has been affirmed because of specification of the appropriate cropping range, the routine moves to step 580. Thus, the frame (the line indicating the outline of the cropping range) drawn by the operator is again displayed with a changed type of line to communicate acceptance of the specified cropping range to the operator. In step 582 a message for causing the operator to confirm whether or not the specified cropping range coincides with the cropping range required by the user is displayed on the display unit 164. Thus, the operator is caused to determine whether or not the cropping processing is performed in accordance with the specified cropping range.

If the operator determines to modify the specified cropping range and inputs information for communicating modification of the cropping range, the determination in step 582 is negated. Thus, the routine moves to step 574. Then, step 574 and ensuing steps are repeated. As a result, the cropping range is again specified by the operator. If the operator determines that the specified cropping range is an appropriate range, information for communicating a fact that the specified cropping range is an appropriate range is input. Thus, the cropping range is decided, and then the routine moves to step 584.

In step 584 (the set-up calculating section 144A of) the automatic set-up engine 144 calculates the coordinates of the position of the center of the specified cropping range equivalently to step 510. In accordance with the size of the cropping range on the image, to be processed, and the size of the output image, the enlargement/reduction ratio of the image (the image to be cropped) is calculated. In step 586 communication of the position of the outline of the cropping range, the coordinates of the position of the center of the image, the calculated coordinates of the center of the cropping range and the enlargement/reduction ratio of the image to the image processor 140 is performed together with the conditions for the other image processings. Then, the processing is completed.

After conditions for the image processing has been communicated in a case where execution of the cropping has been specified, the cropping section 140X of the image processor 140 fetches image data from the frame memory (the fine scan memory) 142. In accordance with the communicated position of the outline of the cropping range, the cropping section 140X cuts image data in the image portion corresponding to the specified cropping range. As described above, the cropping section 140X corresponds to the cutting means according to the present invention.

Also in a case where the photographic film set to the line CCD scanner 14 is a photographic film having images photographed and recorded by the film with lens attached, the LF-aberration correcting section 140Y subjects image data corresponding to the cropping range cut by the cropping section 140X to processings (the LF aberration correction processing) equivalent to those for the pre-scan processing in steps 510 to 518.

Figure 19A:
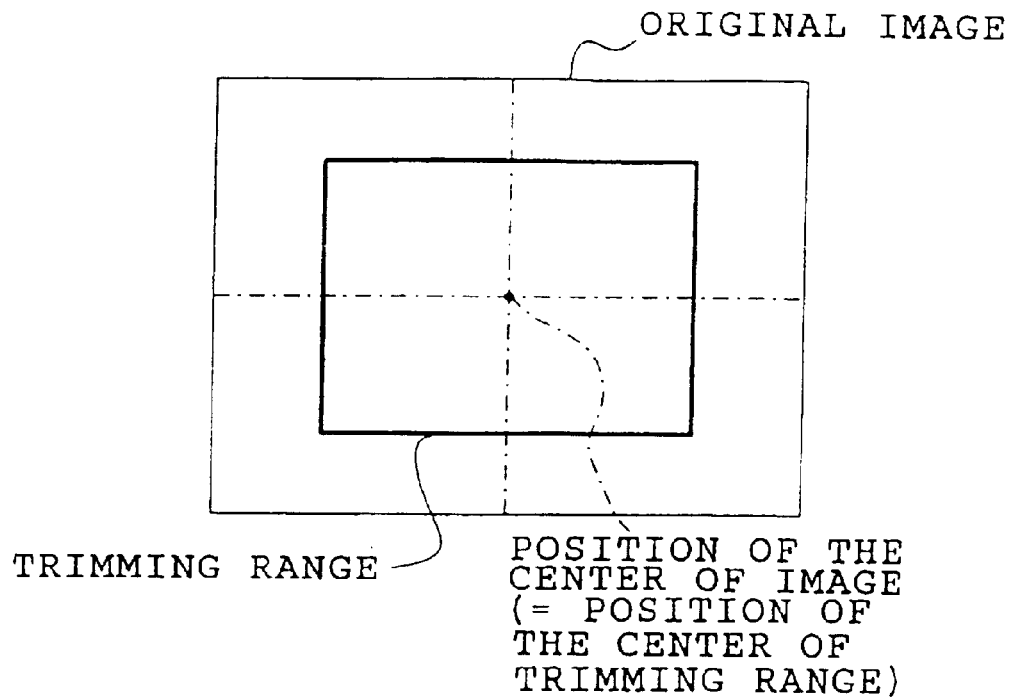
FIG. 19A is an image diagram showing an example of each cropping range specified by a center cropping method according to the third embodiment of the present invention.

The LF aberration correction processing is a processing for correcting deterioration in the image quality caused by the aberration of the lens. Therefore, the processing must be performed such that the position of the center of the image estimated to correspond to the position of the optical axis of the lens when the photographing operation has been performed serves as the reference as shown in FIG. 19A. An assumption is made that execution of the cropping has been specified and a cropping range has been specified such that the position of the center of the cropping range coincides with the position of the center of the image (when so-called center cropping has been specified). In this case, the LF aberration correction processing may be performed equivalent to the pre-scan processing in steps 510 to 518 with reference to the coordinates of the position of the center of the cropping range calculated by the (the set-up calculating section 144A of) the automatic set-up engine 144 in step 584.

Figure 19B:
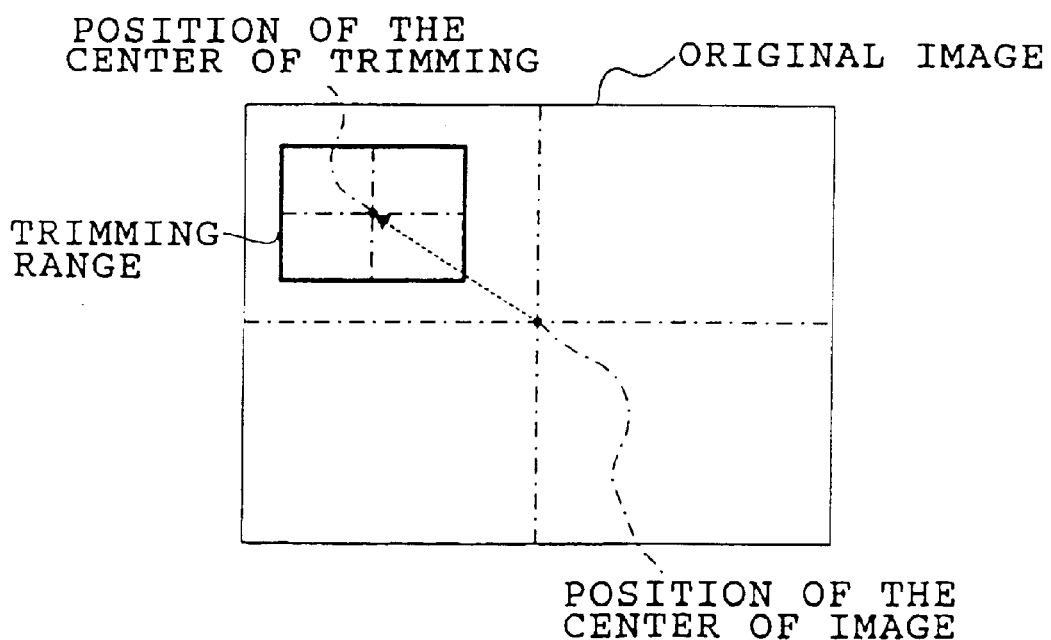
FIG. 19B is an image diagram showing an example of each cropping range specified by a free cropping method according to the third embodiment of the present invention.
Figure 20:
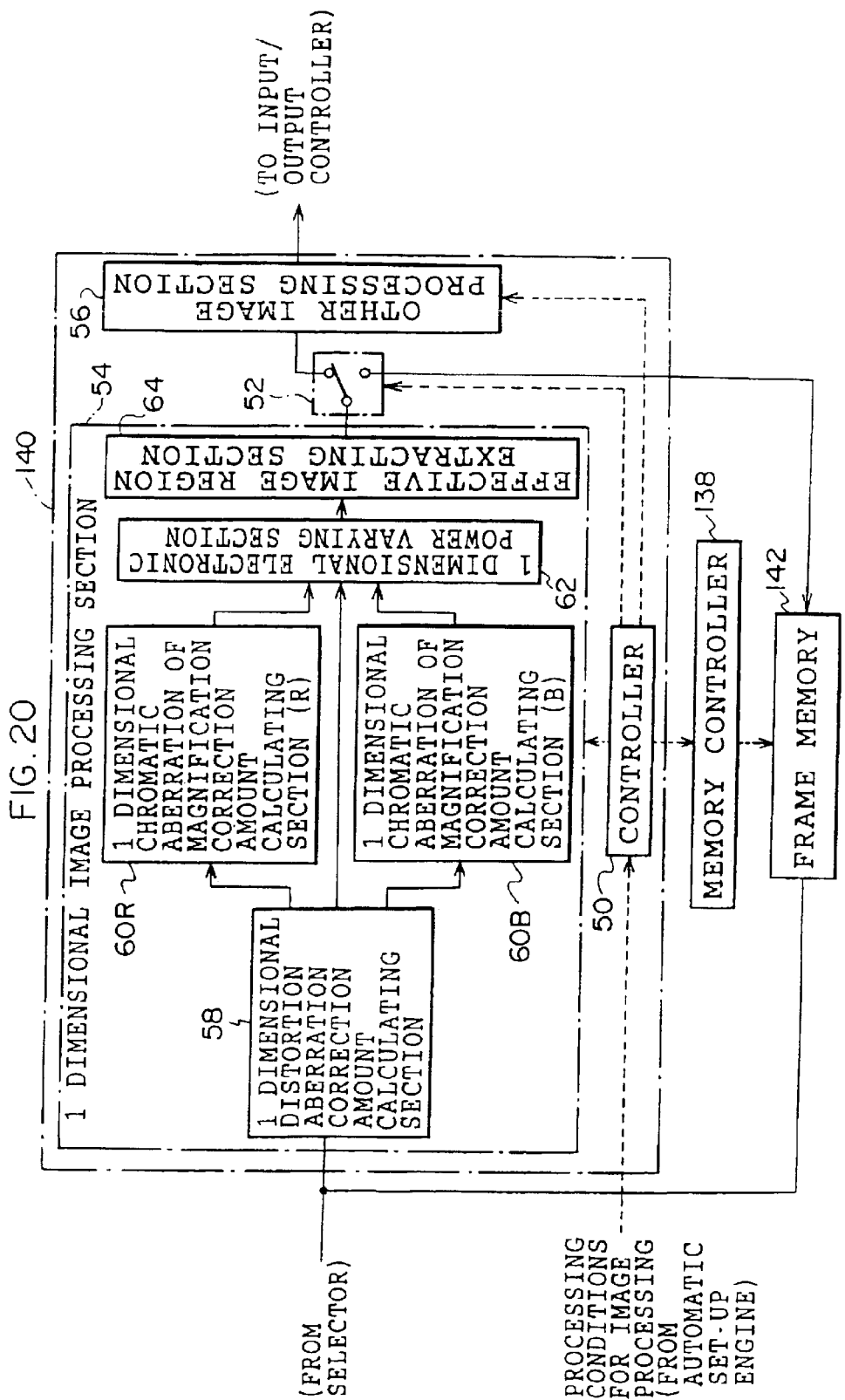
FIG. 20 is a block diagram showing the schematic structure of an image processor according to the fourth embodiment of the present invention.

An assumption is made that execution of the cropping has been specified and the position of the center of specified the cropping range is different from the position of the center of the image as shown in FIG. 19B (in a case of a so-called free cropping). In the above case, image data corresponding to the cropping range cut by the cropping section 140X must be subjected to the LF aberration correction processing such that the position of the center of the image (the original image) is used as the reference. The above processing can be performed such that the distance between the two centers (the distance in the direction x and that in the direction y) is calculated on the basis of the coordinates of the position of the center of the image and the coordinates of the position of the center of the cropping range. Then, the coordinates of each pixel indicated by image data cut by the cropping section 140X are standardized with respect to the position of the center of the cropping range. Then, the calculated distance between the centers in the direction x and that in the direction y are, as offsets, added to the standardized coordinates of each pixel so as to perform the LF aberration correction processing. As a result, the LF aberration correction processing can accurately be performed if the position of the center of the specified cropping range is different from the position of the center of the image.

The enlarging/reducing processing which is performed by the other image processing section 140Z is performed in accordance with the enlargement/reduction ratio set and communicated in step 508 if execution of the cropping is not specified. With reference to the position of the center of the image, the image is enlarged or reduced. If execution of the cropping is instructed, the enlarging/reducing processing is performed in accordance with the enlargement/reduction ratio set and communicated in step 584. With reference to the position of the center of the communicated trimming range. As a result, reduction in the brightness of the marginal portion of the image caused by the marginal light extinction of the lens and geometrical distortion aberration and color misregistration caused by the distortion aberration and chromatic aberration of magnifications of the lens can accurately be corrected. As a result, image data can be obtained which is free from image voids and which has been enlarged or reduced to cause the image portion corresponding to the specified cropping range to coincide with the size of the output image.

In the above processing, the image processing including change in the contour of the image is performed such that each of the correction of the geometrical distortion aberration of the image caused by the distortion aberration of the lens and the correction of the color misregistration of the image caused by the chromatic aberration of magnification of the lens is performed. The present invention is not limited to the above arrangement. Only either of the corrections may be performed. As an alternative to this, correction (for example, such as correction of a variety of geometrical distortion aberrations of an image obtained by an observation of the earth performed by an artificial satellite) of geometrical distortion aberration caused by a factor except for the aberration of the lens may be performed. In the above processing, correction of the reduction in the brightness of the marginal portion of the image caused by the marginal light extinction of the lens has been described as the other LF aberration correction processing (correction of the deterioration in the image quality caused by the characteristic of the lens). The present invention is not limited to this. A processing such as correcting deterioration in the sharpness (so-called out-of-focus) of the image caused by the curvature of an image may be performed.

In the above processing, only when image to be processed is image data indicating a film image photographed and recorded on a photographic film by a film with lens attached, deterioration in the image quality caused by the characteristic of the lens is corrected. The present invention is not limited to this. If image data, to be processed, is image data indicating a film image photographed and recorded on a photographic film by a camera, for example, a compact camera at a low price relatively, with which the image quality considerably deteriorates according to the characteristic of the lens or image data photographed by a digital camera with which the image quality considerably deteriorates according to the characteristic of the lens and stored in an information recording medium, the above correction may be performed. All of image data indicating images recorded on a recording material by using a lens or all of image data obtained by a photographing operation by using a lens may be corrected as described above regardless of the degree of deterioration in the image quality caused by the characteristics of the lens.

When image data obtained by reading an image recorded on a recording material, such as a photographic film by an image reader, such as the line CCD scanner 14, is employed as image data to be processed, also deterioration in the image quality caused by the lens provided for the image reader may be corrected.

In the above-described example, the range where the image can be instructed as the cropping range is limited in the range which is not deviated from the range where the image can be cropped. The present invention is not limited to the example. The range excluding the region where the image cannot be cropped is only displayed, or the region where the image can be cropped is distinguished from the region where the image cannot be cropped and the regions are only displayed. The range which can be instructed as the cropping range need not be limited. The fourteenth aspect of the present invention also claims the above-described aspects.

As described above, the image processing device according to a fourteenth aspect of the present invention has a structure that when a range which is cut from an image is specified by the specifying means on the basis of the image displayed on the display means, a range from which an image-cutting inhibited range caused by the image processing performed by the processing means is omitted is displayed on the display means. As an alternative to this, an image indicated by image data is displayed on the display means such that the image-cutting permitted range and the image-cutting inhibited range are distinguished from each other. An excellent effect can be obtained in that an appropriate cutting range can easily be specified when a portion is cut from an image which is subjected to an image processing including change in the contour so as to be output.

The image processing device according to a fifteenth aspect of the present invention in the fourteenth aspect has a structure that image data indicating an image projected via a lens is subjected to an image processing including change in the contour of the image on the basis of the information relating to the characteristics of the lens. The image processing includes at least either of the distortion aberration correction processing for correcting geometrical distortion aberration of the image caused by the distortion aberration of the lens and the processing for correcting chromatic aberration of magnification for correcting color misregistration of the image caused by the chromatic aberration of magnification of the lens. Therefore, an effect can be obtained in that deterioration in the image quality caused by the distortion aberration of the lens can accurately be corrected in addition to the above effects.

The image processing device according to the sixteenth aspect of the present invention has a structure according to the fifteenth aspect of the present invention. On the basis of the information relating to the characteristics of the lens, the position of the boundary between the image-cutting permitted range and the image-cutting inhibited range is determined. Therefore, an effect can be obtained in that the position of the boundary between the image-cutting permitted range and the image-cutting inhibited range can accurately be determined in addition to the above effects.

The twenty-third aspect of the present invention is an image processing device according to the fourteenth aspect, further comprising limiting means for limiting the range which can be instructed via said instructing means so as to exclude ranges where the image cannot be cut from a range instructed by said instructing means. Therefore, in addition to the above-described effects, an effect can be obtained in that a mistake is prevented that the range including the range cannot be cut is instructed.

The operation of the fourth embodiment will now be described. In this embodiment, film images recorded on a photographic film are, two times, read by the line CCD scanner 14 (pre-scan and fine scan). The overall surface of the photographic film to be processed (to be read) is pre-scanned by the line CCD scanner 14. When pre-scan data has been input from the line CCD scanner 14 to the image processing section 16, the line scanner correcting section 122 subjects input pre-scan data to the dark correction, density changing, shading correction and defective-pixel correction.

Figure 21A:
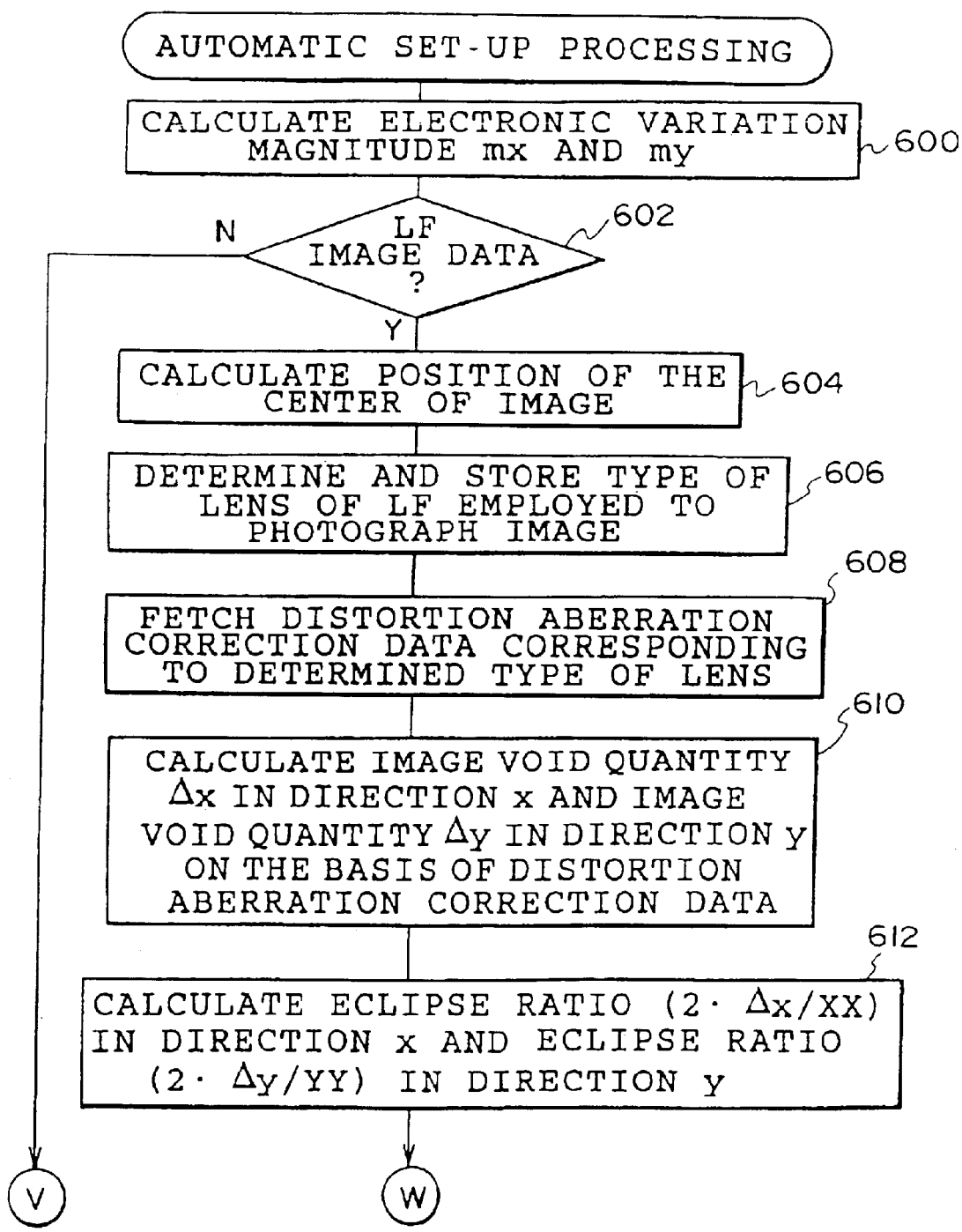
FIGS. 21A and 21B are flow charts showing the content of an automatic set-up processing which is performed by an automatic set-up engine according to the fourth embodiment of the present invention.
Figure 21B:
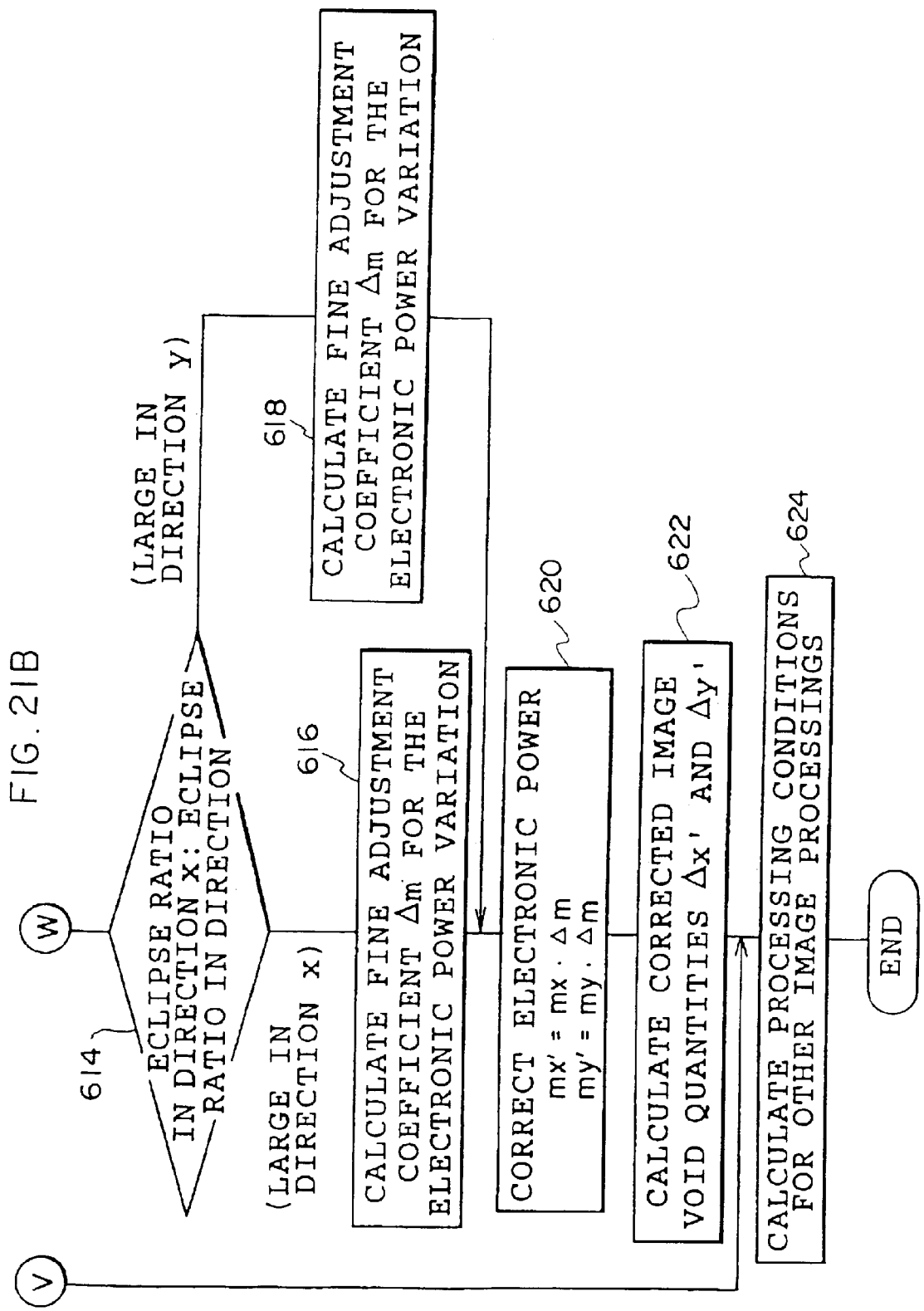

Pre-scan data output from the line scanner correcting section 122 is input to the automatic set-up engine 144 through the selector 132. The automatic set-up engine 144 sequentially performs determination of the position of the frame of the film image, extraction of pre-scan image data and determination of the recording conditions which are employed when fine scan is performed. Then, an automatic set-up processing for calculating conditions for various image processings which are performed by the image processor 140 is performed. The automatic set-up processing will now be described with reference to flow charts shown in FIGS. 21A and 21B. Although FIGS. 21A and 21B show a flow of the automatic set-up processing of a single film image. In actual, each film image recorded on one photographic film roll is subjected to the following processing.

In step 600 a processing is performed on the basis of the number X of pixels of fine scan image data obtained by fine scan in the direction x and the number Y of pixels of the fine scan image data in the direction y, a target number XX of pixels of an image recorded on photographic paper, an image which is displayed on the display unit or an image indicated by image data which is stored in the information recording medium in the direction x and the target number YY of pixels of the image in the direction y. That is, electronic power variation ratios mx and my (mx=XX/X, my=YY/Y) of fine scan image data in the directions x and y in the electronic power varying processing are calculated.

The reading resolution which is employed the fine scanning operation is sometimes varied depending on the type of original to be read (such as a photographic film whose size is, for example, 135-size, 110-size, 240-size (APS), 120-size and 220-size (Brownie size)). The number X of pixels of the fine scan image data in the direction x and the number Y of pixels of fine scan image data in the direction y are determined in accordance with the reading resolution in the fine scan operation and the size of the image to be read. When image data subjected to the image processing is used to record an image on photographic paper, the target number XX of the pixels in the direction x and the target number YY of the pixels in the direction y are determined in accordance with the size the image to be recorded.

The electronic power variation ratio mx in the direction x and the electronic power variation ratio my in the direction y are usually made to be the same values (that is X/Y=XX/YY) to prevent change in the aspect ratio of the image represented by image data subjected to the electronic power varying processing with respect to the original image. Only when the recording resolution in the fine scanning operation are different between the direction x and the direction y or only when a special finish (for example, a slimming processing) for somewhat reducing the image in only the direction x or in only direction y, the electronic power variation ratios mx and my are set to be different values.

In step 602 a determination is made whether or not image data, to be processed, is LF image data indicating a film image photographed and recorded on a photographic film by an LF (film with lens attached). The photographic film used as a film with lens attached is carried into the image processing system in a state where the photographic film is accommodated in the body of the film with lens attached. For example, when the photographic film is taken out from the body film with lens attached, the type of film with lens attached is determined and a mark representing that the image is photographed by which type of film with lens attached which appears on the market, or if the photographic film is a film on which a magnetic layer is formed, an identification code representing the same information of the mark is recorded on the magnetic layer. Therefore, the determination whether or not the image data to be processed is film with lens attached image data can be performed by the detection whether or not the mark or the identification code exists. The mark may be assigned to the photographic film used as a film with lens attached, or the identification code may be recorded on the magnetic layer when the film with lens attached is manufactured.

If the determination is negated, the routine moves to step 624. Thus, a variety of image characteristic quantities are calculated on the basis of the pre-scan image data. On the basis of the calculated image characteristic quantities, the conditions for the various image processings which are performed by the other image processing section 56 of the image processor 140 are calculated. Thus, the automatic set-p processing is completed In the above case, the calculated conditions for the image processing are subjected to the examination processing, and then communicated to (the controller 50 of) the image processor 140 together with the electronic power variation ratios mx and my calculated in step 600. The communication is performed when the image processor 140 performs the image processing of image data.

If image data, to be processed, is LF image data, the determination in step 602 is affirmed. Then, the routine moves to step 604. In this embodiment, LF image data (specifically, fine scan image data indicating a film image photographed and recorded on the photographic film by the LF) is, by the 1 dimensional image processing section 54 of the image processor 140, subjected to the distortion aberration correction and the correction of chromatic aberration of magnification. Therefore, in step 604 the position of the center of the image, which is the reference of the distortion aberration correction and the correction of chromatic aberration of magnification, is calculated on the basis of the pre-scan image data.

Figure 14A:
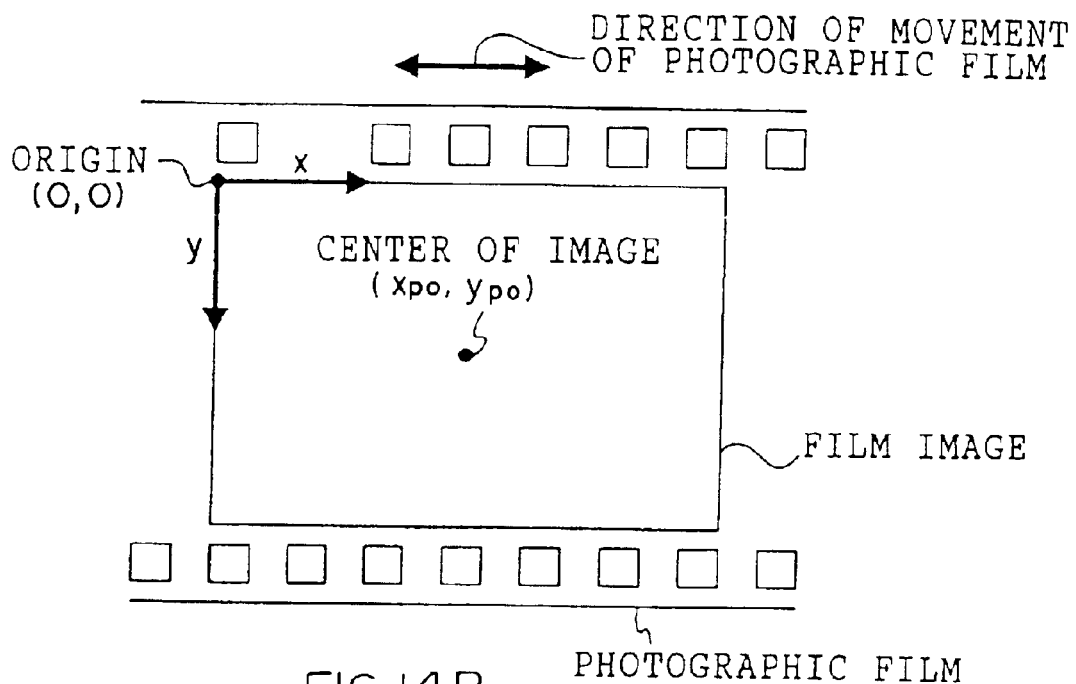
FIG. 14A is a schematic view showing an x and y coordinate system provided for a film image according to the third and fourth embodiments of the present invention.
Figure 14B:
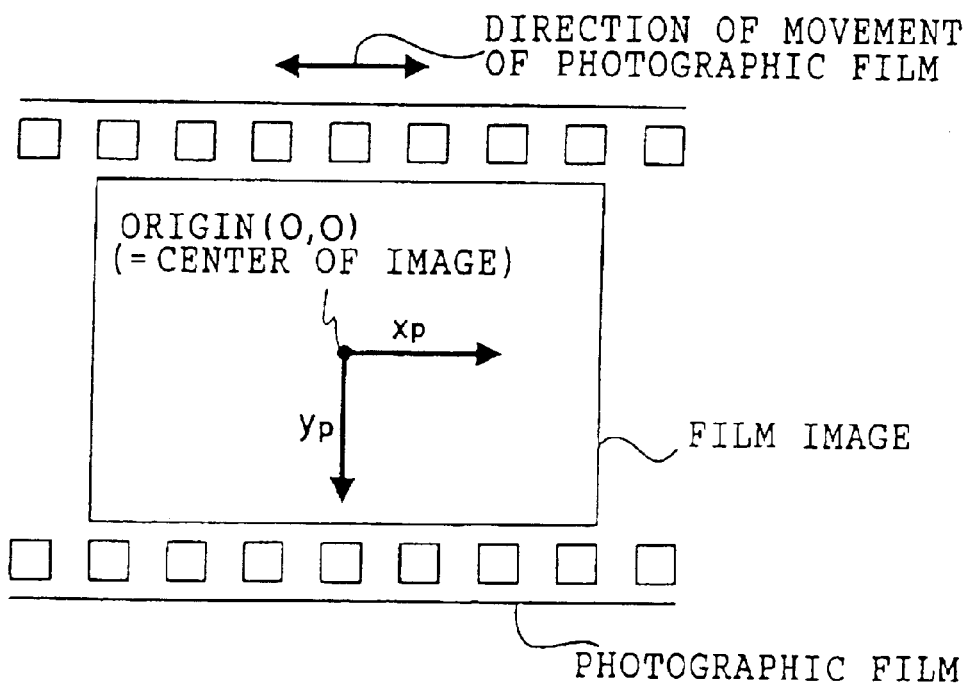
FIG. 14B is a schematic view showing an $x_P y_P$ coordinate system provided for a film image according to the third and fourth embodiments of the present invention.

The calculation of the position of the center of the image can be performed as follows: the number $X_P$ of pixels of pre-scan image data in the direction x and the number $Y_P$ of pixels of pre-scan image data in the direction y are calculated. Then, as the pixel at the center of the image, a pixel $(x_{P0}=X_P/2, y_{P0}=Y_P/2)$ having the coordinates $(x_{P0}, y_{P0})$ in the xy coordinate system shown in FIG. 14A is extracted. The pixel is positioned at the $(X_P/2)$-th position in the direction x and the $(Y_P/2)$-th position in the direction y from pixels corresponding to the corner (the origin of the xy coordinate system (see FIG. 14A) having the origin which is the corner of the image) of the film image.

In step 606 the type of lens employed to photograph the film image indicated by pre-scan image data is determined. Then, the determined type of lens is stored. The type of lens can be determined by reading the above-mentioned mark or the identification code to determine the type of LF with which the image has been photographed and recorded on the photographic film. In step 608 distortion aberration correction data corresponding to the type of lens determined in step 606 is fetched.

When image data is subjected to the distortion aberration correction and the correction of chromatic aberration of magnification, image voids, for example, as shown in FIG. 16A occurs according to the above corrections. Therefore, in step 610 and ensuing steps, the electronic power variation is corrected to make the number of pixels (the number of pixels of an output image) to be extracted to be a predetermined number. That is, the correction of the electronic power variation of image data is performed. The image data above is positioned in an effective image region which is subjected to the electronic power varying processing by the 1 dimensional electronic power-varying section 62 of the image processor 140 and from which the image void region has been omitted.

Figure 22A:
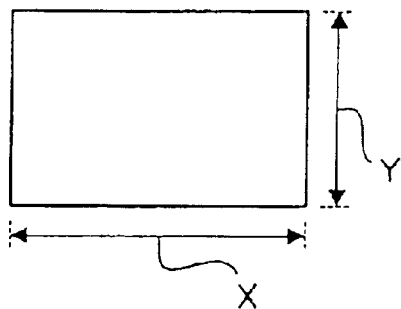
FIG. 22A is a schematic view showing the shape of the outline of an original image for describing calculations of electronic power variation according to the fourth embodiment of the present invention.
Figure 22B:
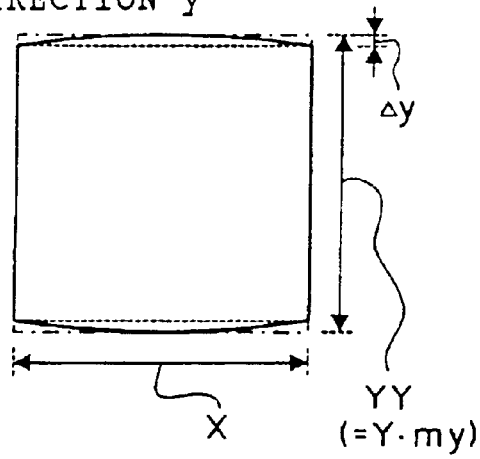
FIG. 22B is a schematic view showing the shape of the outline of an image when LF aberration correction (distortion aberration correction and correction of chromatic aberration of magnification) and electronic power variation have been performed in only direction y for describing electronic power variation according to the fourth embodiment of the present invention.

The image processor 140 according to this embodiment performs the distortion aberration correction and the correction of chromatic aberration of magnification in each of the directions x and y. An assumption as shown in FIG. 22A is made that image data indicating a rectangular original image and having X pixels in the direction x and Y pixels in the direction y is subjected to the distortion aberration correction and the correction of chromatic aberration of magnification. Then, the electronic power varying processing is performed in the direction y in accordance with the electronic power variation ratio my. In the above case, the number of pixels in the direction y is, as shown in FIG. 22B, the target number YY (=Y·my) in the direction y. However, image void regions are produced which are blank regions or regions having uncertain density produced at the four corners of the image. If a region (a region enclosed by a thick line shown in FIG. 22B) from which the image void regions have been omitted is assumed to be the image region, also the contour of the image region is changed in only the direction y. The change in the contour of the image region occurs on two sides of the four sides of the contour of the image region, the two sides being positioned at the two ends in the direction y (that is, the two sides are warped).

An assumption is made that image data is subjected to the distortion aberration correction and the correction of chromatic aberration of magnification in the direction x. Then, the electronic power varying processing in the direction x is performed in accordance with the electronic power variation ratio mx. The number of pixels in the direction x is the target number XX (=X·mx). However, image void regions are produced which are blank regions or regions having uncertain density produced at the four corners of the image. If a region (a region enclosed by a thick line shown in FIG. 22C) from which the image void regions have been omitted is assumed to be the image region, also the contour of the image region is changed in only the direction x. The change in the contour of the image region occurs on two sides of the four sides of the contour of the image region, the two sides being positioned at the two ends in the direction x (that is, the two sides are warped).

Figure 22C:
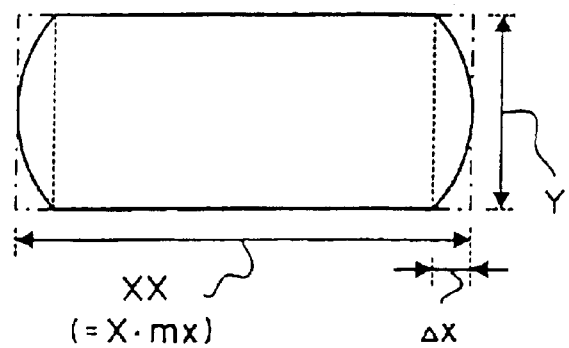
FIG. 22C is a schematic view showing the shape of the outline of an image when LF aberration correction (distortion aberration correction and correction of chromatic aberration of magnification) and electronic power variation have been performed in only direction x for describing electronic power variation according to the fourth embodiment of the present invention.

Therefore, on the basis of the electronic power variation ratios mx and my calculated in step 600 and distortion aberration correction data fetched in step 608, calculations are performed for the purpose of obtaining image void quantity $\Delta y$ (specifically, an amount of warps of the two sides at the two ends in the direction y as shown in FIG. 22B) in the direction y occurring when the distortion aberration correction and the correction of chromatic aberration of magnification are performed in the direction y. Moreover, image void quantity $\Delta x$ is calculated (specifically, an amount of warps of the two sides at the two ends in the direction x as shown in FIG. 22C) in the direction x occurring when the distortion aberration correction and the correction of chromatic aberration of magnification are performed in the direction x.

In step 612 a calculation is performed to obtain an eclipse ratio ($=2\times\Delta x/XX$) in the direction x when the distortion aberration correction and the correction of chromatic aberration of magnification are performed in the direction x and the electronic power varying processing is performed in the direction x. Moreover, a calculation is performed to obtain an eclipse ratio ($=2\times\Delta y/YY$) in the direction y when the distortion aberration correction and the correction of chromatic aberration of magnification are performed in the direction y and the electronic power varying processing is performed in the direction y. An assumption is made that a largest rectangular region which inscribed in an image region (a region surrounded by a thick line shown in FIGS. 22B or 22C) indicated by image data subjected to the distortion aberration correction, the correction of chromatic aberration of magnification and the electronic power varying processing in a predetermined direction (the direction y or the direction x) is an effective image region. The above eclipse ratio indicates the ratio of the number of pixels which are included in the image region and which are deviated from the effective image region in a predetermined direction and the number of all pixels in the image region in the predetermined direction.

In step 614 the eclipse ratio in the direction x and the eclipse ratio in the direction y calculated in step 612 are compared with each other. In accordance with results of the comparison, the processing is branched. If the eclipse ratio in the direction x is larger than the eclipse ratio in the direction y, the routine moves to step 616. In accordance with the following equation (6), the fine adjustment coefficient $\Delta m$ for the electronic power variation is calculated. Then, the routine moves to step 620.

$$\Delta m = XX/(XX - 2\times\Delta x) \tag{6}$$

If the eclipse ratio in the direction y is larger than the eclipse ratio in the direction x, the routine moves to step 618. In accordance with the following equation (7), the fine adjustment coefficient $\Delta m$ for the electronic power variation is calculated. Then, the routine moves to step 620.

$$\Delta m = YY/(YY - 2\times\Delta y) \tag{7}$$

If the eclipse ratio in the direction x and the eclipse ratio in the direction y are the same, either of equation (6) or (7) may be employed to obtain the fine adjustment coefficient $\Delta m$ for the electronic power variation. On the basis of the fine adjustment coefficient $\Delta m$ for the electronic power variation calculated in step 616 or step 618, the electronic power variation ratios mx and my are corrected in accordance with the following equation in step 620:

$$mx' = mx \cdot \Delta m$$

$$my' = my \cdot \Delta m$$

On the basis of the corrected electronic power variation ratios mx' and my' obtained in step 620, corrected image void quantities $\Delta x'$ and $\Delta y'$ are, in step 622, calculated in accordance with the following equations:

$$\Delta x' = (XX' - XX)/2 = (X \cdot mx' - XX)/2$$

$$\Delta y' = (YY' - YY)/2 = (Y \cdot my' - YY)/2$$

The corrected electronic power variation ratios mx' and my' are obtained by calculating the fine adjustment coefficient $\Delta m$ for the electronic power variation from the image void quantity in the direction having a larger eclipse ratio. Then, the electronic power variation ratios mx and my in the directions x and y are corrected with the same fine adjustment coefficient $\Delta m$ for the electronic power variation. Therefore, the distortion aberration correction and the correction of chromatic aberration of magnification are performed in the directions x and y and the electronic power varying processing is performed in the directions x and y in accordance with the corrected electronic power variation ratios mx' and my'. In this case, the largest rectangular region which inscribes in the image region indicated by processed image data is a region in which the number of pixels in the direction x coincides with the target number XX of pixels. Moreover, the number of pixels in the direction y coincides with the target number YY of pixels. That is, the largest rectangular region is a rectangular region having the same aspect ratio as that of the original image. With respect to the image region representing by the image data processed, the above rectangular region can be extracted by omitting regions corresponding to the corrected image void quantity $\Delta x'$ from the two ends in the direction x. Moreover, regions corresponding to the corrected image void quantity $\Delta y'$ are omitted from the two ends in the direction y.

In step 624 the conditions for the image processing are calculated. Then, the automatic set-up processing is completed. If image data, to be processed, is LF image data, the calculated conditions for the image processings are subjected to the examination processing. Then, the communication of the above conditions to (the controller 50 of) the image processor 140 is performed when the image processing is performed by the image processor 140. The conditions are communicated together with distortion aberration correction data and data of correction of chromatic aberration of magnification corresponding to the type of lens determined in step 606, the corrected electronic power variation ratios mx' and my' obtained in step 620 and the corrected image void quantities $\Delta x'$ and $\Delta y'$.

After the pre-scan of the photographic film has been completed, the line CCD scanner 14 performs the fine scan to, image unit, read the same photographic film with a resolution higher than that in the pre-scan. The fine scan is performed such that the recording conditions for each film image is communicated from the automatic set-up engine 144 to the line CCD scanner 14. In accordance with the communicated recording conditions, the line CCD scanner 14 reads (fine-scans) each film image.

As a result of the fine scanning operation, image data (fine scan image data) is input from the line CCD scanner 14 to the image processing section 16. Input image data is input to the image processor 140 via the line scanner correcting section 122 and the selector 132. The 1 dimensional image processing section 54 performs the image processing in the direction y to correspond to the inputting order of image data. If the photographic film which has been set to the line CCD scanner 14 and to be processed is a photographic film having images photographed and recorded by a camera except for the LF, the 1 dimensional image processing section 54 performs only the electronic power varying processing in the direction y in accordance with the electronic power variation ratio my calculated by the 1 dimensional electronic power varying portion 62 in step 600 for the automatic set-up processing.

If the photographic film, to be processed, is a photographic film having images photographed and recorded by the LF, the 1 dimensional image processing section 54 performs the distortion aberration correction, the correction of chromatic aberration of magnification and the electronic power varying processing in the direction y. With reference to the position of the center of the image calculated in step 604, the 1 dimensional distortion aberration correction quantity calculating section 58 converts the coordinates (x, y) of each pixel of input image data into coordinates $(x_P, y_P)$ in the $x_P y_P$ coordinate system (see FIG. 14B) (that is, $x_P = x - x_{P0}$, $y_P = y - y_{P0}$, namely, standardizes the coordinates). Then, the coordinates $(x_P, y_P)$ of the pixel having the standardized coordinates $(x_P, y_P)$ are used as a key. Thus, distortion aberration quantity Dy $(x_P, y_P)$ in the direction y is searched in the distortion aberration correction data communicated from the automatic set-up engine 144. Then, the coordinates of data R $(x_P, y_P)$, G $(x_P, y_P)$ and B $(x_P, y_P)$ indicating densities of R, G and B of the pixel having the coordinates $(x_P, y_P)$ are converted in accordance with the following equation. The above conversion is performed for all of pixels.

$$R(x_P, y_{PR}') \leftarrow R(x_P, y_P)$$

$$G(x_P, y_{PG}') \leftarrow G(x_P, y_P)$$

$$B(x_P, y_{PB}') \leftarrow B(x_P, y_P)$$

where $$y_{PR}' = y_{PG}' = y_{PB}' = y_P + Dy(x_P, y_P)$$

The 1 dimensional chromatic aberration of magnification correction-quantity calculating section 60R subjects data in R of a pixel (a pixel having coordinates $(x_P, y_{PR}')$ in the direction y after it has been subjected to the distortion aberration correction)) having the standardized coordinates $(x_P, y_P)$ to the following processing. The coordinates $(x_P, y_P)$ are used a key. Then, chromatic aberration of magnification quantity $\Delta Ry$ $(x_P, y_P)$ of the corresponding R in the direction y is searched in the chromatic aberration of magnification correction data of R communicated from the automatic set-up engine 144. Then, the coordinates $(x_P, y_{PR}')$ of data R which indicates the density of R in the pixel having the coordinates $(x_P, y_{PR}')$ in the direction y after it has been subjected to the distortion aberration correction are converted in accordance with the following equation. The above conversion is performed for all of the pixels.

$$R(x_P, y_{PR}) \leftarrow R(x_P, y_{PR}')$$

where $$y_{PR} = y_{PR}' + \Delta Ry(x_P, y_P) = y_P + Dy(x_P, y_P) + \Delta Ry(x_P, y_P)$$

The 1 dimensional chromatic aberration of magnification correction quantity calculating section 60B subjects data in B of a pixel (a pixel having coordinates $(x_P, y_{PB}')$ in the direction y after it has been subjected to the distortion aberration correction)) having the standardized coordinates $(x_P, y_P)$ to the following processing. The coordinates $(x_P, y_P)$ are used a key. Then, chromatic aberration of magnification quantity $\Delta By$ $(x_P, y_P)$ of the corresponding B in the direction y is searched in the chromatic aberration of magnification correction data of B communicated from the automatic set-up engine 144. Then, the coordinates $(x_P, y_{PB}')$ of data B which indicates the density of B in the pixel having the coordinates $(x_P, y_{PB}')$ in the direction y after it has been subjected to the distortion aberration correction are converted in accordance with the following equation. The above conversion is performed for all of the pixels.

$$B(x_P, y_{PB}) \leftarrow B(x_P, y_{PB}')$$

where $$y_{PB} = y_{PB}' + \Delta By(x_P, y_P) = y_P + Dy(x_P, y_P) + \Delta By(x_P, y_P)$$

Thus, the distortion aberration correction in the direction y and the correction of chromatic aberration of magnification of R and B in the direction y are performed. Therefore, the position of each pixel indicated by image data for R, G and B is moved in the direction y.

On the basis of the corrected electronic power variation ratio my' in the direction y calculated in step 620 for the automatic set-up processing, the 1 dimensional electronic power-varying section 62 obtains the original position (hereinafter indicated with coordinates $(x_P, y_{P0})$) of each pixel of the image in the direction y and realized when the number Y of pixels of the original image in the direction y is converted into the number YY' (=Y·my') of pixels.

The density of R at the position of the coordinates $(x_P, y_{P0})$ is obtained by performing interpolation on the basis of the data of R at the two adjacent positions across the coordinates $(x_P, y_{P0})$ in the direction y among data R $(x_P, y_{PR})$ subjected to the distortion aberration correction and the correction of chromatic aberration of magnification. The density of G at the position of the coordinates $(x_P, y_{P0})$ is obtained by performing interpolation on the basis of the data of G at the two adjacent positions across the coordinates $(x_P, y_{P0})$ in the direction y among data G $(x_P, y_{PG})$ subjected to the distortion aberration correction and the correction of chromatic aberration of magnification. The density of B at the position of the coordinates $(x_P, y_{P0})$ is obtained by performing interpolation on the basis of the data of B at the two adjacent positions across the coordinates $(x_P, y_{P0})$ in the direction y among data B $(x_P, y_{PB})$ subjected to the distortion aberration correction and the correction of chromatic aberration of magnification. The above processings are performed for all of the pixels so that the electronic power varying processing in the direction y is performed.

Figure 23A:
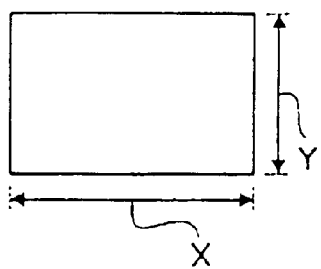
FIG. 23A is schematic view showing the shape of the outline of an original image for describing the operation of a 1 dimensional image processing section according to the fourth embodiment of the present invention.
Figure 23B:
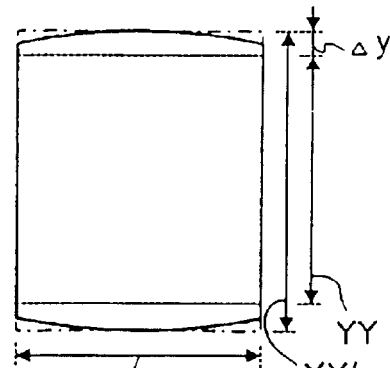
FIG. 23B is a schematic view showing the shape of the outline of an image formed when the LF aberration correction and the electronic power variation have been performed in the direction y for describing the operation of the 1 dimensional image processing section according to the fourth embodiment of the present invention.

Image data indicating an image (see FIG. 23A) having X pixels in the direction x and Y pixels in the direction y is subjected to the distortion aberration correction, the correction of chromatic aberration of magnification and the electronic power varying processing in the direction y as described above. The image region from the image void region, such as a blank region or a region having uncertain density, is, as shown in FIG. 23B, formed into a contour having two sides of the four sides of the image region at the two ends in the direction y, the two sides being warped. Moreover, the largest number of the pixels in the direction y is YY'.

Figure 23C:
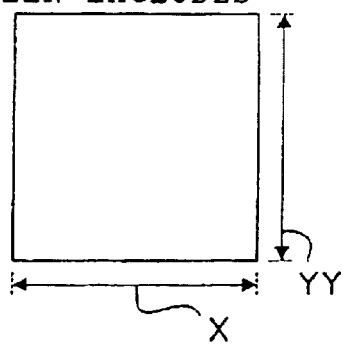
FIG. 23C is a schematic view showing the shape of the outline of an image from which image void portions in the direction y have been excluded for describing the operation of the 1 dimensional image processing section according to the fourth embodiment of the present invention.

In accordance with the corrected image void quantity $\Delta y'$ calculated in step 622 in the automatic set-up processing, the effective image region extracting section 64 omits regions (image void portions) corresponding to the corrected image void quantity $\Delta y'$ from the two ends of the image region in the direction y. Thus, the effective image region extracting section 64 extracts an effective image region. As a result, image data can be extracted from the effective image region extracting section 64, the image data being data having x pixels in the direction x, which is not changed, and pixels in the direction y, the number of which coincides with the target number YY of pixels (see FIG. 23C).

After the image processing in the direction y has been completed, the controller 50 temporarily stores image data output from the 1 dimensional image processing section 54 in the frame memory 142 via the switch 52. Then, the controller 50 controls the data reading order via the memory controller 138 in order to cause image data to be read in a direction which is different from the raster scan direction by 90°. Then, the frame memory 142 causes read image data to selectively be input to the 1 dimensional image processing section 54.

As a result, the 1 dimensional image processing section 54 performs the distortion aberration correction, the correction of chromatic aberration of magnification and the electronic power varying processing. That is, the 1 dimensional distortion aberration correction quantity calculating section 58 uses the coordinate $(x_P, y_{P0})$ as a key. Then, the 1 dimensional distortion aberration correction quantity calculating section 58 subjects a pixel having coordinates $(x_P, y_{P0})$ indicated by input image data to the following search. The processing is performed to search the corresponding distortion aberration quantity Dx $(x_P, y_{P0})$ in the direction x among distortion aberration correction data communicated from the automatic set-up engine 144 (if the distortion aberration quantity at the coordinates $(x_P, y_{P0})$ has not been stored as data, the distortion aberration quantity at the coordinates $(x_P, y_{P0})$ are obtained by performing interpolation in accordance with the distortion aberration quantity at the position around the coordinates). Then, the coordinates of data R $(x_P, y_{P0})$, G $(x_P, y_{P0})$ and B $(x_P, y_{P0})$ indicating R, G and B densities of the pixel having the coordinates $(x_P, y_{P0})$ are converted in accordance with the following equation. The above conversion is performed for all of the pixels.

$$R(x_{PR}', y_{P0}) \leftarrow R(x_P, y_{P0})$$

$$G(x_{PG}, y_{P0}) \leftarrow G(x_P, y_{P0})$$

$$B(x_{PB}', y_{P0}) \leftarrow B(x_P, y_{P0})$$

where $$x_{PR}' = x_{PG} = x_{PB}' = x_P + Dx(x_P, y_{P0})$$

The 1 dimensional chromatic aberration of magnification correction quantity calculating section 60R subjects data in R of a pixel (a pixel having coordinates $(x_{PR}', y_{P0})$ in the direction x after it has been subjected to the distortion aberration correction)) having the coordinates $(x_P, y_{P0})$ in the direction x before it is subjected to the distortion aberration correction to the following processing. The coordinates $(x_P, y_{P0})$ are used a key. Then, chromatic aberration of magnification quantity $\Delta Rx (x_P, y_{P0})$ of the corresponding R in the direction x is searched in the chromatic aberration of magnification correction data of R communicated from the automatic set-up engine 144 (if the distortion aberration quantity at the coordinates $(x_P, y_{P0})$ has not been stored as data, the chromatic aberration of magnification quantity at the coordinates $(x_P, y_{P0})$ are obtained by performing above-described interpolation). Then, the coordinates $(x_{PR}', y_{P0})$ of data R which indicates the density of R in the pixel having the coordinates $(x_{PR}', y_{P0})$ in the direction x after it has been subjected to the distortion aberration correction are converted in accordance with the following equation. The above conversion is performed for all of the pixels.

$$R(x_{PR}, y_{P0}) \leftarrow R(x_{PR}', y_{P0})$$

where $$x_{PR} = x_{PR}' + \Delta Rx(x_P, y_{P0}) = x_P + Dx(x_P, y_{P0}) + \Delta Rx(x_P, y_{P0})$$

Then, the 1 dimensional chromatic aberration of magnification correction quantity calculating section 60B subjects data in B of a pixel (a pixel having coordinates $(x_{PR}', y_{P0})$ in the direction x after it has been subjected to the distortion aberration correction) having the coordinates $(x_P, y_{P0})$ in the direction x before it is subjected to the distortion aberration correction to the following processing. The coordinates $(x_P, y_{P0})$ are used a key. Then, chromatic aberration of magnification quantity $\Delta Bx (x_P, y_{P0})$ of the corresponding B in the direction x is searched in the distortion aberration correction data of B communicated from the automatic set-up engine

144. Then, the coordinates ($x_{PB}'$, $y_{P0}$) of data B which indicates the density of B in the pixel having the coordinates ($x_{PB}'$, $y_{P0}$) in the direction x after it has been subjected to the distortion aberration correction are converted in accordance with the following equation. The above conversion is performed for all of the pixels.

$$B(x_{PB}, y_{P0}) \leftarrow B(x_{PB}', y_{P0})$$

where $$x_{PB} = x_{PB}' + \Delta Bx(x_P, y_{P0}) = x_P + Dx(x_P, y_{P0}) + \Delta Bx(x_P, y_{P0})$$

As a result, the distortion aberration correction in the direction x and the correction of chromatic aberration of magnification of R and B in the direction x are performed. The position of each pixel for R, G and B indicated by image data is moved in the direction x.

On the basis of the corrected electronic power variation ratio mx' in the direction x calculated in step 620 in the automatic set-up processing, the 1 dimensional electronic power-varying section 62 obtains the original position (hereinafter, the position refers to the coordinate ($x_{P0}$, $y_{P0}$)) of each pixel of the original image in the direction x when the number X of pixels is changed to the number XX' (=X.mx').

Then, the density of R at the position of the coordinates ($x_{P0}$, $y_{P0}$) is obtained by performing interpolation on the basis of the data of R positioned at two adjacent positions across the coordinates ($x_{P0}$, $y_{P0}$) in the direction x among data R ($x_{PR}$, $y_{P0}$) subjected to the distortion aberration correction and the correction of chromatic aberration of magnification. The density of G at the position of the coordinate ($x_{P0}$, $y_{P0}$) is obtained by performing interpolation on the basis of the data of G at the two adjacent positions across the coordinates ($x_{P0}$, $y_{P0}$) in the direction x among data G ($x_{PG}$, $y_{P0}$) subjected to the distortion aberration correction and the correction of chromatic aberration of magnification. The density of B at the position of the coordinates ($x_{P0}$, $y_{P0}$) is obtained by performing interpolation on the basis of the data of B positioned at two adjacent positions across the coordinates ($x_{P0}$, $y_{P0}$) in the direction x among data B ($x_{PB}$, $y_{P0}$) subjected to the distortion aberration correction and the correction of chromatic aberration of magnification. The above processings are performed for all of pixels. Thus, the electronic power varying processing in the direction x is performed.

Figure 23D:
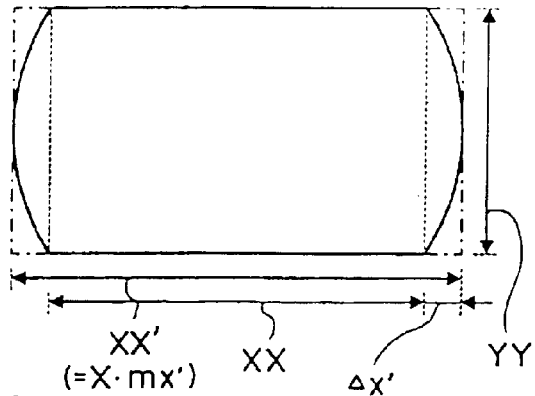
FIG. 23D is a schematic view showing the shape of the outline of an image when the LF aberration correction and the electronic power variation have been performed in the direction x for describing the operation of the 1 dimensional image processing section according to the fourth embodiment of the present invention.

Image data indicating an image (see FIG. 23C) having X pixels in the direction x and YY pixels in the direction y is subjected to the distortion aberration correction, the correction of chromatic aberration of magnification and the electronic power varying processing in the direction x. Thus, the image region from which the image void region, such as a blank region or a region having an uncertain density, has been omitted, is formed into a contour having two warped sides of the four sides of the image region in the direction x, as shown in FIG. 23D. Moreover, the maximum number of pixels in the direction x is XX'.

Figure 23E:
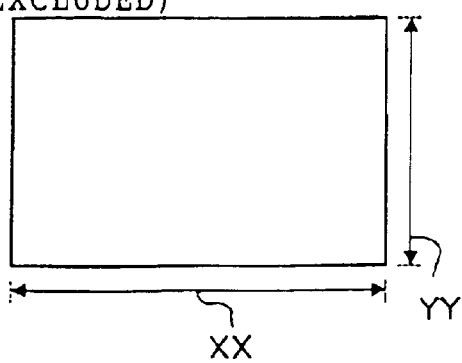
FIG. 23E is a schematic view showing the shape of the outline of an output image from which image void portions in the direction y have been excluded for describing the operation of the 1 dimensional image processing section according to the fourth embodiment of the present invention.

On the basis of the corrected image void quantity Δx' calculated in the automatic set-up processing, making the position of the center of the image reference, the effective image region extracting section 64 extracts an effective image region by omitting regions (image void portions) corresponding the corrected image void quantity Δx' from the two ends in the direction x of the image region. As a result, image data having the target number YY of pixels in the direction y and the target number XX of pixels in the direction x can be extracted from the effective-image-region extracting section 64 (see FIG. 23E) Thus, image data can be obtained in which the geometrical distortion aberration and color misregistration caused by the distortion aberration and chromatic aberration of magnifications of the lens with respect to the position of the center of the image are accurately corrected. Moreover, image data has been subjected to the electronic power varying processing such that the numbers of pixels in the directions x and y after the image void region has been removed coincide with the target number XX and YY of pixels. In addition, the image void region can be removed.

The controller 50 causes the 1 dimensional image processing section 54 to input image data subjected to the image processing in the direction x to the other image processing section 56 via the switch 52. The other image processing section 56 subjects input image data to the various image processings under the processing conditions communicated from the automatic set-up engine 144. Image data subjected to the various image processings in the other image processing section 56 is output from the image processor 140 as image data to be output. Image data to be output is used to record the image on photographic paper in the laser printer section 18 or stored in an information storage medium, such as a memory card, via the expansion slot 174.

In the above embodiment, the effective image region extracting section 64 of the image processor 140 removes the image void portion (extract an effective image region). The present invention is not limited to the above arrangement. For example, a structure of the image processor 140 as shown in FIG. 24 may be employed in which a switch 64 having a equivalent structure to that of the switch 52 of the 1 dimensional image processing section 54 is provided. Moreover, the effective image region extracting section 64 is omitted. In the above case, the controller 50 image data subjected to the distortion aberration correction, the correction of chromatic aberration of magnification and the electronic power varying processing and output from the 1 dimensional electronic power-varying section 62 is temporarily stored in the frame memory 142 without removing the image void region. When image data is read from the frame memory 142, the reading address of image data is controlled via the memory controller 138 such that the image void regions at the two ends in the direction y are removed.

Removal of the image void region at the two ends in the direction x is performed as follows: image data subjected to the distortion aberration correction, the correction of chromatic aberration of magnification and the electronic power varying processing and output from the 1 dimensional electronic power-varying section 62 is temporarily stored in the frame memory 142 without removing the image void regions. When image data is read from the frame memory 142, the recording address of image data is controlled via the memory controller 138 such that the image void regions at the two ends in the direction x are removed. Read image is caused to bypass the 1 dimensional image processing section 54 so as to be input to the other image processing section 56 by switching the switch 64. As can be understood from the above description, the controller 50 and the memory controller 138 of the structure shown in FIG. 24 correspond to the extracting means (specifically, the extracting means according to the twentieth aspect of the present invention).

Only when the image data, to be processed, is image data indicating a film image photographed and recorded on the photographic film by a film with lens attached, deterioration in the image quality caused by the characteristics of the lens is corrected. The present invention is not limited to this. If image data, to be processed, is image data indicating a film image photographed and recorded on a photographic film by a camera, for example, a compact camera at a low price relatively, with which the image quality considerably deteriorates according to the characteristic of the lens or image data photographed by a digital camera with which the image quality considerably deteriorates according to the characteristic of the lens and stored in an information recording medium, the above correction may be performed. All of image data indicating images recorded on a recording material by using a lens or all of image data obtained by a photographing operation by using a lens may be corrected as described above regardless of the degree of deterioration in the image quality caused by the characteristics of the lens.

The above embodiment is structured such that the distortion aberration correction, the correction of chromatic aberration of magnification, the electronic power varying processing and the effective image region extracting processing are performed in the direction y. Then, the above corrections and processings are performed in the direction x. The reason for this will now be described. A specific LF is structured to expose and record an image in a state in which the photographic film is warped in the direction y in consideration of the curvature aberration of field of the lens. Therefore, the geometrical distortion aberration of the image exposed and recorded on the photographic film by the specific LF in the direction y is smaller than that in the direction x (also FIG. 23B shows a state in which the corrected image void quantity $\Delta y'$ is larger than the amounts of warp of the sides at the two ends in the direction y). Therefore, the above corrections and processings may be performed in the direction x, and then the same are performed in the direction y. The order of the processings (direction y→direction x, direction x→direction y) may be switched in accordance with the type of the lens or the type of the camera including the LF.

The above correcting section corrects each of the geometrical distortion aberration of the image caused by the distortion aberration of the lens and the color misregistration of the image caused by the chromatic aberration of magnification of the lens. The present invention is not limited to this. The correcting section may perform only either of the two corrections.

When image data, to be processed, is image data obtained by reading an image recorded on a recording material, such as a photographic film, by an image reading device, such as the line CCD scanner 14, also deterioration in the image quality caused by the characteristics of the lens provided for the image recording device may be corrected.

The fourth embodiment of the present invention is structured as described above. The above embodiment include the following aspects in addition to the image processing device according to the eighteenth aspect of the present invention and the image processing method according to the nineteenth, twentieth, twenty-first and twenty-second aspects of the present invention.

(1) An image processing device according to a nineteenth aspect of the present invention, further comprising an acquiring means for acquiring the characteristic information relating the lens, wherein the correcting section corrects at least either the geometrical distortion aberration or color misregistration caused by the aberration of the lens.

As described above, the image processing method according to the eighteenth aspect of the present invention comprises the steps of: correcting in image data representing an image projected via a lens at least one of geometrical distortion and color misregistration of said image arising from an aberration in said lens in a first predetermined direction; extracting image data corresponding to an area inside an effective image region from which image voids at both ends in said first predetermined direction of the image represented by said image data have been excluded from the image data which has undergone the correction in the first predetermined direction; correcting in the extracted image data at least one of geometrical distortion and color misregistration of an image represented by the image data in a second predetermined direction orthogonal to said first predetermined direction; and extracting image data corresponding to an area inside an effective image region from which image voids at both ends in said second predetermined direction of the image represented by said image data have been excluded from the image data which has undergone the correction in the second predetermined direction. Therefore, the distortion aberration correction and the correction of chromatic aberration of magnification of image data can quickly be completed. Moreover, an excellent effect can be obtained in that occurrence image voids in the output image can be prevented.

The image processing device according to the nineteenth aspect of the present invention comprises: a correcting section in which, in image data representing an image projected via a lens, at least one of geometrical distortion and color misregistration of said image arising from an aberration in said lens is corrected in a single direction; extracting means for extracting image data corresponding to an area inside an effective image region from which image voids at both ends in a direction identical to the direction of the correction performed in said correcting section on the image represented by the image data have been excluded from the image data which has undergone said correction in said correcting section; and controlling means for, in image data to be processed representing an image projected via a lens, correcting in said correcting section at least one of geometrical distortion and color misregistration of said image arising from an aberration in said lens in a first predetermined direction; extracting by said extracting means image data corresponding to an area inside said effective image region from the corrected image data; correcting by said correcting section at least one of geometrical distortion and color misregistration of an image represented by the extracted image data in a second predetermined direction orthogonal to said first predetermined direction; and extracting by said extracting means image data corresponding to an area inside said effective image region from the corrected image data. Therefore, an excellent effect can be obtained in that the distortion aberration correction and correction of chromatic aberration of magnification of image data can quickly be completed with a simple structure. Moreover, occurrence of image voids in the output image can be prevented.

The image processing device according to the twenty-second aspect of the present invention has the structure according to the nineteenth aspect of the present invention, in which said correcting section corrects at least one of geometrical distortion and color misregistration in a single direction of an image in image data, and converts the image data so that the number of pixels in the same direction as the direction of the correction is set at a fixed value, and in which said control means controls said correcting section so that, when correction is being performed in said first predetermined direction, the number of pixels in the image data in said first predetermined direction is set at a first fixed value, and said control means controls said correcting section so that, when correction is being performed in said second predetermined direction, the number of pixels in the image data in said second predetermined direction is set at a second fixed value. Thus, when at least either the geometrical distortion aberration or color misregistration of the image is corrected and the number of pixels of image data is changed, an effect can be obtained in that deterioration in the image quality of output image can be obtained in addition to the above effects.

What is claimed is:

1. An image processing method comprising the steps of:
reading information on the characteristics of a photographic lens and an image recorded on a photographic photosensitive material;
extracting a main object from said read image;
reading aberration correction information corresponding to the information on the characteristics of said photographic lens;
determining whether or not said main object will be positioned in the image void region when an image aberration correction is performed on the basis of information on the position of the extracted said main object and said aberration correction information; and
performing said aberration correction if it is determined that said main object will not be positioned in the image void region.

2. An image processing method according to claim 1, wherein, if it is determined that said main object will be positioned in the image void region, said aberration correction is not performed.

3. An image processing method according to claim 1, wherein, if it is determined that said main object will be positioned in the image void region, said aberration correction is performed to the extent that said main object is not positioned in the image void region.

4. An image processing method according to claim 1, wherein the determination whether or not to perform said aberration correction is made on the basis of order information from a customer.

5. An image processing method according to claim 2, wherein the determination whether or not to perform said aberration correction is made on the basis of order information from a customer.

6. An image processing method according to claim 3, wherein the determination whether or not to perform said aberration correction is made on the basis of order information from a customer.

7. The image processing method of claim 1, wherein said reading information on the characteristics of a photographic lens, said extracting, said reading aberration correction information, said determining, and said performing, are controlled by a CPU.

8. The image processing device of claim 1, wherein said reading information on the characteristics of a photographic lens, said extracting, said reading aberration correction information, said determining, and said performing, are controlled by a CPU.

9. An image processing device comprising:
photographic lens characteristics information reading means for reading the information on the characteristics of a photographic lens;
image reading means for reading an image recorded on a photographic photosensitive material;
extraction means for extracting the main object from the read image using said image reading means;
storage means for sorting in advance aberration correction information corresponding to said photographic lens characteristics information;
aberration correction information reading means for reading said aberration correction information from said storage means; and
determining means for determining whether or not said main object will be positioned in the image void region if an image aberration correction is performed, on the basis of information on the position of said main object extracted by the extracting means and said aberration correction information.

10. An image processing device according to claim 9, wherein, if it is determined by said determining means that said main object will be positioned in the image void region, said aberration correction is not performed.

11. An image processing device according to claim 9, wherein, if it is determined by said determining means that said main object will be positioned in the image void region, said aberration correction is performed to the extent that said main object is not positioned in said image void region.

12. An image processing device according to claim 9, wherein the determination whether or not to perform said aberration correction is made on the basis of order information from a customer.

13. An image processing device according to claim 10, wherein the determination whether or not to perform said aberration correction is made on the basis of order information from a customer.

14. An image processing device according to claim 11, wherein the determination whether or not to perform said aberration correction is made on the basis of order information from a customer.

15. An image processing device comprising:
processing means for performing an image processing on image data in accordance with changes in the shape of the outline of an image represented by the image data;
display means for displaying an image;
specifying means for specifying a range cut from an image on the basis of an image displayed on said display means;
cutting means for cutting data corresponding to the range indicated by said specifying means from the image data; and
display control means for controlling so that a range of an image represented by the image data which excludes the range where an image cannot be cut created by an image processing using said processing means is displayed on said display means, or an image represented by the image data which is divided into ranges where the image can be cut and ranges where the image cannot be cut is displayed on said display means.

16. An image processing device according to claim 15, in which said image data is data representing art image projected via a lens, further comprising an acquiring means for acquiring information related to the characteristics of said lens, wherein, on the basis of information related to said lens characteristics acquired by said acquiring means, said processing means performs as said image processing at least one of: distortion aberration correction processing to correct geometrical distortion in said image arising from distortion aberration in said lens; and magnitude chromatic aberration correction processing to correct color misregistration in the image arising from chromatic aberration in the magnification of the lens.

17. An image processing device according to claim 16, wherein said display means determines the positions of the border between the image range where the image can be cut and the image range where the image cannot be cut on the basis of information related to the characteristics of said lens acquired by said acquiring means.

18. An image processing device according to claim 15, in which said image data is image data representing an image projected via a lens, further comprising an acquiring means for acquiring information related to the characteristics of said lens, wherein, on the basis of a central position of an image represented by image data, a central position of a range specified by the specifying means, and information related to said lens characteristics acquired by said acquiring means, said processing means performs at Least one of: enlarging/reducing processing to enlarge or reduce an image represented by data cut out by said cutting means to a predetermined size; peripheral darkening correction processing to correct reductions in the luminosity in the edge portions of an image caused by said lens; and focal blurring correction processing to correct reductions in the sharpness of an image caused by said lens.

19. An image processing device according to claim 15, further comprising limiting means for limiting the range which can be instructed via said instructing means so as to exclude ranges where the image cannot be cut from a range instructed by said instructing means.

20. The image processing device of claim 15, wherein said cutting means further comprises cutting image data from pre-scan data on the basis of a determined image plane position.

21. An image processing method comprising the steps of:
correcting in image data representing an image projected via a lens at least one of geometrical distortion and color misregistration of said image arising from an aberration in said lens in a first predetermined direction;
extracting image data corresponding to an area inside an effective image region from which image voids at both ends in said first predetermined direction of the image represented by said image data have been excluded from the image data which has undergone the correction in the first predetermined direction;
correcting in the extracted image data at least one of geometrical distortion and color misregistration of an image represented by the image data in a second predetermined direction orthogonal to said first predetermined direction; and
extracting image data corresponding to an area inside an effective image region from which image voids at both ends in said second predetermined direction of the image represented by said image data have been excluded from the image data which has undergone the correction in the second predetermined direction.

22. An image processing device comprising:
a correcting section in which, in image data representing an image projected via a lens, at least one of geometrical distortion and color misregistration of said image arising from an aberration in said lens is corrected in a single direction;
extracting means for extracting image data corresponding to an area inside an effective image region from which image voids at both ends in a direction identical to the direction of the correction performed in said correcting section on the image represented by the image data have been excluded form the image data which has undergone said correction in said correcting section; and
controlling means for, in image data to be processed representing an image projected via a lens, correcting in said correcting section at least one of geometrical distortion and color misregistration of said image arising from an aberration in said lens in a first predetermined direction; extracting by said extracting means image data corresponding to an area inside said effective image region from the corrected image data; correcting by said correcting section at least one of geometrical distortion and color misregistration of an image represented by the extracted image data in a second predetermined direction orthogonal to said first predetermined direction; and extracting by said extracting means image data corresponding to an area inside said effective image region from the corrected image data.

23. An image processing device according to claim 22, further comprising storage means for storing image data which has undergone said correction in said correcting section, wherein said extracting means controls the reading when image data stored in said storage means is read so that only image data corresponding to an area inside said effective image region is read.

24. An image processing device according to claim 22, further comprising storage means for storing image data which has undergone said correction in said correcting section, wherein said extracting means controls the storing when image data which has undergone correction by said correcting section is stored in said storage means so that only image data corresponding to an area inside said effective image region is stored in the storage means.

25. An image processing device according to claim 22, in which said correcting section corrects at least one of geometrical distortion and color misregistration in a single direction of an image in image data, and converts the image data so that the number of pixels in the same direction as the direction of the correction is set at a fixed value, and in which said control means controls said correcting section so that, when correction is being performed in said first predetermined direction, the number of pixels in the image data in said first predetermined direction is set at a first fixed value, and said control means controls said correcting section so that, when correction is being performed in said second predetermined direction, the number of pixels in the image data in said second predetermined direction is set at a second fixed value.

* * * * *